US008597028B2

(12) United States Patent
Paul et al.

(10) Patent No.: US 8,597,028 B2
(45) Date of Patent: Dec. 3, 2013

(54) SYSTEM AND METHOD FOR FACILITATING PERSONAL DEVELOPMENT USING A COMPUTING DEVICE

(75) Inventors: Margaret B. Paul, Durango, CO (US); Erika J. Chopich, Durango, CO (US)

(73) Assignee: Selfquest, Inc., Pacific Palisades, CA (US)

( * ) Notice: Subject to any disclaimer, the term of this patent is extended or adjusted under 35 U.S.C. 154(b) by 98 days.

(21) Appl. No.: 13/269,759

(22) Filed: Oct. 10, 2011

(65) Prior Publication Data

US 2013/0089841 A1 Apr. 11, 2013

(51) Int. Cl.
G09B 19/00 (2006.01)

(52) U.S. Cl.
USPC .......................................... 434/236

(58) Field of Classification Search
CPC ....................................... G09B 19/00
USPC ......................... 434/236, 322, 323
See application file for complete search history.

(56) References Cited

U.S. PATENT DOCUMENTS

| 5,596,994 | A | 1/1997 | Bro |
|---|---|---|---|
| 6,146,148 | A | 11/2000 | Stuppy |
| 6,497,577 | B2 | 12/2002 | Kanter |
| 7,082,418 | B2 | 7/2006 | Levy et al. |
| 7,128,577 | B2 | 10/2006 | Renaud |
| 7,874,841 | B1 | 1/2011 | Lycas |
| 2002/0116352 | A1 | 8/2002 | Kilgard et al. |
| 2005/0147090 | A1 | 7/2005 | MacLeod Beck et al. |
| 2005/0216243 | A1 | 9/2005 | Graham et al. |
| 2006/0167723 | A1 | 7/2006 | Berg |
| 2007/0026375 | A1 | 2/2007 | Dewey |
| 2007/0167687 | A1 | 7/2007 | Bertolero et al. |
| 2008/0064019 | A1 | 3/2008 | Kaufman et al. |
| 2008/0214903 | A1 | 9/2008 | Orbach |
| 2008/0254426 | A1 | 10/2008 | Cohen |
| 2008/0298549 | A1 | 12/2008 | Quill et al. |
| 2010/0211407 | A1 | 8/2010 | Duke et al. |

*Primary Examiner* — Kesha Frisby
(74) *Attorney, Agent, or Firm* — Webb IP Law Group; Jason P. Webb; Danny Y. H. Cheng

(57) ABSTRACT

A system and method for facilitating personal development using a computing device. The method includes generating a machine-readable foundation profile by performing sub-steps including querying a user through a user interface module and providing a user access to an education module and a discovery module. The sub-steps include storing answers to queries in association with a user. The method also includes guiding a user through a process of issue resolution by querying a user in regards to a specific situation and teaching a user in regards to taking responsibility for their feelings and/ or behavior. The sub-steps include teaching a user about having an intent to learn and managing an inner guidance dialogue within the user. The method further includes facilitating a user taking action by displaying an intended action from the action profile, and teaching the user how to productively take action and facilitating self-evaluation by the user.

20 Claims, 45 Drawing Sheets

SYSTEM AND METHOD FOR FACILITATING PERSONAL DEVELOPMENT USING A COMPUTING DEVICE

BACKGROUND OF THE INVENTION

1. Field of the Invention

The present invention relates to methods and systems for facilitating personal development, specifically to methods and systems using a computing device.

2. Description of the Related Art

Facilitated personal development is an old art having roots in the beginning of recorded history with informal counseling among friends and family, religious practices, childrearing, and the like. For most of this history, technology has played a limited and sometimes controversial role in the art, including technologies such as electroshock therapy, pharmaceuticals, biofeedback, and the like. However, the potential gains in facilitated personal development are very great.

In particular, our individual human potential is often blocked by our own perception of ourselves and our surroundings. People often limit their positive impact on themselves and their communities and even limit their communities because of "blocks" "issues", etc. Accordingly, productivity, quality of life, and other valuable aspects of personal existence may hinge on being able to resolve such issues and achieve a higher level of functionality and experience. This, in turn, impacts our communities and ultimately the course of our civilization.

In the related art, it has been known to use software to facilitate personal development. Examples include productivity and time management software that help one to be more productive and remove issues related to time usage. Further, there are educational programs that present scripted media content in the form of slideshows, linked videos, ebooks, podcasts and the like including personal development teachings, visualizations, hypnosis, and the like. Some improvements have been made in the field. Examples of references related to the present invention are described below in their own words, and the supporting teachings of each reference are incorporated by reference herein:

U.S. Pat. No. 7,874,841, issued to Lycas, discloses a presentation generator is disclosed for generating presentations for interacting with a user on a personal topic of, e.g., the user's selection, wherein the presentations assist the user in obtaining a greater awareness of his/her motivations and/or behaviors relating to the topic. In one embodiment, the presentation generator generates and presents to the user textual observations, questions, and/or statements for the user's consideration. Such presentations use and/or are consistent with textual descriptions obtained from: (a) the results of one or more personality/motivation test results, and (b) user inputs, e.g., regarding the selected topic together with his/her confidence in the validity of such inputs. The invention organizes the textual descriptions so that outputs to the user can be generated from various personality/motivational perspectives thereby assisting the user in viewing the topic of discussion from different perspectives and thereby becoming more aware of his/her biases, motivations, and/or concerns relating to the topic.

U.S. Pat. No. 6,497,577, issued to Kanter, discloses various systems and methods for providing an individual with improved emotional awareness and self-mastery. The systems and methods allow an individual to recall a situation in which the he or she experienced negative emotions. Then, the individual is able to analyze the recalled situation to identify specific negative emotions (specifically "flight" or "fight" emotions) experienced during the particular situation. Once the individual has identified specific negative emotions that were experienced during the particular situation, the systems and methods of this invention correlate each identified emotion with an underlying spiritual need. When the appropriate spiritual need(s) have been identified, the systems and methods of this invention identify at least one antidote to the spiritual need(s). The antidote(s) are then relayed to the individual for personal application. In this manner, an individual can evaluate the negative emotion(s) experienced during a particular situation and receive guidance as to how he or she can cultivate virtuous behavior that will overcome the negative emotions.

U.S. Pat. No. 5,596,994, issued to Bro, discloses an automated and interactive positive motivation system (10) that allows a physician, counselor or trainer to produce and send a series of motivational messages and/or questions to a client (50) to change or reinforce a specific behavioral problem. The system (10) consists of a client database (12) and a client program (14) that includes for each client unique motivational messages and/or questions based on the transtheoretical model of change comprising the six stages of behavioral change (100) and the 14 processes of change (114), as interwinding, interacting variables in the modification of health and mental health behaviors of the client (50). The client program (14) utilizes the associated 14 processes of change (114) to move the client (50) through one of the six stages of behavioral change (100) when appropriate by using a plurality of transmission and receiving means. The database and program are operated by a computer (16) that at preselected time periods sends the messages and/or questions to the client (50) through use of a variety of transmission means and furthermore selects a platform of behavioral issues that is to be addressed based on a given behavioral stage (100) at a given time of day.

U.S. Patent Application Publication No. 2008/0298549, by Quill et al., discloses an expert system supporting non-experts in their capacity to develop, implement, monitor and evolve therapy plans. Therapy plans in this application are educational and non-medical. The purpose of the therapy plan is to guide the caregiver or therapist in what to do for a client and how to do it. The client is a person with a previously diagnosed condition (psychological, cognitive, or physical) which responds to a teaching process. The plans are developed based on expert system analysis of user input. This analysis is reflective of decision making processes in the fields of both special needs education and rehabilitative medicine, including speech language pathology, psychology, physiotherapy, and occupational therapy.

U.S. Patent Application Publication No. 2008/0064019, by Kaufman et al., discloses an internet based system for conducting self-assessment and self-improvement inquiries, including expert and peer evaluations, advisement, and support within the context of an internet based dynamic and interactive online community designed to further the self-assessment and self-improvement process by providing users with computer based self-assessment and self-improvement tests utilizing a dynamic flash based "video-game-like" interface and, then providing the results to be used within that interactive online community to further the self-improvement process by the participation in an internet-based online community in which the user is matched with actual online resources with aptitudes and preferences as determined by the results of the directed self-assessment. Said results may also be used to match vocational and avocational aptitudes with the potential employers and mentors of the social community.

The inventions heretofore known suffer from a number of disadvantages which include being too rigid/controlling, failing to produce meaningful results, being awkward to use, failing to provide needed resources, being ineffective, being inefficient, not resolving issues, failing to educate, not being reusable, not being adapted to the individual, failing to provide the right information at the right time, being expensive, requiring use of a consultant/professional, and/or failing to protect a user thereof.

What is needed is a system or method that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available systems and methods. Accordingly, the present invention has been developed to provide a system and method for facilitating personal development using a computing device.

According to one embodiment of the invention, there is a method for facilitating personal development using a computing device by providing non-transitory machine-readable instructions on a tangible medium to perform steps. The method may include generating a machine-readable foundation profile that may perform sub-steps. The sub-steps may include querying a user through a user interface module in regards to facts about themselves, which may include their false beliefs. The sub-steps may include providing a user access to an education module and a discovery module through context relevant links during a querying process. The sub-steps may include storing answers to queries in association with a user as a foundation profile in a memory storage module of a discovery module.

The method may include guiding a user through a process of issue resolution by a module that may perform sub-steps. The sub-steps to guiding a user through a process of issue resolution by a module may include querying a user in regards to a specific situation, storing answers to such queries as a machine-readable situation profile. The sub-steps may include teaching a user in regards to taking responsibility for their feelings, which may include querying a user about their feelings in regards to the situation profile, and which may store answers to such queries as a machine-readable feeling profile associated with the situation profile. The sub-steps may include teaching a user about having an intent to learn by displaying media related thereto. The sub-steps may also include managing a self-dialogue within the user by displaying, on a display device, an answer stored in the feeling profile, which may include querying a user about the displayed answer, which may include querying a user about the actions and beliefs that are associated with the displayed answer, and which may include teaching the user techniques for productive self-dialogue.

The step of guiding a user through a process of issue resolution by a module that performs sub-steps may include managing an inner guidance dialogue within the user by teaching the user techniques for productive inner guidance dialogue, which may include displaying an answer stored in any one of the foundation profile, situation profile, and feelings profile, which may include querying the user about solutions associated with the displayed answer, suggesting a plurality of actions, and storing a representation of an intended action as a machine-readable action profile. The sub-steps may include facilitating a user taking action by displaying an intended action from the action profile, and may teach the user how to productively take action. The sub-steps may also include facilitating self-evaluation by the user of the effectiveness of a taken action by teaching the user about effective actions, and which may include querying the user about the feelings resulting from the taken action.

The method may include displaying at least one answer from the situation profile as a header during performance of a sub-step of guiding a user through a process of conflict resolution. The method may include specific sub-steps that may be performed only on user activation of the same. The method may further include generating and displaying a link to a sub-step associated with the generation of an incomplete profile when a sub-step attempts to display data from the incomplete profile. The method may include the step of recording completed sub-steps as machine-readable tracking profile. The method may include storing a display page history which may include an index of recently displayed interface pages and providing a user selectable interface that may return the display to a previously displayed interface page.

The method may further include the user interface module may be platform independent. The method may include providing a link to an audio file which may include a visualization exercise. The method may include the step of querying, which may include providing a list of non-exclusively selectable answers. The method may also include a step of querying which may include providing a free answer form. The method may include the step of providing a master interface that may be configured to permit a user to navigate between sub-steps, the master interface which may include a bookmark module that may be configured to selectably record a page location for later retrieval. The method may further include providing access to a multimedia educational module.

According to one embodiment of the invention, there is a method for facilitating personal development using a computing device by providing non-transitory machine-readable instructions on a tangible medium to perform steps. The steps may include generating a machine-readable foundation profile. The method may include the step of guiding a user through a process of issue resolution by a module that may perform sub-steps through a user interface module of a computing device that may permit a user to selectably cause a processor of the computing device to direct performance of such sub-steps. The sub-steps may include querying a user in regards to a specific situation, which may include storing answers to such queries as a machine-readable situation profile. The sub-steps may include querying a user about their feelings in regards to the situation profile, and which may include storing answers to such queries as a machine-readable feeling profile associated with the situation profile. The sub-steps may include managing a self-dialogue within the user by displaying, on a display device, an answer stored in the feeling profile, and may include querying a user about the displayed answer. The sub-steps may also include managing an inner guidance dialogue within the user by displaying an answer stored in any one of the foundation profile, situation profile, and feelings profile, querying the user about solutions associated with the displayed answer, and storing a representation of an intended action as a machine-readable action profile.

The method may include the step of displaying at least one answer from the situation profile as a header during performance of a sub-step of guiding a user through a process of conflict resolution. The method may include generating and displaying a link to a sub-step associated with the generation of an incomplete profile when a sub-step attempts to display data from the incomplete profile. The method may include recording completed sub-steps as machine-readable tracking profile and may include storing a display page history that may include an index of recently displayed interface pages and may provide a user selectable interface that may return the display to a previously displayed interface page.

According to one embodiment of the invention, there is a system for facilitating personal development using a computing device. The system may include a user interface module that may be configured to provide interactive access to the system to a user. The user interface module may include an input module that may be configured to receive data from an input device, and may be configured to process such data on a processor and thereby deliver user instructions to the system. The user interface module may include a return module that may be configured to permit a user to selectably return a display to a previously viewed display page. The return module may include a graphical object linked to a return command that may be configured to display a previously viewed display page. The user interface module may include a sequence management module that may be functionally coupled to the discovery module and the education module and may be configured to track module usage. The user interface module may include a module socket module that may be configured to provide user access to a plurality of additional content modules.

The system may include a discovery module that may be operatively coupled to the user interface module and may be configured to extract and store information from a user. The discovery module may include a query module that may be configured to serve a plurality of questions and may be configured to receive answers to the same. The discovery module may include a query linking module that may be functionally coupled to the query module and may be configured to sequence a plurality of questions. The discovery module may include a data storage module that may be in communication with the query module and may be configured to store answers. The discovery module may include a usage recording module that may be functionally coupled to the query module and may be configured to store completion data regarding asked questions.

The system may include an education module that may be operatively coupled to the user interface module and configured to educate a user. The education module may include a dictionary module that may be configured to serve definitional information on request. The education module may include a reference module that may be configured to serve reference information upon request. The system may further include a conditioning module that may be operatively coupled to the user interface module and may be configured to influence a user. The conditioning module may include a media module that may have a plurality of media files. The conditioning module may include a media linking module that may be functionally coupled to the media module and may be configured to sequence a plurality of media files. The conditioning module may include a usage recording module that may be functionally coupled to the media module and may be configured to store completion data regarding served media files.

The user interface module of the system may further include a media module. The media module may include a plurality of media files. The media module may include a user account module that may be configured to store user information and may limit access to the same through a security process. The media module may include a data storage module that may be configured to store data. The media module may also include a skin module that may be configured to selectably manage display of a plurality of image files decorating the user interface. The discovery module of the system may also include a customization module that may be configured to read a user characteristic from a user profile and may selectably deliver a subset of question phrasings adapted to the user characteristic.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
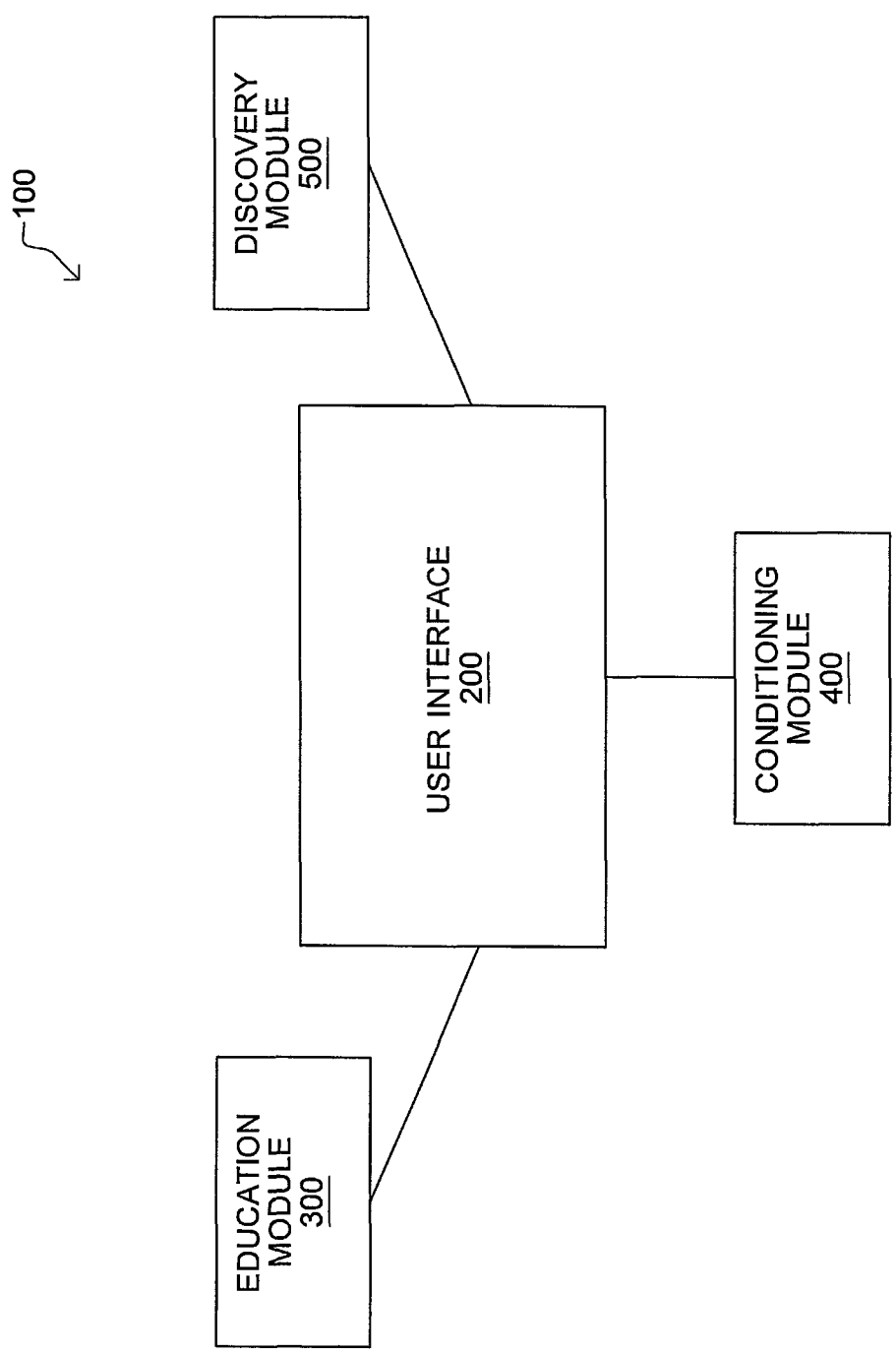
FIG. 1 is a module diagram showing a system for facilitating personal development using a computing device, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of programmable or executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: user information, answers to selected questions, completion tallies, and/or like data useful in the operation of the present invention. As those skilled in the art will appreciate, any computers discussed herein may include an operating system (e.g., Windows Vista, NT, 95/98/2000, OS2; UNIX; Linux; Solaris; MacOS; and etc.) as well as various conventional support software and drivers typically associated with computers. The computers may be in a home or business environment with access to a network. In an exemplary embodiment, access is through the Internet through a commercially-available web-browser software package.

The present invention may be described herein in terms of functional block components, screen shots, user interaction, optional selections, various processing steps, and the like. Each of such described herein may be one or more modules in exemplary embodiments of the invention. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, AJAX, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units and/or modules. Being "in communication" refers to any manner and/or way in which functional units and/or modules, such as, but not limited to, computers, laptop computers, PDAs, modules, and other types of hardware and/or software, may be in communication with each other. Some non-limiting examples include communicating, sending, and/or receiving data and metadata via: a network, a wireless network, software, instructions, circuitry, phone lines, internet lines, satellite signals, electric signals, electrical and magnetic fields and/or pulses, and/or so forth.

As used herein, the term "network" may include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

FIG. 1 is a module diagram showing a system for facilitating personal development using a computing device, according to one embodiment of the invention. There is shown a user interface module 200, of a system 100, in communication with each of an education module 300, a conditioning module 400 and a discovery module 500. Such communication may take any of several forms, including but not limited to electronic communication over a network through a communication protocol, shared access to data storage, passing variables, and the like and combinations thereof. Accordingly, a user interacting with the user interface module 200 may have access to each of the connected modules and such modules may be able to interact with such a user.

The illustrated user interface module 200 provides an interactive communication with a user and may include any number of devices, programs, scripts and the like including but not limited to visual displays (screens, monitors, projectors, etc.), I/O devices (mouse, keyboard, touch screen, etc.), audio devices (speakers, headphones, etc.), device drivers, media files, menu scripts, processors, access control software/hardware, memory buffers, communication devices (network card, data buss, etc.) and the like and combinations thereof. Accordingly, a user may receive information therefrom and/or may provide information thereto. Non-limiting examples of user interface modules include desktop computers, laptops, tablet computers, dumb terminals, smartphones, and/or software and/or applications that may operate thereon or be associated therewith.

A user interface module may be configured to provide interactive access to the system to a user and may include an input module, a return module, a sequence management module, a module socket module, a media module, a user account module, a data storage module and/or a skin module.

The illustrated education module 300 is functionally coupled with the user interface module and delivers context related educational materials on selection, demand, script or otherwise when appropriate. Generally, such information is text-based information that may be provided according to a user interface script (i.e. in coordination with a user clicking through a process), or by tangential selection, such as but not limited to by being associated with a hyperlinked word and providing dictionary information about the hyperlinked word on selection of the same. Such a module may include one or more devices, programs, scripts and the like, including but not limited to databases, data storage devices (hard drive, flash drive, ROM, RAM, optical drive, etc.), data storage indexes, media files, text files, XML files, third party information resources, and the like and combinations thereof. Accordingly, an education module 300 may serve as a resource for serving educational materials to a user.

The illustrated conditioning module 400 is similar in form to the education module 300 and may include one or more devices, programs, scripts and the like, including those described as possibilities for the education module. A main difference in the conditioning module is the subject matter stored therein and the presentation thereof. In particular, a conditioning module includes media materials configured to influence a user, rather than merely educate. As non-limiting examples, a conditioning module may alter a mental state (relaxation, openness to suggestion, etc.), resolve an issue (work through an anger issue, uncover a suppressed feeling/memory, etc.), walk a user through a specific technique intended to generate a particular change within (anger management protocol, energy psychotherapy, hypnosis therapy, etc.), and the like and combinations thereof.

When influencing a user, it is advantageous to place more control over presentation of the material so that the desired effect may occur. Accordingly, the conditioning module may include one or more devices, programs, scripts or the like that manage, present, and/or control an aspect of presentation such that a desired effect may be preserved. Non-limiting examples include choreographed (time registered) multimedia files, multiple linked files under control of a script, menu driven data structures and/or media presentations, usage/completion tracking, user instructions, and the like and combinations thereof. Accordingly, a system implementing a conditioning module may exert influence over a user and/or effect internal change to a degree greater than that effectuated by merely providing information.

The illustrated discovery module 500 is functionally coupled to the user interface module 200 and extracts, manages, and/or stores user generated information and makes the same available for use by other modules. A discovery module 500 may include any number of devices, programs, scripts and the like including but not limited to databases, XML files, fillable electronic forms, communication devices, data storage devices, data retrieval applications, data management applications, data mining applications, data storage protocols, and the like and combinations thereof. Accordingly, a system including a discovery module 500 may be able to extract information from a user and may subsequently utilize such information for the benefit of the user.

In operation of one embodiment, a preconfigured and content populated system is provided for use by a user through interaction with a user interface device, such as but not limited to an application resident in a personal computer, iPad, smartphone or the like. The user executes the application and through a menu system is able to initiate one or more processes that utilize the modules therein. Utilization may be guided by instructions, and/or limiting menu selections and the like, and/or may be free-form or sandbox-style usage where the user may navigate freely among available resources. Utilization may be tracked, recorded and/or displayed so that a user may know what they have completed and what has not been completed. Through interaction with the various modules, the user may be led through processes of self-discovery, change, awareness, skill development, and the like. Progress made in one session may influence or impact further sessions, such as but not limited to through extracted data being provided to the user in a context that educates, informs, influences, or otherwise facilitates personal development of the user. Especially wherein user accounts and other data structures are included in a system, such a system may be utilized repeatedly by the same user for multiple benefits and may be utilized by diverse users.

Advantageously, such a system and/or process may effectuate in depth healing, help people improve themselves physically, emotionally, financially, spiritually, organizationally, and/or relationally. Accordingly, such a system may create an inner sense of safety for oneself and/or create a personal spiritual connection. A user may be provided access to the right best choices, right decisions for various situations. A user may learn how to better organize their thoughts and life to advantageous effect.

As a non-limiting example, a system may be preconfigured to provide one or more of the following: teaching that there are only two intentions, to control and to learn; giving relief from clinical depression and/or anxiety without medication by facilitating inner bonding; helping people overcome addictions, improving relationships (even where only one party participates), resolving self-abandonment, provide reduced cost therapy, and/or focusing efforts on the individual by the individual so that therapy is consistent with a self-healing style of process. Such a system may be database driven and/or may utilize software products/protocols such as but not limited to an HTML 5 database, Adobe Director, Adobe Flash, Javascript, XML, JSON, and the like and combinations thereof. There may be a core system built in a platform independent protocol/language that may be "wrapped" as needed to be used in a plurality of device types.

Figure 2:
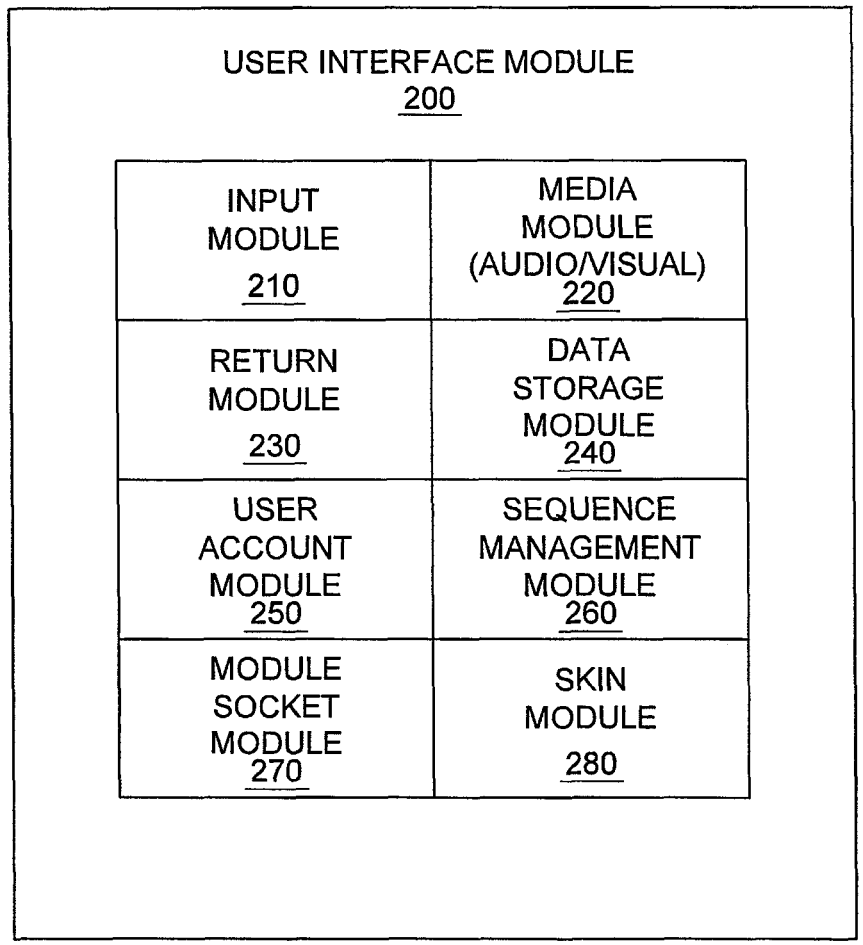
FIG. 2 is a module diagram showing a user interface module of a system for facilitating personal development using a computing device, according to one embodiment of the invention.

FIG. 2 is a module diagram showing a user interface module of a system for facilitating personal development using a computing device, according to one embodiment of the invention. There is shown an input module 210, a media module 220, a return module 230, a data storage module 240, a user account module 250, a sequence management module 260, a module socket module 270, and a skin module 280 of a user interface module 200. Each of the modules may be in functional communication with one or more other modules of the user interface module and/or with one or more other modules described herein. Such communication may include passing data, sharing data structures/storage, altering another module, being altered by another module, or the like and combinations thereof. The illustrated modules generate an interactive user interface that permits a user to utilize and/or explore the materials and content associated therewith in a manner that facilitates the use and benefits thereof.

The illustrated input module 210 is configured to receive data from an input device, process such data on a processor and thereby deliver user instructions to the system. In particular, an input module may include instructions for processing input information and converting such information to be usable by one or more modules described herein. As a non-limiting example an input module may include instructions for converting data received from a mouse click at a particular location to indicate selection of a particular phrase as an answer to a question. An input module 210 may include a device driver or may simply include instructions for converting data processed by a device driver into instructions meaningful to the system. Such may be accomplished by converting data types, forms, structures, conditional messaging and the like and combinations thereof. Accordingly, a user may interact with the system in a meaningful way. Non-limiting examples of a user interface module include a HTML player, client server application, Java script application. A non-limiting example of an interface module is FlowPlayer 3.1, manufactured by FlowPlayer LTD, Hannuntie 8 D, ESPOO 02360, Helsinki, Finland. Non-limiting examples of a display/interface module may be a display/interface module as described in U.S. Pat. No. 6,272,562, issued to Scott et al.; a touch screen interface module as described in U.S. Pat. No. 5,884,202 and U.S. Pat. No. 6,094,609, issued to Arjomand, which are incorporated for their supported teachings herein. The user interface module may include an input module. Non-limiting examples of an input modules may be a keyboard module as described in U.S. Patent Publication No. 2005/0099394, by Chou et al.; or a keyboard as described in U.S. Patent Publication No. 2006/0250367, by Tabasso et al.

The illustrated media module 220 includes a plurality of media files. Such files may be accessed by one or more modules described herein. Such files may include image files (such as but not limited to files having the extensions jpg, gif, tiff), video files (such as but not limited to files having the extensions mpg, mov, mp4), audio files (such as but not limited to files having the extensions mp3, wav, aiff), text files (such as but not limited to files having the extensions txt, doc, docx), display configuration files, display scripts and the like and combinations thereof. The media module 220 may include an index or other structure for managing or coordinating files. The media module may include a library of files and/or may collect media data into composite files.

The illustrated return module 230 is configured to permit a user to selectably return a display to a previously viewed display page. The return module may include a graphical software object linked to a return command configured to display a previously viewed display page. Such may be accomplished in many ways, including but not limited to being functionally coupled to a display buffer storing previous display data such that when a user selects the graphical software object using an input device, such as by clicking on it with a mouse, the display buffer is accessed and replaces the current page with the previously stored page. In another embodiment, the return command accesses a pointer or other indexing object that is directed to a function that restores display of a previous page. In still another embodiment, an entry associated with a previous page is made on a table and that entry is referenced later when a return command is issued. A display page may cover an entire display area or may only cover a part thereof. Such a module may be similar in function and/or structure to a "back" button of a browser. Non-limiting examples of a return module include a previous screen module as described in U.S. Pat. No. 5,297,253, issued to Meisel; or a display screen module as described in U.S. Patent Publication No. 2009/0172645, by Behrens et al., which are incorporated for their supported teachings herein.

The illustrated data storage module 240 is configured to store data and may include a database and/or a data storage device such as but not limited to a hard drive, flash drive, ROM, RAM, optical drive and the like and combinations thereof. The stored data may be accessible for read, search, structure, associate, and/or write operations as appropriate by one or more of the modules described herein. Non-limiting examples of a storage module include a HP Storage Works P2000 G3 Modular Smart Array System, manufactured by Hewlett-Packard Company, 3000 Hanover Street, Palo Alto, Calif., 94304, USA; a Sony Pocket Bit USB Flash Drive, manufactured by Sony Corporation of America, 550 Madison Avenue, New York, N.Y., 10022, which is incorporated for its supported teachings. Data storage modules may be databases or data files, and the memory storage device may be hard drives or tapes. A non-limiting example of a data base is Filemaker Pro 11, manufactured by Filemaker Inc., 5261 Patrick Henry Dr., Santa Clara, Calif., 95054.

The illustrated user account module 250 is configured to store user information and limit access to the same through a security process. User account information may include a user name, password, nickname, real name, date accessed, date created, past passwords, associated users, user characteristics, system usage data, associations with profiles stored by the system, profile information, and the like and combinations thereof. Limiting access through a security process may include requiring a password to access a user account; only permitting access during certain times of the day or certain days; requiring third-party access approval; restricting access to particular modules; conditionally restricting access to particular modules based on one or more of usage data, time elapsed since account creation, correct answers to questions, completions of tasks, and/or third party approvals and the like and combinations thereof; and the like and combinations thereof. Access may be limited by failing to populate scripts or configuration files with appropriate pointers or index objects, disabling particular user interface commands, not displaying particular options or data and the like and combinations thereof. Non-limiting examples of a user account module include a user account module as described in U.S. Patent Publication No. 2008/0281696, by Whitehead; or a user account module as described in U.S. Patent Publication No. 2010/0257076, by Phenner et al., which is incorporated for their supported teachings herein.

The illustrated sequence management module 260 is functionally coupled to the discovery module and the education module and configured to track module usage. In particular, the sequence management module stores data associated with which content modules and portions thereof have been accessed and/or completed. The sequence management module may also display such information and/or prompt a user to complete particular portions/sections or entire content modules and such may be in accordance with a scripted protocol, schedule, sequence listing or the like.

As a non-limiting example, a sequence module may include a question at the bottom of each page of a content module wherein the user is asked if they are "done" with the particular page. Selecting "done" causes the sequence management module to store a completion record for that particular page. A sequence management module may receive such information from one or more other modules and may manage and/or display the same. The sequence management module may check to see if that is the final completed page of a series and if so marks the entire series as completed. If not, it marks the entire series as partially completed. The completion status of a content series may be displayed on a menu page, such as but not limited to in graphical association with a menu choice for the associated content series. A non-limiting example of such a display includes displaying an empty circle to mean no completions for the series, a half-filled circle for one or more completions but not all completions and a fully filled circle to mean that the series is entirely completed. Non-limiting examples of a sequence management module include a sequence management module as described in U.S. Patent Publication No. 2010/0250220, by Colmenares; or a sequence management apparatus as described in U.S. Pat. No. 7,698,428, issued to Fatula Jr., which is incorporated for their supported teachings herein.

The illustrated module socket module 270 is configured to provide user access to a plurality of additional content modules. In particular, there may be a script for loading a set of additional content modules that may include media files, questions, scripts, conditioning modules, and/or otherwise utilize and/or integrate with one or more modules described herein. Loading such may include appending an identifier for the additional content module to a menu of the user interface and/or associating such a selectable menu item with the content of the additional content module. Loading may also include granting permission, information, and/or control to an additional content module to access one or more stored profiles and/or profile types of the system. Loading may include inserting one or more usage prompt objects in one or more pages of the system such that a user may be offered and/or prompted to access the additional content module at particular points in a process, such as but not limited to at points in a process where usage of the additional content module may facilitate the process.

As a non-limiting example, a user who is prompted to go to a next step of introspection may have difficulty with such if the user is still angry from an event that occurred in their life or otherwise having anger issues and therefore an additional content module assisting with anger processing or management may include instructions for inserting a prompt just before a user moves to a stage where the user should be calm so that users who are angry can access those resources in a useful sequence. Accordingly, a system including a module socket module 270 may be upgraded, adapted, or otherwise altered subsequent to delivery to a customer. Such may be automatic, on purchase of additional content, on association with a particular professional, on a change of user status (such as but not limited to getting older, having children, changing jobs, etc.), and the like and combinations thereof. A module socket module may also include a communication module configured to receive one or more additional content modules over a network and such may be linked to a shopping cart or other access control module. Non-limiting examples of a module socket module include a data socket module may be a programmable data link module as described in U.S. Pat. No. 5,631,854, issued to Riley; or a data link module as described in U.S. Pat. No. 5,870,401, issued to Riley. The illustrated skin module 280 is configured to selectably manage display of a plurality of image files decorating the user interface. In particular, user interfaces generally include portions thereof that are decorative, including but not limited to protected white space, borders, decorative transition elements, selectable graphical objects linked to commands, splash screens, and the like and combinations thereof. A skin module may include instructions for associating particular media files (images, video, sound, fonts, etc.) with such portions and/or for configuring size, space, location of the same. A skin module may include a variety of predefined configuration settings or "skins" whereby the look of the user interface may be altered for beneficial effect. This is particularly useful for a system that is intended to work closely with an individual user and images, formatting, colors, sounds, and the like that are familiar, comfortable, comforting, and/or having particular significance to the user will generally promote more effective use of the system. Non-limiting examples of a skin module include a image management module as described in U.S. Patent Publication No. 2006/0274157, by Levien et al.; or a background skin service module as described in U.S. Patent Publication No. 2007/0153083, by Choi, which is incorporated for their supported teachings herein.

Figure 3:
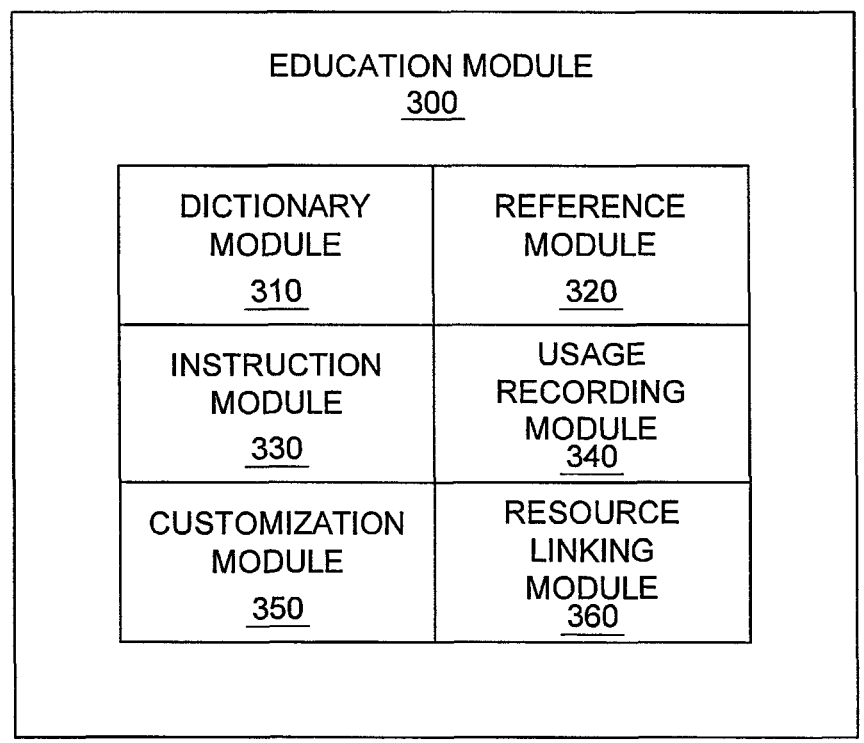
FIG. 3 is a module diagram showing an education module of a system for facilitating personal development using a computing device, according to one embodiment of the invention.

FIG. 3 is a module diagram showing an education module of a system for facilitating personal development using a computing device, according to one embodiment of the invention. An education module 300 may be operatively coupled to a user interface module and/or may be configured to educate a user. There is shown a dictionary module 310, a reference module 320, an instruction module 330, a usage recording module 340, a customization module 350, and a resource linking module 360 of an education module 300. Each of the modules may be in functional communication with one or more other modules of the user interface module and/or with one or more other modules described herein. Such communication may include passing data, sharing data structures/storage, altering another module, being altered by another module, or the like and combinations thereof. The illustrated modules generate an interactive user interface that permits a user to utilize and/or explore the materials and content associated therewith in a manner that facilitates the use and benefits thereof.

The illustrated dictionary module 310 is configured to serve definitional information on request. In particular, a dictionary module may include a data set correlating words/phrases/symbols/etc. with associated meanings/definitions, wherein the meanings and definitions may be accessed, served, delivered, displayed, or etc. on request/query. Such a request may be initiated by the dictionary module or another module and may be in response to a user action, such as but not limited to clicking on a word or symbol displayed on a page. A dictionary module may store a return point or page pointer on activation so that a user may return to a previous page after viewing the requested material. A dictionary module may permit browsing of associated, linked, similar, or otherwise correlated material once the requested information is displayed. Non-limiting examples of a dictionary module include a searching module in correlation with a dictionary database as described in U.S. Patent Publication No. 2011/0055263, by Chiu; or a electronic dictionary with plug-in module intelligence, as described in U.S. Pat. No. 4,218,760, issued to Levy, which is incorporated for their supported teachings herein.

The illustrated reference module 320 is configured to serve reference information upon request. In particular, a reference module may include a data set correlating words/phrases/symbols/etc. with associated media files, wherein the content may be accessed, served, delivered, displayed, or etc. on request/query. Such a request may be initiated by the reference module or another module and may be in response to a user action, such as but not limited to clicking on a word or symbol displayed on a page. A reference module may store a return point or page pointer on activation so that a user may return to a previous page after viewing the requested material. A reference module may permit browsing of associated, linked, similar, or otherwise correlated material once the requested information is displayed. Non-limiting examples of a reference module include a system for accessing, organizing, and presenting data described in U.S. Patent Publication No. 2002/0169789, by Kutay et al.; or a dynamic data referencing module as described in U.S. Pat. No. 5,960,441, issued to Bland et al.

The illustrated instruction module 330 is configured to provide instructions for a user to carry out specific tasks. In particular, a instruction module may include a data set correlating words/phrases/symbols/etc. with associated instructions/checklists/process walk-throughs/etc., wherein the instructions/etc. may be accessed, served, delivered, displayed, or etc. on request/query. Such a request may be initiated by the instruction module or another module and may be in response to a user action, such as but not limited to clicking on a word displayed on a page. An instruction module may store a return point or page pointer on activation so that a user may return to a previous page after viewing the requested material. An instruction module may permit browsing of associated, linked, similar, or otherwise correlated material once the requested information is displayed. Non-limiting examples of an instruction module include an instructions module as described in U.S. Patent Publication No. 2009/0164726, by Skowronek; or an instructions module as described in U.S. Patent Publication No. 2006/0080059, by Stupp et al.

The illustrated usage recording module 340 is configured to record usage of content and/or report usage of content to another module, such as but not limited to a sequence management module. In particular, a usage recording module may make entries on a table, flag objects, toggle database entries, generate records, and the like and combinations thereof when trigger conditions are met. Trigger conditions may include a user marking a section "DONE," answering a question, activating display of particular content, answering a series/set of questions, displaying a final frame of a video, completely listening to an audio file, and the like and combinations thereof. Such information may be recorded and/or passed to another module for use thereof. Accordingly, a system including a usage recording module may track and/or record usage of content thereof.

The illustrated customization module 350 includes a plurality of alternatively selectable content sets, data sets, database records, and/or media files grouped according to appropriateness to a particular characteristic of user. Such alternatively selectable content may be utilized within a master framework such that a user is presented with facilitation materials that are particularly adapted to them. User characteristics may be gathered, extracted, stored, inferred, or the like by other modules and the customization module may utilize such stored information to replace/displace/correct/adjust/etc. material that is to be displayed/presented such that the material better matches the characteristic. Non-limiting examples of such characteristics include race, age, gender, family status, primary relationships, specific issues to be addressed, language, occupation, religion, political persuasion, and the like and combinations thereof. As a non-limiting example, content may be provided in a gender biased manner wherein a particular user may be referred to as "she" in questions and other displayed/heard content. As another non-limiting example, questions about how a user treats their children may be replaced with questions about how they treat their siblings and/or friends for a user that has no children. Accordingly, a system including a customization module may provide an improved and more relevant experience to a plurality of diverse users.

The illustrated resource linking module 360 is configured to link and/or associate resources together and to store such links and provide access thereto to other modules so that associated materials may be accessible together when desired. In particular, a resource linking module may include a table of entries associated with particular resources (files, dictionary entries, data points, questions, question sets, and the like) such that if a query is performed against a particular item, the associated items may be retrieved for use and possible display/presentment or offer of display/presentment. Accordingly, a system including a resource linking module may be able to permit a user to browse through similar materials in a manner that promotes learning and/or self-discovery.

Figure 4:
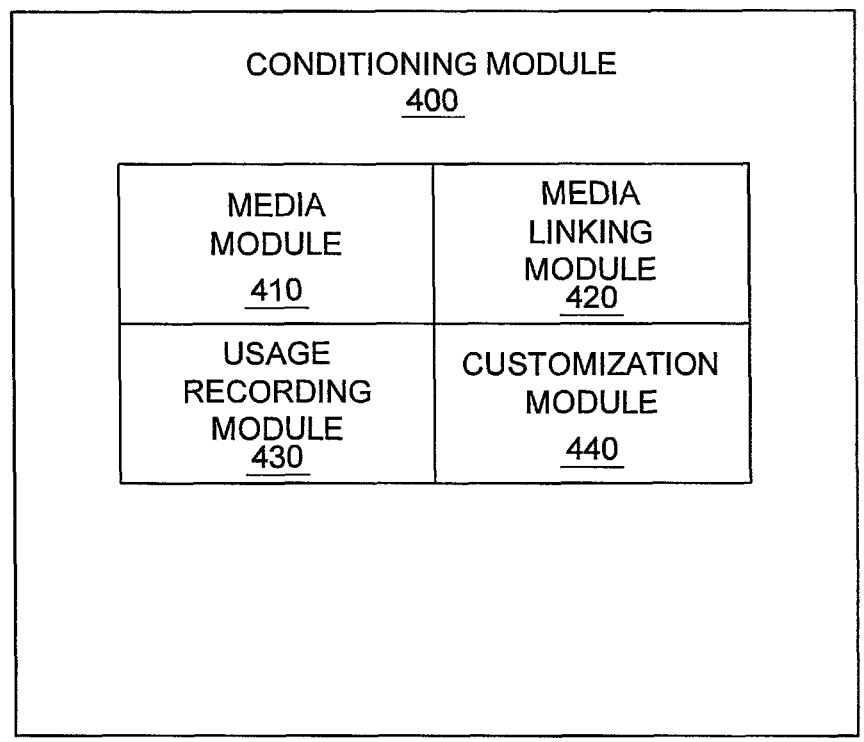
FIG. 4 is a module diagram showing a conditioning module of a system for facilitating personal development using a computing device, according to one embodiment of the invention.

FIG. 4 is a module diagram showing a conditioning module of a system for facilitating personal development using a computing device, according to one embodiment of the invention. There is shown a conditioning module 400 that may be operatively coupled to the user interface module and/or configured to influence a user. The illustrated conditioning module 400 includes a media module 410, a media linking module 420, a usage recording module 430, and a customization module 440. Each of the modules may be in functional communication with one or more other modules of the user interface module and/or with one or more other modules described herein. Such communication may include passing data, sharing data structures/storage, altering another module, being altered by another module, or the like and combinations thereof. The illustrated modules generate an interactive user interface that permits a user to utilize and/or explore the materials and content associated therewith in a manner that facilitates the use and benefits thereof.

The illustrated media module 410 includes a plurality of media files and/or media content. In particular, there may be a database, file library, composite data file, or the like or combinations thereof that may include data sufficient to provide a plurality of media experiences such as but not limited to audio clips, video clips, text segments, and the like and combinations thereof. Such a media module may be similar in any respect to the media module of the user interface module and vice versa.

The illustrated media linking module 420 is functionally coupled to the media module and/or is configured to sequence a plurality of media files. Such a module may be configured to link and/or associate media resources together and to store such links and provide access thereto to other modules so that associated materials may be accessible together when desired. Media so linked may be combined in series or in parallel, such as but not limited to audio files tracks that are registered with each other. In particular, a resource linking module may include a table of entries associated with particular resources (files, dictionary entries, data points, questions, question sets, and the like) such that if a query is performed against a particular item, the associated items may be retrieved for use and possible display/presentment or offer of display/presentment. Accordingly, a system including a media linking module may be able to permit a user to browse through similar materials in a manner that promotes learning and/or self-discovery and/or may provide associated media experiences and/or combined media experiences that may include multimedia effects.

The illustrated usage recording module 430 is functionally coupled to the media module and/or configured to store completion data regarding served media files. The illustrated usage recording module 340 may be configured to record usage of content and/or report usage of content to another module, such as but not limited to a sequence management module. In particular, a usage recording module may make entries on a table, flag objects, toggle database entries, generate records, and the like and combinations thereof when trigger conditions are met. Trigger conditions may include a user marking a section "DONE," answering a question, activating display of particular content, answering a series/set of questions, displaying a final frame of a video, completely listening to an audio file, and the like and combinations thereof. Such information may be recorded and/or passed to another module for use thereof. Accordingly, a system including a usage recording module may track and/or record usage of content thereof.

The illustrated customization module 440 includes a plurality of alternatively selectable content sets, data sets, database records, and/or media files grouped according to appropriateness to a particular characteristic of user. Such alternatively selectable content may be utilized within a master framework such that a user is presented with facilitation materials that are particularly adapted to them. User characteristics may be gathered, extracted, stored, inferred, or the like by other modules and the customization module may utilize such stored information to replace/displace/correct/adjust/etc. material that is to be displayed/presented such that the material better matches the characteristic. Non-limiting examples of such characteristics include race, age, gender, family status, primary relationships, specific issues to be addressed, language, occupation, religion, political persuasion, and the like and combinations thereof. As a non-limiting example, content may be provided in a gender biased manner a particular user may be referred to in an audio file as "she" or "her." As another non-limiting example, background music of a visualization may be provided that best matches relaxing music from a cultural background of a user. Accordingly, a system including a customization module may provide an improved and more relevant experience to a plurality of diverse users.

Figure 5:
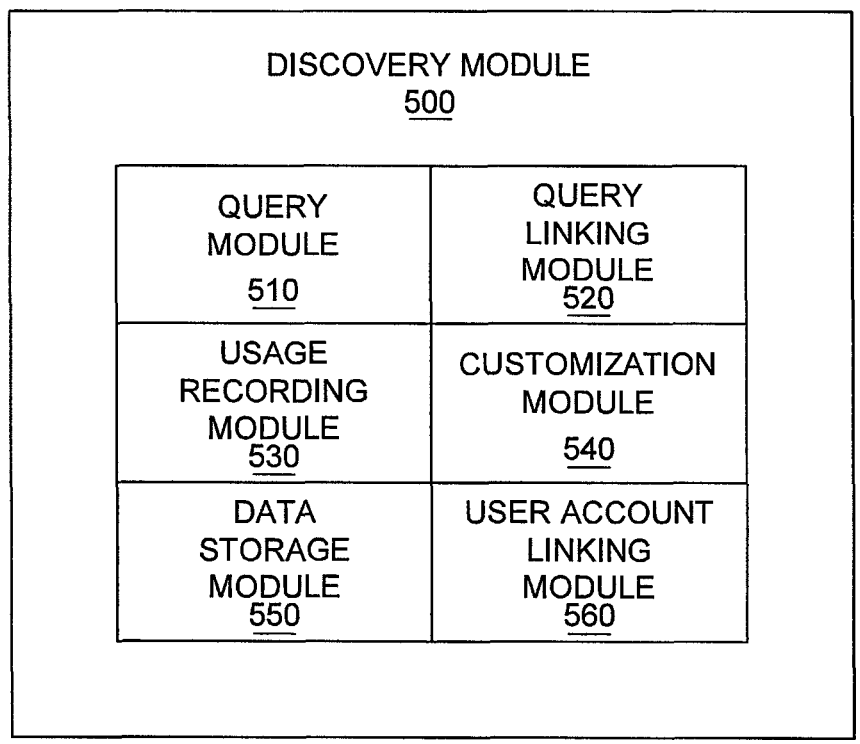
FIG. 5 is a module diagram showing a discovery module of a system for facilitating personal development using a computing device, according to one embodiment of the invention.

FIG. 5 is a module diagram showing a discovery module of a system for facilitating personal development using a computing device, according to one embodiment of the invention. There is shown a discovery module 500 that may be operatively coupled to the user interface module and/or configured to extract and store information from a user. The illustrated discovery module 500 includes a query module 510, a query linking module 520, a usage recording module 530, a customization module 540, a data storage module 550, and a user account linking module 560. Each of the modules may be in functional communication with one or more other modules of the user interface module and/or with one or more other modules described herein. Such communication may include passing data, sharing data structures/storage, altering another module, being altered by another module, or the like and combinations thereof. The illustrated modules generate an interactive user interface that permits a user to utilize and/or explore the materials and content associated therewith in a manner that facilitates the use and benefits thereof.

The illustrated query module 510 may be configured to serve a plurality of questions and/or receive answers to the same. In particular, such a module may include instructions for retrieving and serving questions through a user interface and instructions for receiving feedback therefrom. Questions may be associated with selectable predetermined answers, free-type responses, alternatively selectable responses, selectable predetermined answers selected from a list of previously selected answers to a different question, selectable predetermined answers selected by computation and/or processing of previously received data, or the like or combinations thereof. A non-limiting example includes a question about how a person feels associated with checkbox selectable responses of a list of possible feelings wherein inconsistent feelings are mutually selectable and further including a free-type box where a user may type in any response desired. Such a question may be served graphically and/or audibly in association with the response choices and a user may be given the opportunity, through a user interface, to select and/or provide answers to the associated question. Such answers may be stored in association with the question and/or in association with another profile, database, data set, data record, account or the like or combinations thereof. Accordingly, a system including a query module may extract information from a user in a useful manner.

The illustrated query linking module 520 may be functionally coupled to the query module and/or be configured to sequence a plurality of questions. Such a module may be configured to link and/or associate query resources together and to store such links and provide access thereto to other modules so that associated materials may be accessible together when desired. In particular, a query linking module may include a table of entries associated with particular resources (files, dictionary entries, data points, questions, question sets, and the like) such that if a query is performed against a particular item, the associated items may be retrieved for use and possible display/presentment or offer of display/presentment. Accordingly, a system including a query linking module may be able to permit a user to browse through similar materials in a manner that promotes learning and/or self-discovery and/or may provide associated media experiences and/or combined media experiences that may include multimedia effects.

The illustrated usage recording module 530 may be functionally coupled to the query module and/or be configured to store completion data regarding asked questions. The illustrated usage recording module may be configured to record usage of content and/or report usage of content to another module, such as but not limited to a sequence management module. In particular, a usage recording module may make entries on a table, flag objects, toggle database entries, generate records, and the like and combinations thereof when trigger conditions are met. Trigger conditions may include a user marking a section "DONE," answering a question, activating display of particular content, answering a series/set of questions, displaying a final frame of a video, completely listening to an audio file, and the like and combinations thereof. Such information may be recorded and/or passed to another module for use thereof. Accordingly, a system including a usage recording module may track and/or record usage of content thereof.

The illustrated customization module 540 includes a plurality of alternatively selectable question sets, data sets, database records, and/or associated media files grouped according to appropriateness to a particular characteristic of user. Such alternatively selectable content may be utilized within a master framework such that a user is presented with facilitation materials that are particularly adapted to them. User characteristics may be gathered, extracted, stored, inferred, or the like by other modules and the customization module may utilize such stored information to replace/displace/correct/ adjust/etc. material that is to be displayed/presented such that the material better matches the characteristic. Non-limiting examples of such characteristics include race, age, gender, family status, primary relationships, specific issues to be addressed, language, occupation, religion, political persuasion, and the like and combinations thereof. A customization module may be configured to read a user characteristic from a user profile and selectably deliver a subset of question phrasings adapted to the user characteristic. As a non-limiting example, content may be provided in a gender biased manner wherein a particular user may be referred to in questions as "she" or "her." As another non-limiting example, questions about family behavior may be presented in lists and answer choices that better match a cultural background of a user. Accordingly, a system including a customization module may provide an improved and more relevant experience to a plurality of diverse users.

The illustrated data storage module 550 may be in communication with the query module and/or configured to store answers. The illustrated data storage module is configured to store data and may include a database and/or a data storage device such as but not limited to a hard drive, flash drive, ROM, RAM, optical drive and the like and combinations thereof. The stored data may be accessible for read, search, structure, associate, and/or write operations as appropriate by one or more of the modules described herein. Non-limiting examples of a storage module include a HP Storage Works P2000 G3 Modular Smart Array System, manufactured by Hewlett-Packard Company, 3000 Hanover Street, Palo Alto, Calif., 94304, USA; a Sony Pocket Bit USB Flash Drive, manufactured by Sony Corporation of America, 550 Madison Avenue, New York, N.Y., 10022, which is incorporated for its supported teachings. Data storage modules may be databases or data files, and the memory storage device may be hard drives or tapes. A non-limiting example of a data base is Filemaker Pro 11, manufactured by Filemaker Inc., 5261 Patrick Henry Dr., Santa Clara, Calif., 95054.

The illustrated user account linking module 560 may be configured to link and/or associate user account resources together and to store such links and provide access thereto to other modules so that associated materials may be accessible together when desired. Such resources include but are not limited to user accounts, journal entries, issue profiles, feeling profiles, result profiles, action profiles, and the like and combinations thereof. User account resources so linked may be combined in series or in parallel and may be displayed/proffered in series or in parallel. In particular, a user account linking module may include a table of entries associated with particular resources (files, dictionary entries, data points, questions, question sets, answers to questions, and the like) such that if a query is performed against a particular item, the associated items may be retrieved for use and possible display/presentment or offer of display/presentment. Accordingly, a system including a media linking module may be able to permit a user to browse through similar materials in a manner that promotes learning and/or self-discovery and/or may provide associated media experiences and/or combined media experiences that may include multimedia effects.

Figure 6:
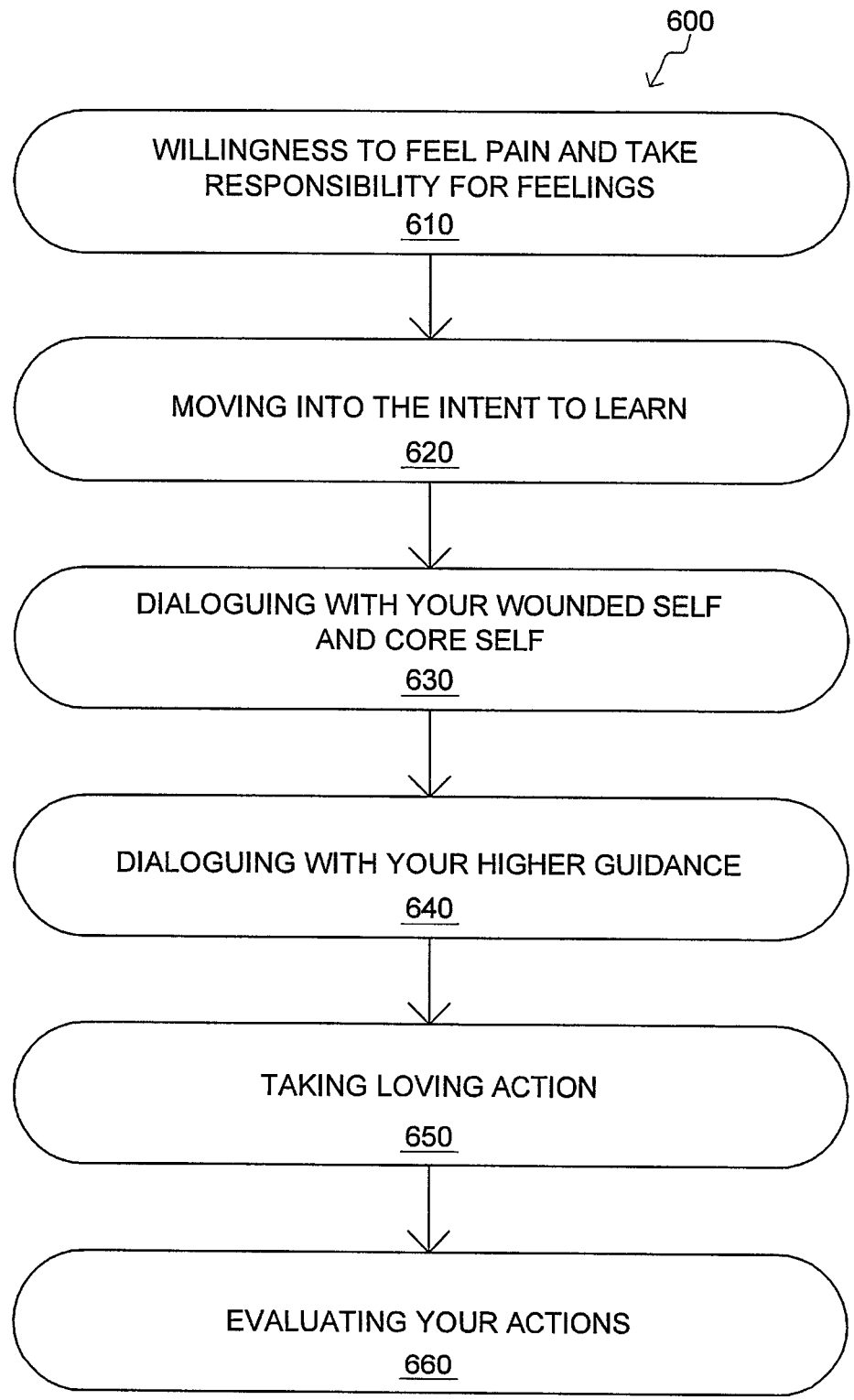
FIG. 6 is a flow diagram showing a process for facilitating personal development using a computing device, according to one embodiment of the invention.

FIG. 6 is a flow diagram showing a process for facilitating personal development using a computing device, according to one embodiment of the invention. Each of the illustrated steps of the process 600 are configured to facilitate personal development, self-awareness, personal growth, issue resolution, and the like and combinations thereof. Each of the illustrated steps may be facilitated by a system, such as that described herein. Each of the illustrated steps may be facilitated by a machine, computing device, processor, display, database, module, or the like or combinations thereof performing, enabling, facilitating, recording, proffering, guiding, and/or inducing one or more sub-steps thereof. While the steps are numbered herein and given in a particular order, it is understood that the steps may be completed in any order and that a user may move and/or cycle between steps and that such may be iterative. Such device/software involvement may take the form of asking questions, providing educational content, providing conditioning media, providing answers to previous questions, and the like and combinations thereof.

Step One: Willingness to Feel Pain and Take Responsibility for Your Feelings 610.

In this step, the user moves into the present moment and focuses within, tuning into ones feelings, the physical sensations within the body. The user chooses to be mindful of and pay attention to all distressing feelings rather than protect against them with substance and process addictions. The user makes a conscious decision that they want to take responsibility for their feelings.

Step Two: Move into the Intent to Learn 620.

In this step the user invites the compassionate presence of spirit into their heart to help them learn what they may be doing or thinking that may be causing them pain, or what may be happening externally that needs attention. In such inner bonding there are only two possible intents in any given moment:

1) to protect against pain and avoid responsibility for it through trying to control yourself and others; and
2) to learn about what you are doing or thinking that may be causing your pain so that you can move into loving yourself and others.

When a user is in the "intent to learn" state of mind, they are a loving adult. When they are are in the "intent to protect and avoid" state of mind they are operating from the shame-based egocentric wounded self, or child-adult. In Step Two, a user welcomes and embraces all their feelings with compassion.

Step Three: Dialogue with the Wounded Self and Core Self 630.

In this step, the user discovers the thoughts/false beliefs from the wounded self that may be causing shame, fear and pain. The user is taught to and/or practices releasing anger and pain in appropriate ways; learning about the past that created the false beliefs; nurturing the wounded self; exploring what may be happening with a person or event that is causing core feelings of loneliness, heartache, heartbreak, helplessness, or grief; and/or exploring the core self and what brings them joy.

Step Four: Dialogue with Your Higher Guidance 640.

In this step, a user asks their spiritual guidance (whatever that is for them) one or more of the following questions and/or questions of a similar nature:

a) What is the truth about the thoughts/false beliefs you may have uncovered in Step Three?
b) What is the loving behavior toward yourself in this situation?
c) What is in your highest good?
d) What is kind to yourself?

The user is taught to and practices being open and allowing the answers to come through them in words, pictures or feelings. The answers may not come immediately, but if the user has a sincere desire to learn, they will come.

Step Five: Take Loving Action 650.

In this step the user tells themself the truth and takes the loving actions that came through from their guidance in Step Four. This step puts God/Spirit/Energy/etc. into action. The user may consciously move into gratitude for guidance that is always here for them.

Step Six: Evaluate Your Action 660.

In this step the user checks to see if their pain, anger and shame are being healed. If not, the user goes back through the steps until they discover the truth and actions that bring them peace, joy, and a deep sense of intrinsic worth.

In one non-limiting example, such steps may be embodied in a method for facilitating personal development using a computing device by providing non-transitory machine-readable instructions on a tangible medium to perform a plurality of steps. The following steps may be performed by a system that may include one or more modules described herein.

There may be a step of generating a machine-readable foundation profile by performing sub-steps, including i) querying a user through a user interface module in regards to facts about themselves including their false beliefs; ii) providing a user access to an education module and a discovery module through context relevant links during a querying process; and/or iii) storing answers to queries in association with a user as a foundation profile in a memory storage module of a discovery module.

There may be a step of guiding a user through a process of issue resolution by a module that performs sub-steps, including: i) querying a user in regards to a specific situation, storing answers to such queries as a machine-readable situation profile; ii) teaching a user in regards to taking responsibility for their feelings, querying a user about their feelings in regards to the situation profile, and/or storing answers to such queries as a machine-readable feeling profile associated with the situation profile; iii) teaching a user about having an intent to learn by displaying media related thereto; iv) managing a self-dialogue within the user by displaying, on a display device, an answer stored in the feeling profile, querying a user about the displayed answer, querying a user about the actions and beliefs that are associated with the displayed answer, and/or teaching the user techniques for productive self-dialogue; v) managing an inner guidance dialogue within the user by teaching the user techniques for productive inner guidance dialogue, displaying an answer stored in any one of the foundation profile, situation profile, and/or feelings profile, querying the user about solutions associated with the displayed answer, suggesting a plurality of actions, and/or storing a representation of an intended action as a machine-readable action profile; vi) facilitating a user taking action by displaying an intended action from the action profile, and/or teaching the user how to productively take action; and/or vii) facilitating self-evaluation by the user of the effectiveness of a taken action by teaching the user about effective actions, and/or querying the user about the feelings resulting from the taken action.

One or more of the following may also be performed by a module, computing device, processor, display device or the like or combinations thereof: displaying at least one answer from the situation profile as a header during performance of a sub-step of guiding a user through a process of conflict resolution; wherein specific sub-steps are performed only on user activation of the same; generating and displaying a link to a sub-step associated with the generation of an incomplete profile when a sub-step attempts to display data from the incomplete profile; recording completed sub-steps as machine-readable tracking profile; storing a display page history including an index of recently displayed interface pages and providing a user selectable interface that returns the display to a previously displayed interface page; wherein a user interface module is platform independent; providing a link to an audio file including a visualization exercise; wherein a step of querying includes providing a list of non-exclusively selectable answers; wherein a step of querying includes providing a free answer form; providing a master interface configured to permit a user to navigate between sub-steps, the master interface including a bookmark module configured to selectably record a page location for later retrieval; and/or providing access to a multimedia educational module.

Figure 7:
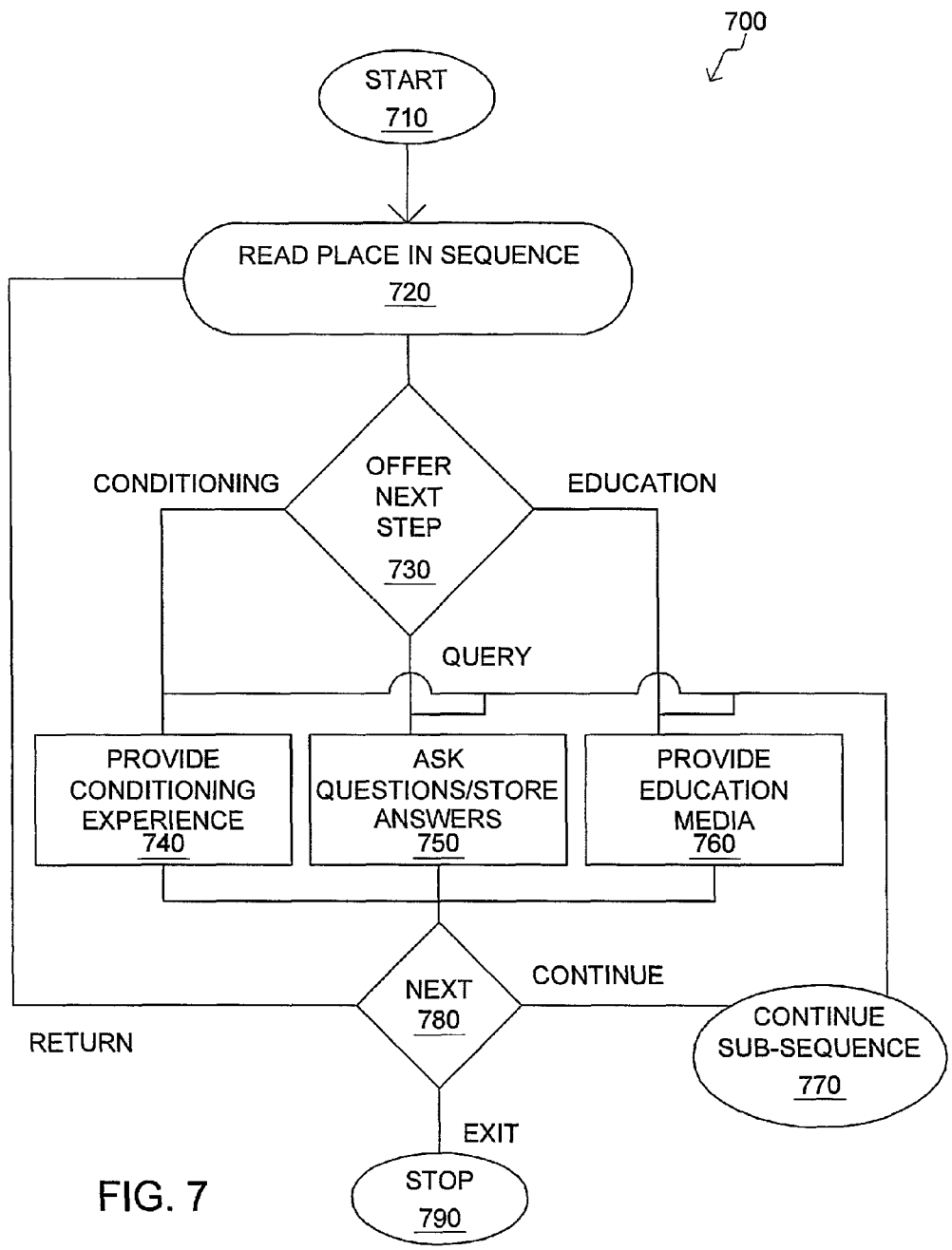
FIG. 7 is a flowchart showing an interface management process for facilitating personal development using a computing device, according to one embodiment of the invention.

FIG. 7 is a flowchart showing an interface management process 700 for facilitating personal development using a computing device, according to one embodiment of the invention. In particular, a system for facilitating personal development, such as but not limited to the system described herein, may start/initiate 710 then read a place in a facilitation sequence 720, such as but not limited to checking a table for an index value of a particular content page, question to be asked, or other "page" to display; and/or merely referencing an index value of a selected content page selected by a user from a menu of a user interface.

A "next step" may be offered 730 to the user through the user interface, such as but not limited to by providing a hyperlink "next" button; providing a menu choice outlining a next step to be performed; providing a menu showing symbols indicating completed, partially completed, and not-started steps; and the like and combinations thereof. Such a next step may involve one or more of conditioning, query, and/or education. Wherein conditioning is involved, the system may provide a conditioning experience 740. Where a query is involved, the system may ask one or more questions 750 and/or store answers to the same. Where education is involved, the system may provide education media 760.

FIGS. 9-45 illustrate graphical examples of such. The system then automatically and/or on selection by a user determines and/or provides a "next" step 780, which may include a subsequent sub-step and/or a continuation of a sub-sequence 770 in the case of steps/content/materials/ modules/ etc. that may be linked by a linking module and/or a master format. Where additional steps are to be taken, the system serves the same to the user by providing one or more of conditioning 740, questions 750, and/or education 760. Where a user selects to return to a previous "page" the system may identify the previous page 720 and serve the same to the user. Where the user desires to quit, the system may stop 790.

Figure 8:
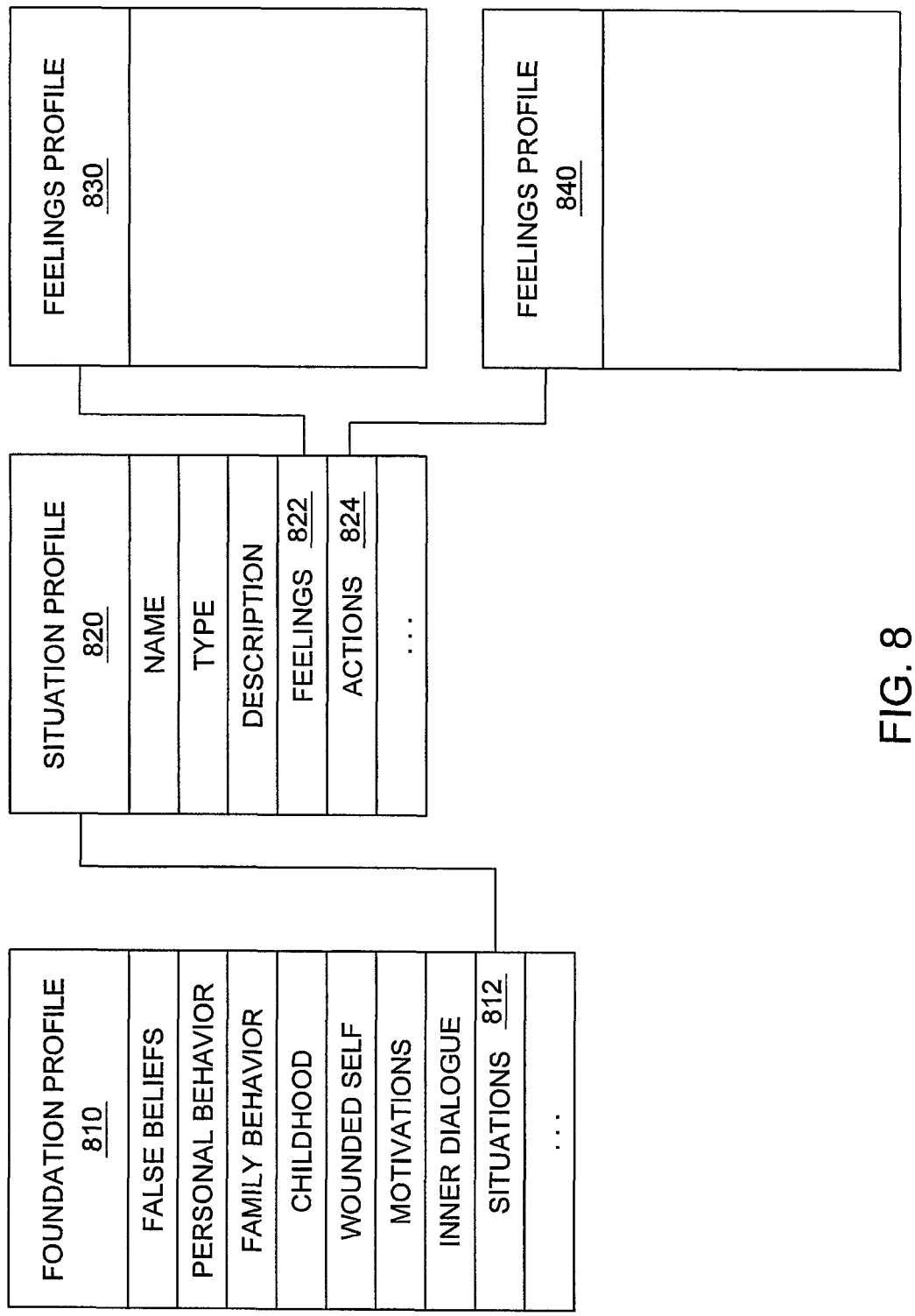
FIG. 8 is a data diagram illustrating a data structure of a system for facilitating personal development using a computing device, according to one embodiment of the invention.
Figure 9:
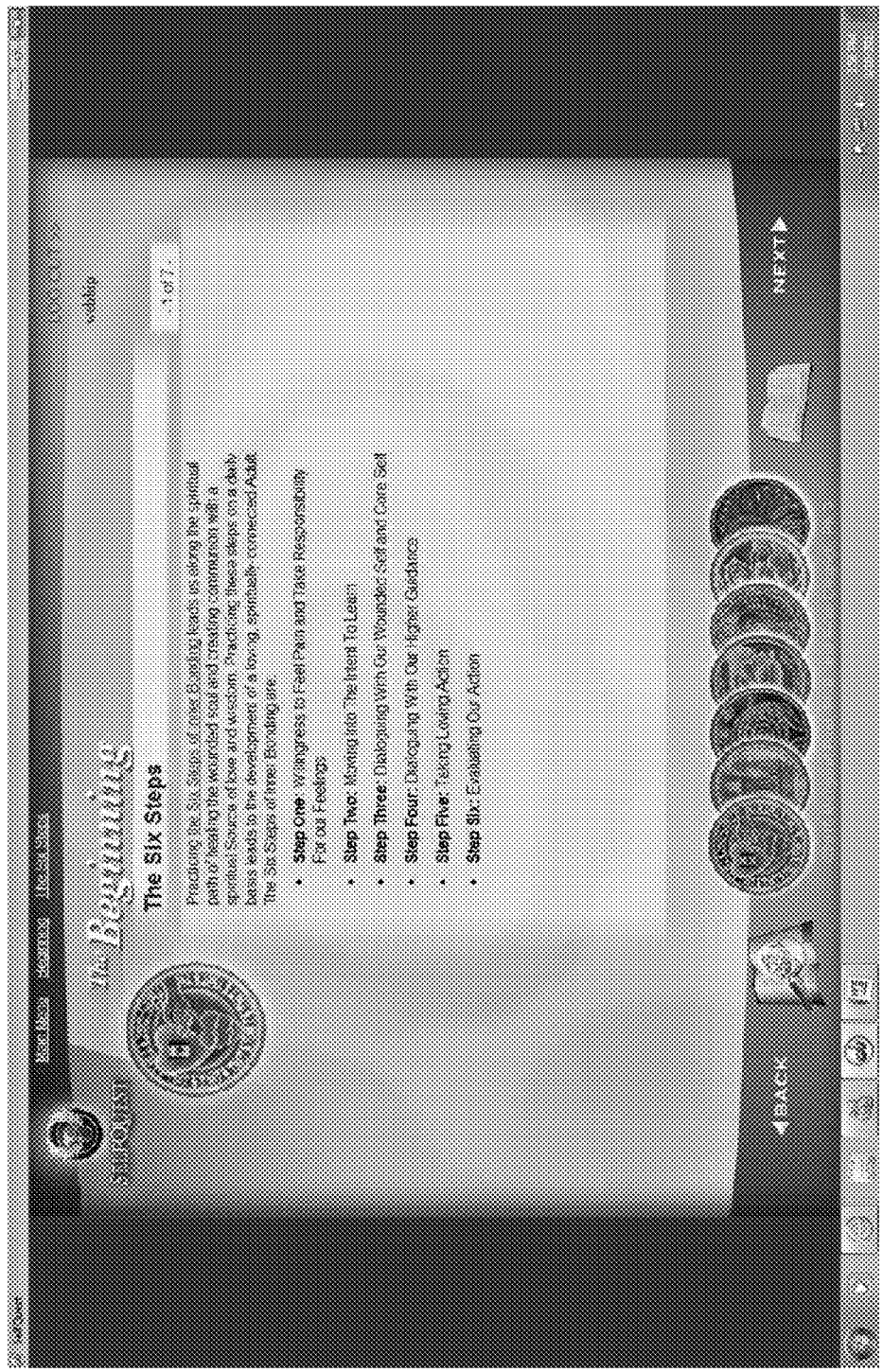
FIGS. 9-45 are exemplary screenshots of a user interface display of a system and method for facilitating personal development using a computing device, according to one embodiment of the invention.
Figure 10:
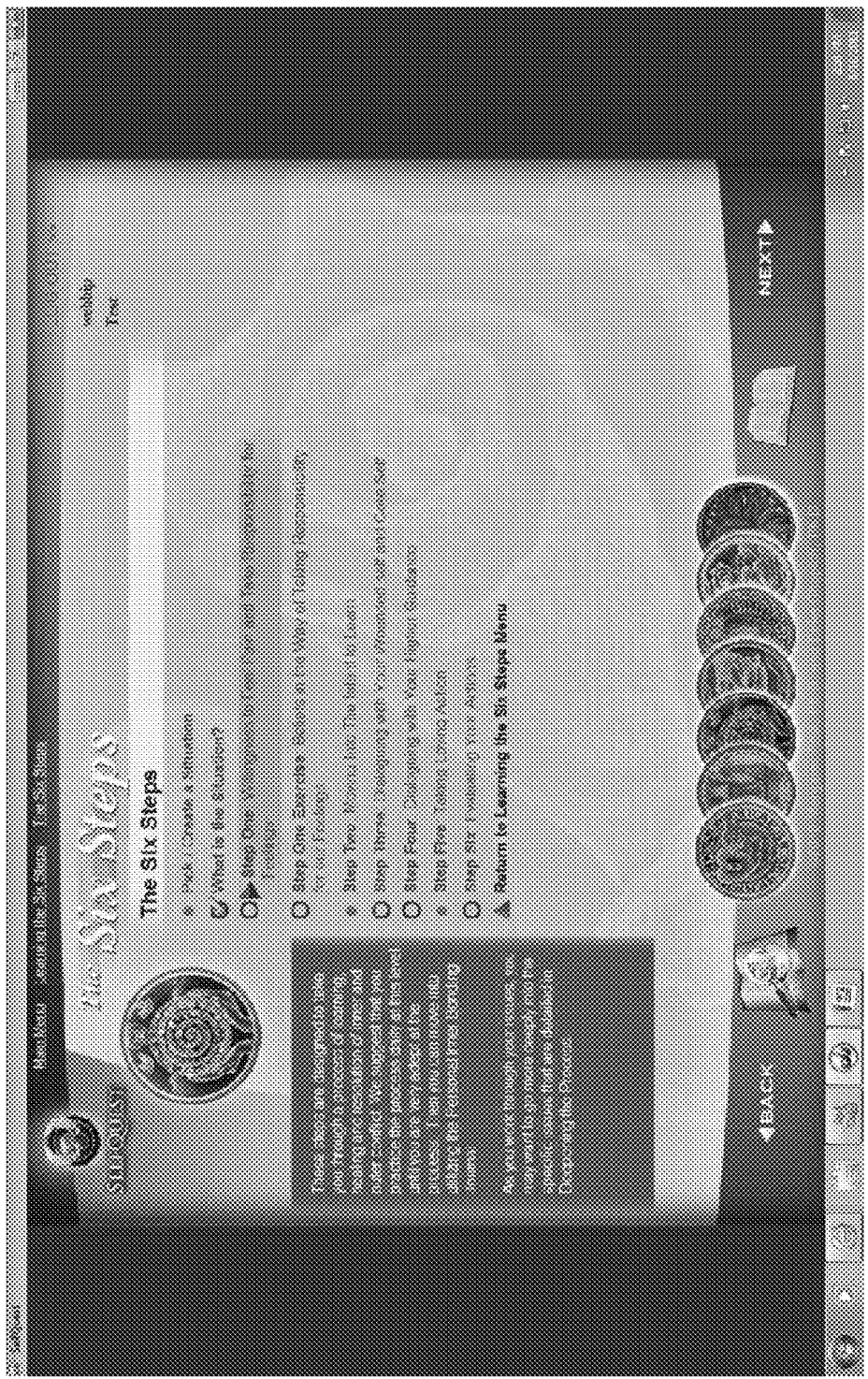
Figure 11:
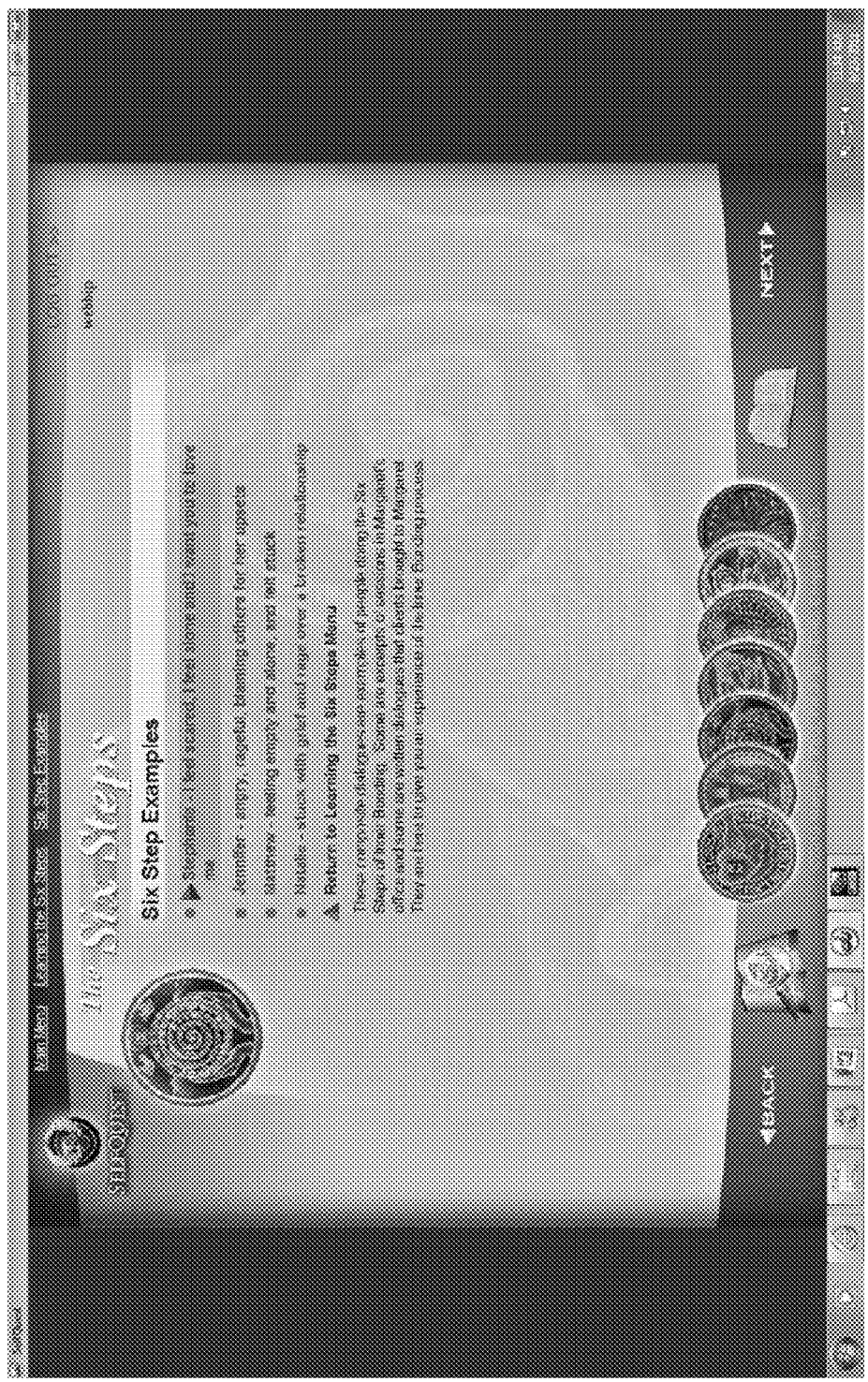
Figure 12:
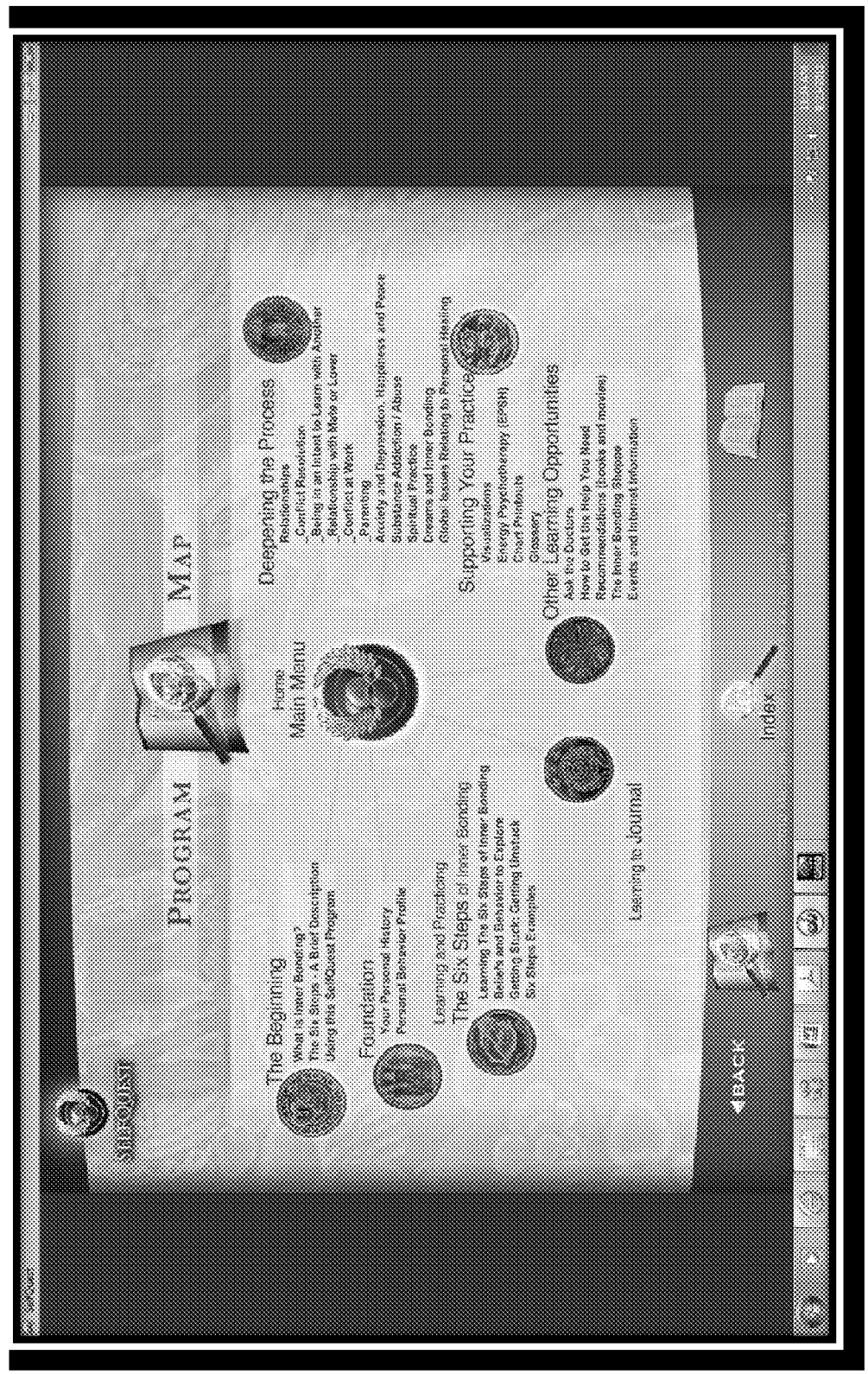
Figure 13:
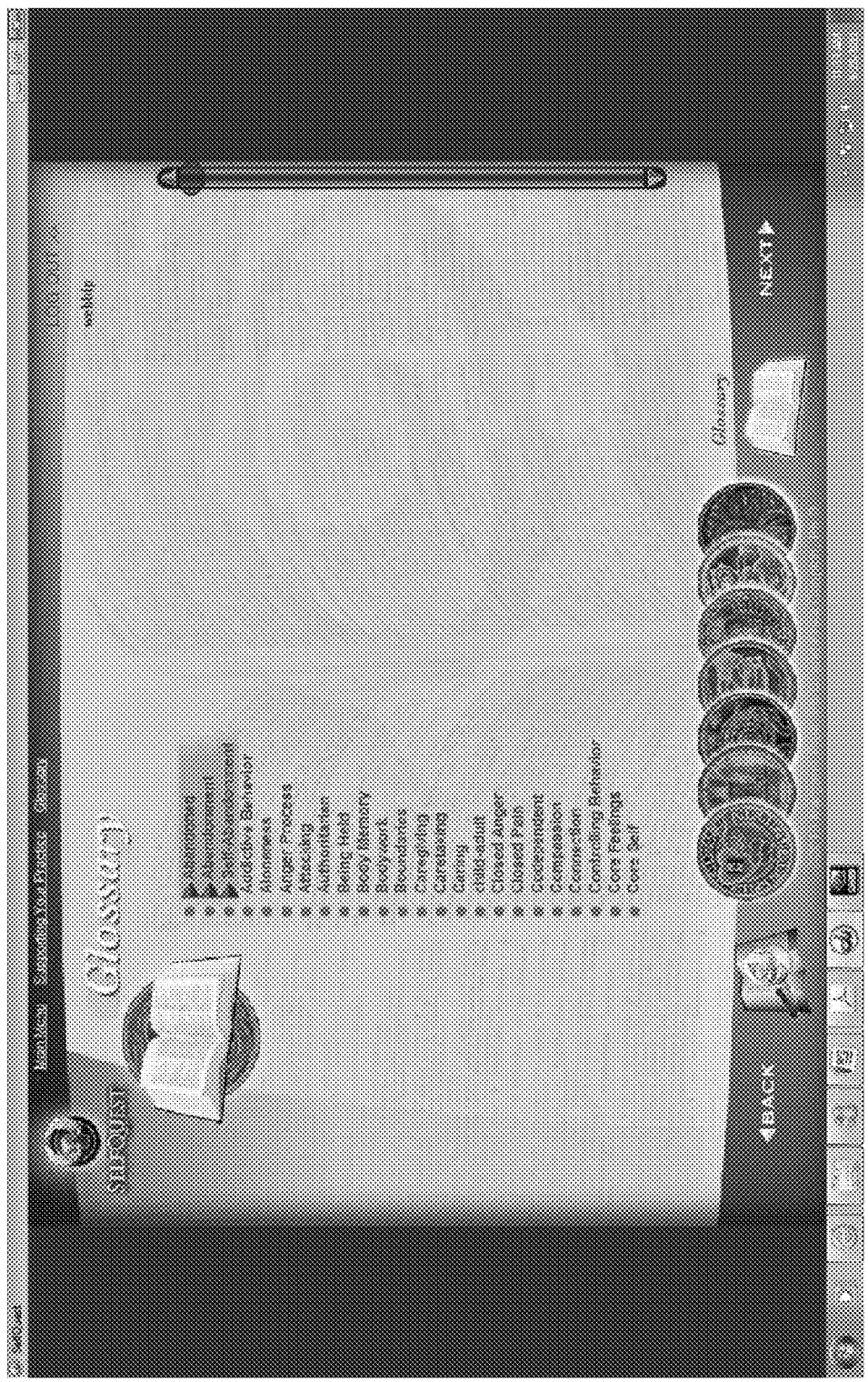
Figure 14:
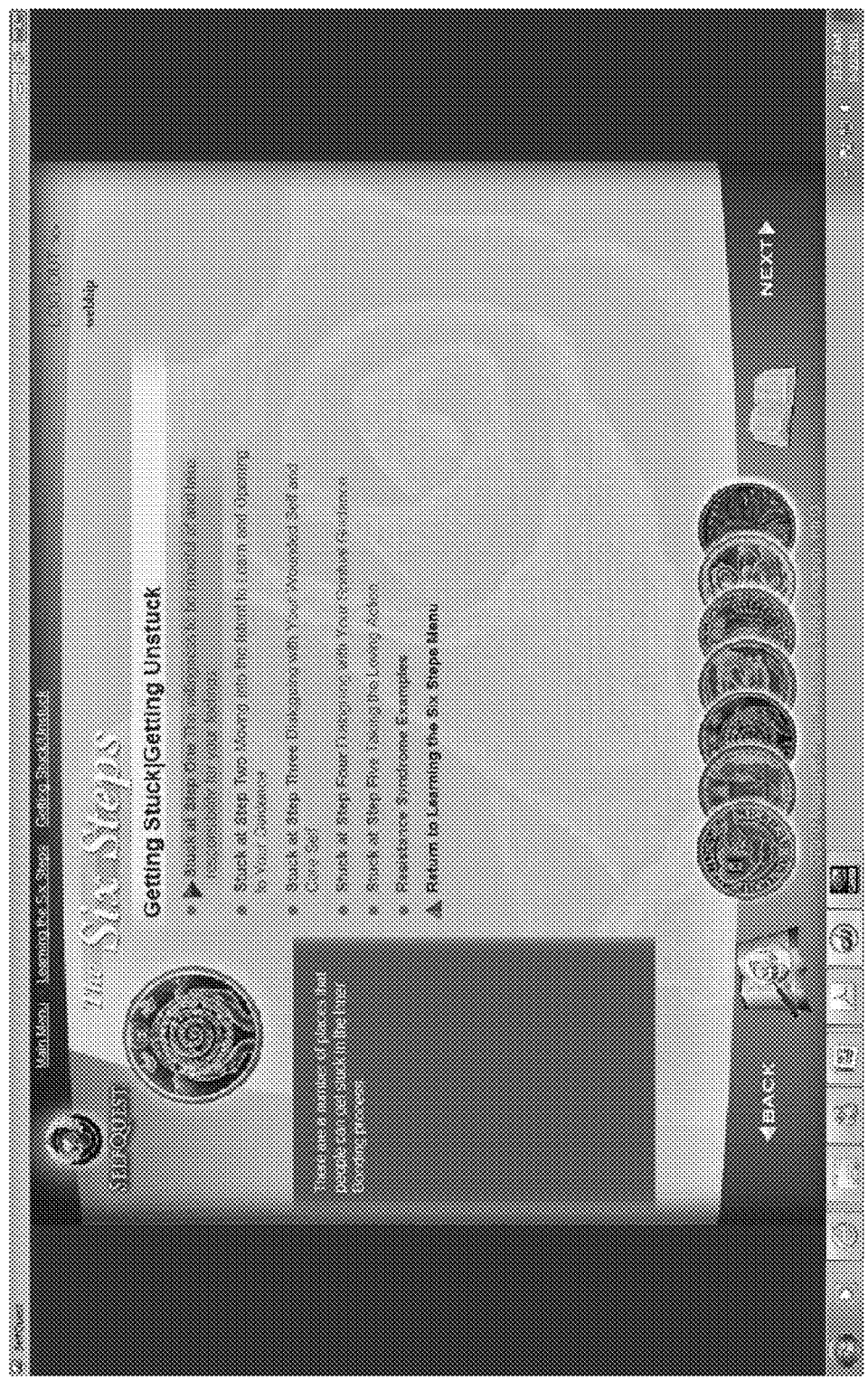
Figure 15:
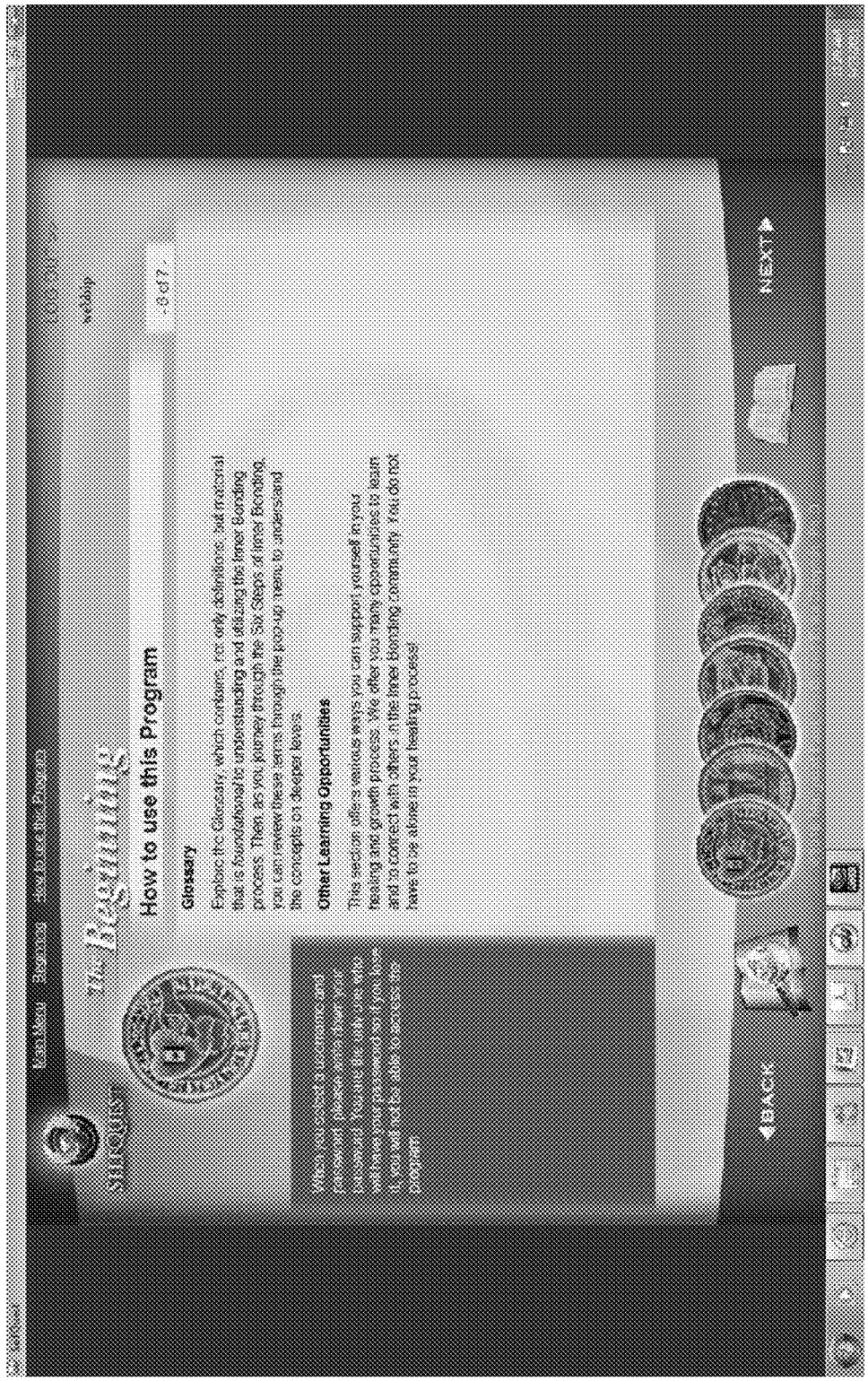
Figure 16:
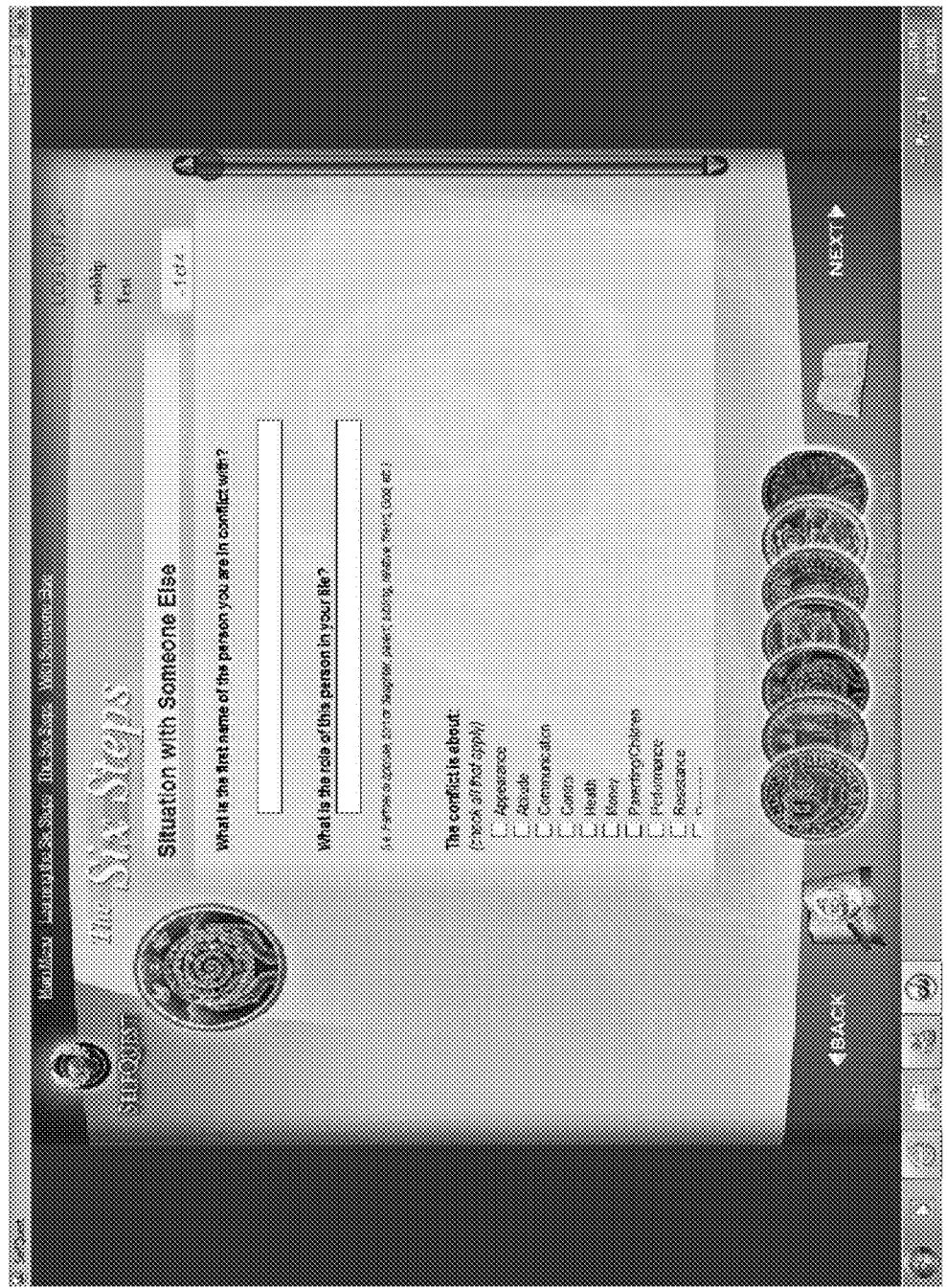
Figure 17:
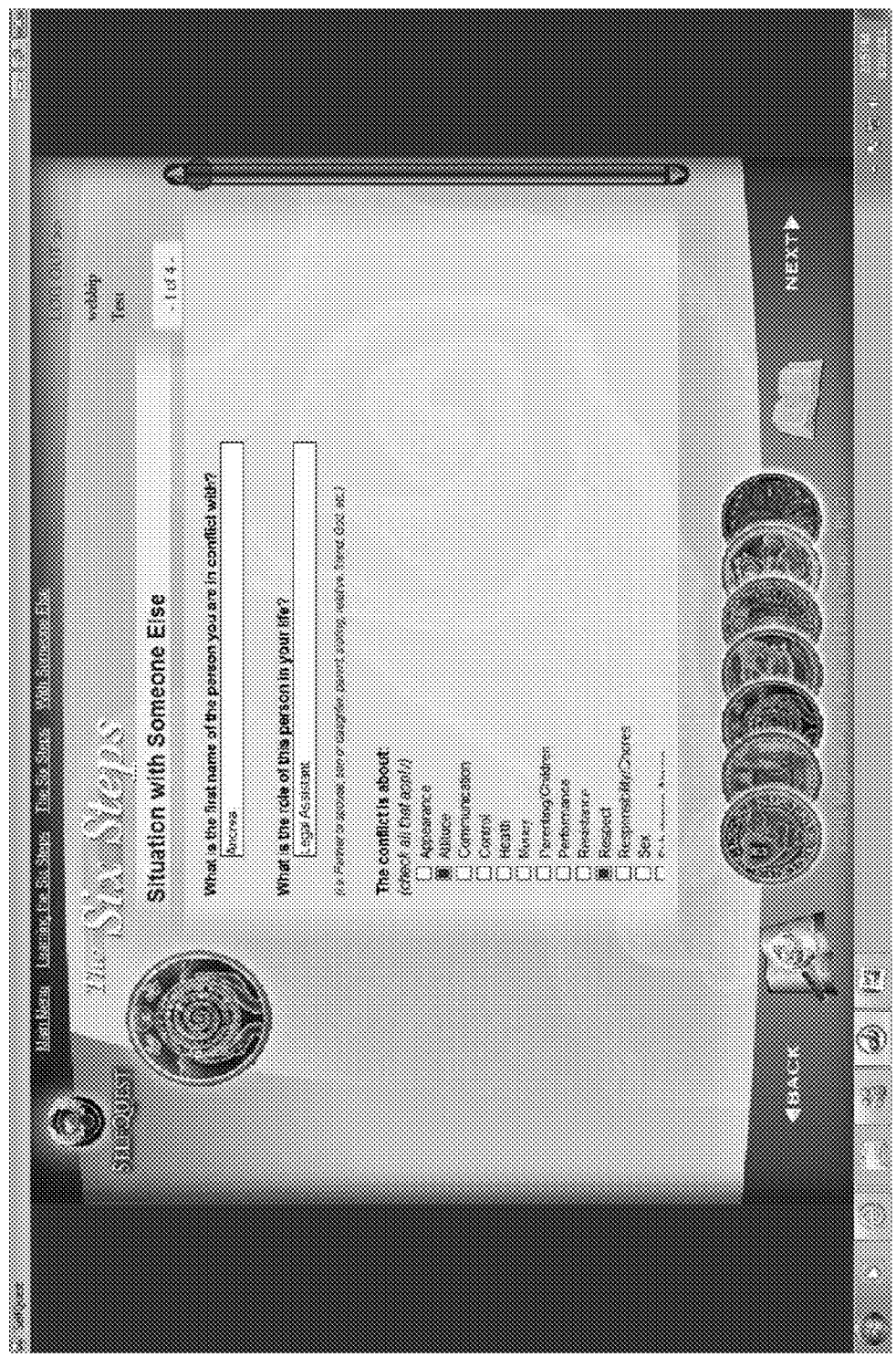
Figure 18:
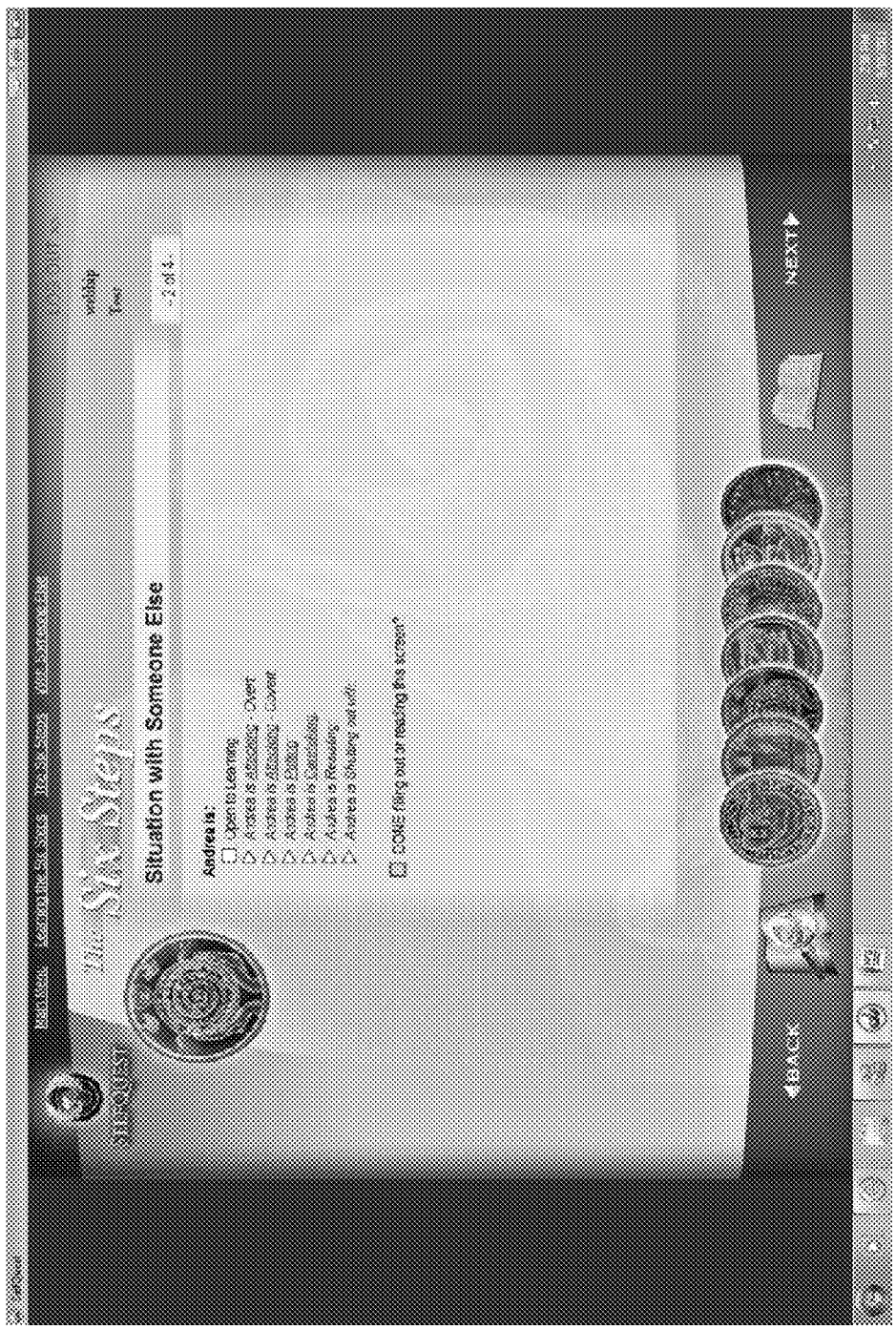
Figure 19:
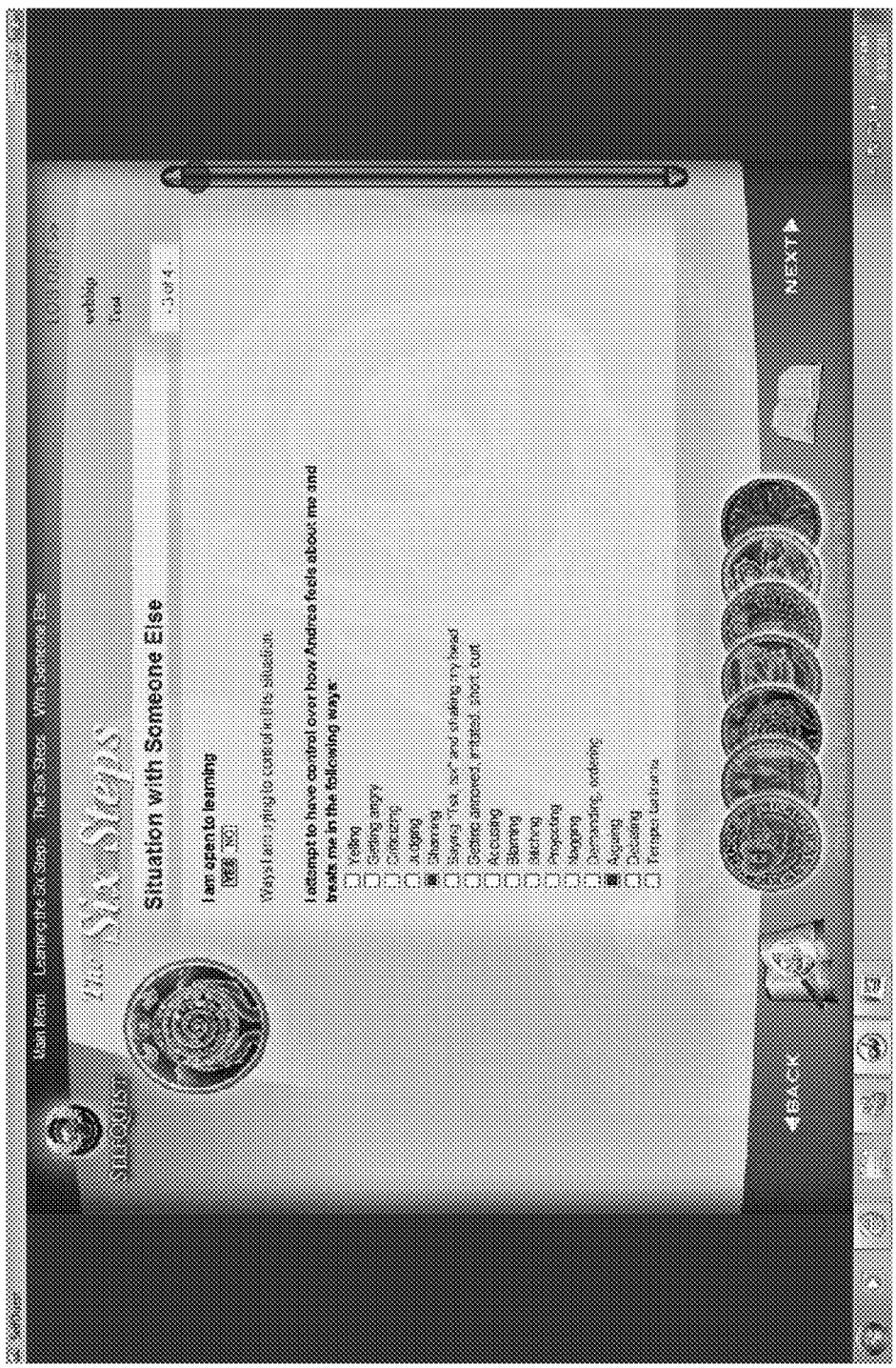
Figure 20:
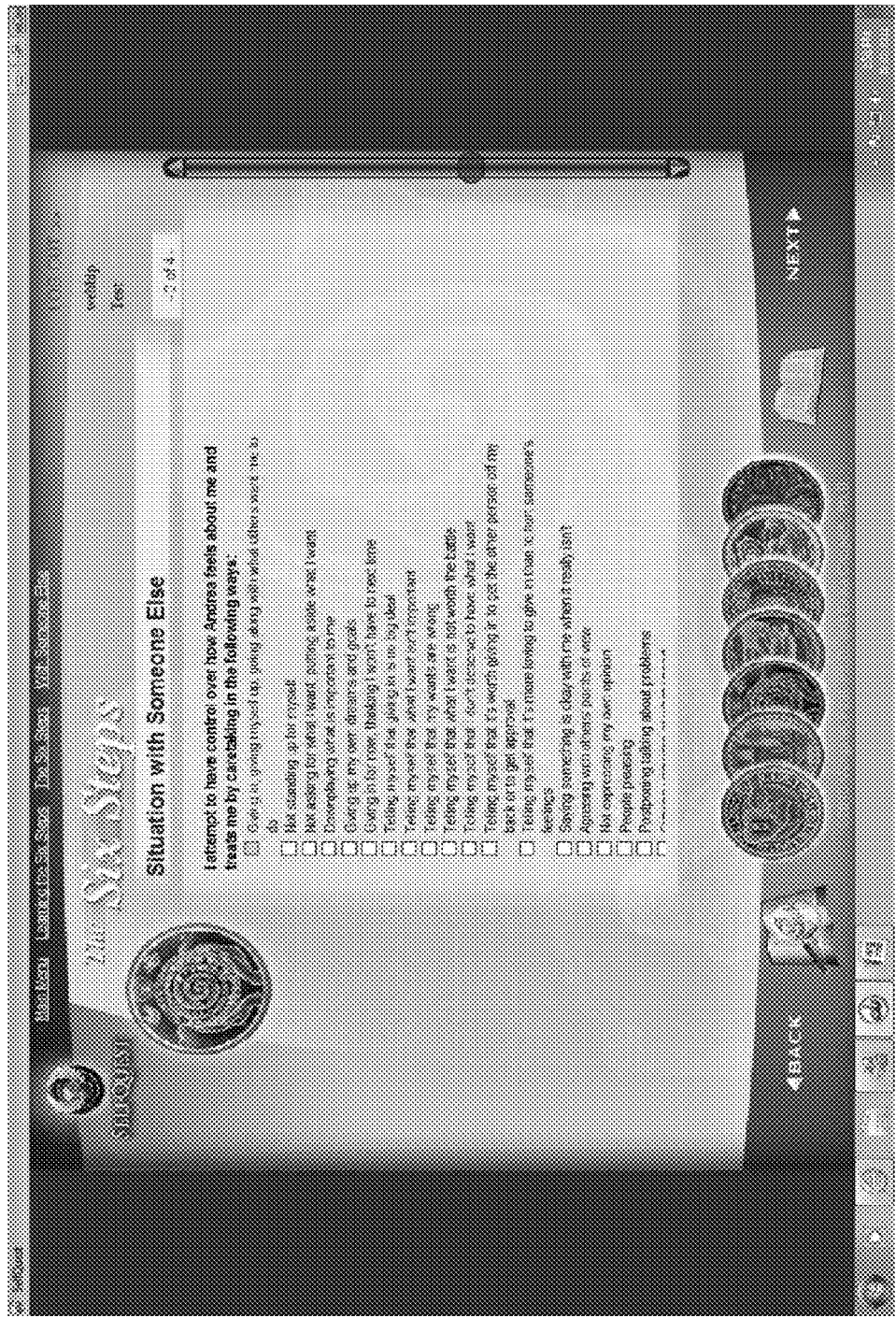
Figure 21:
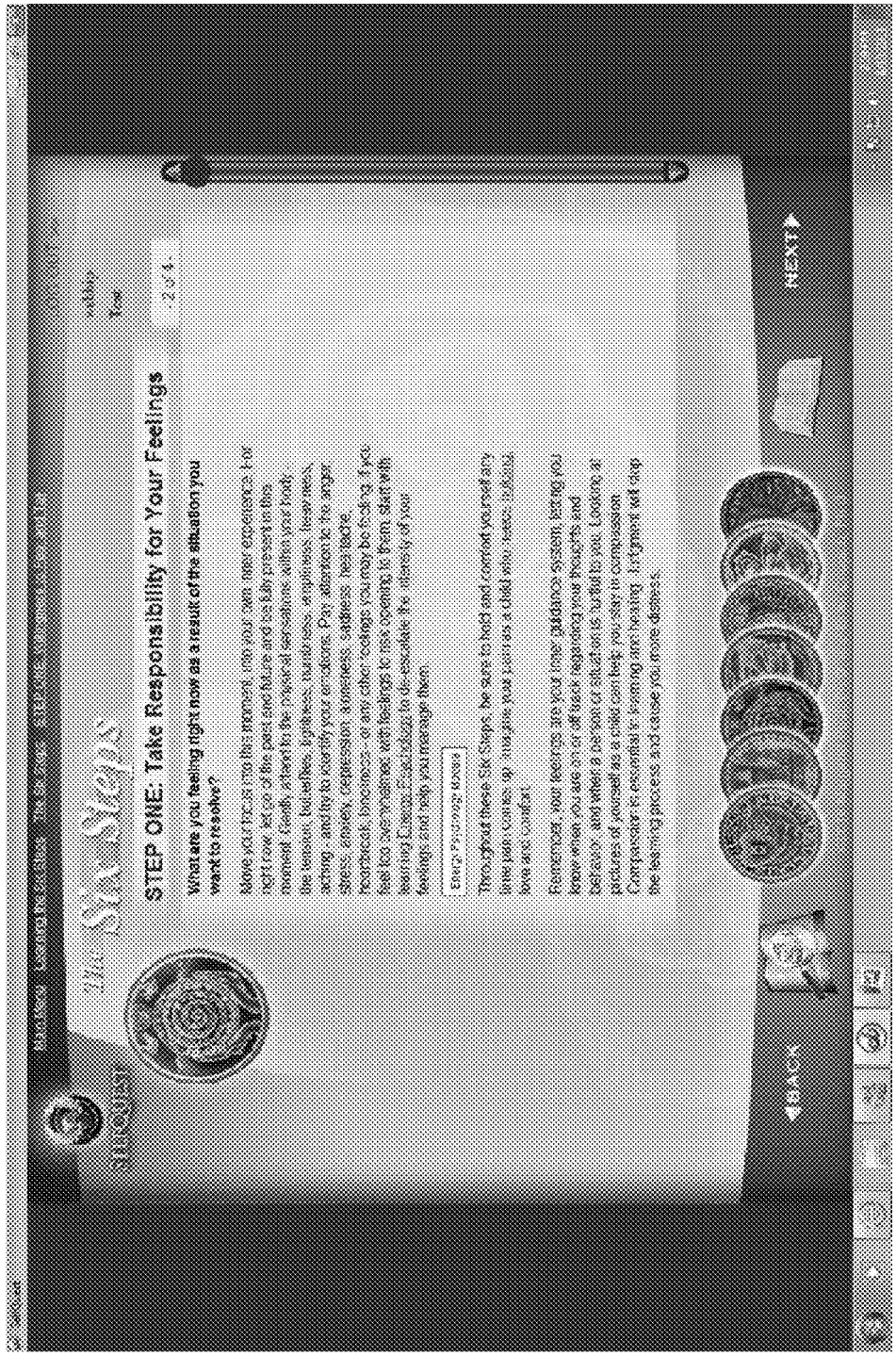
Figure 22:
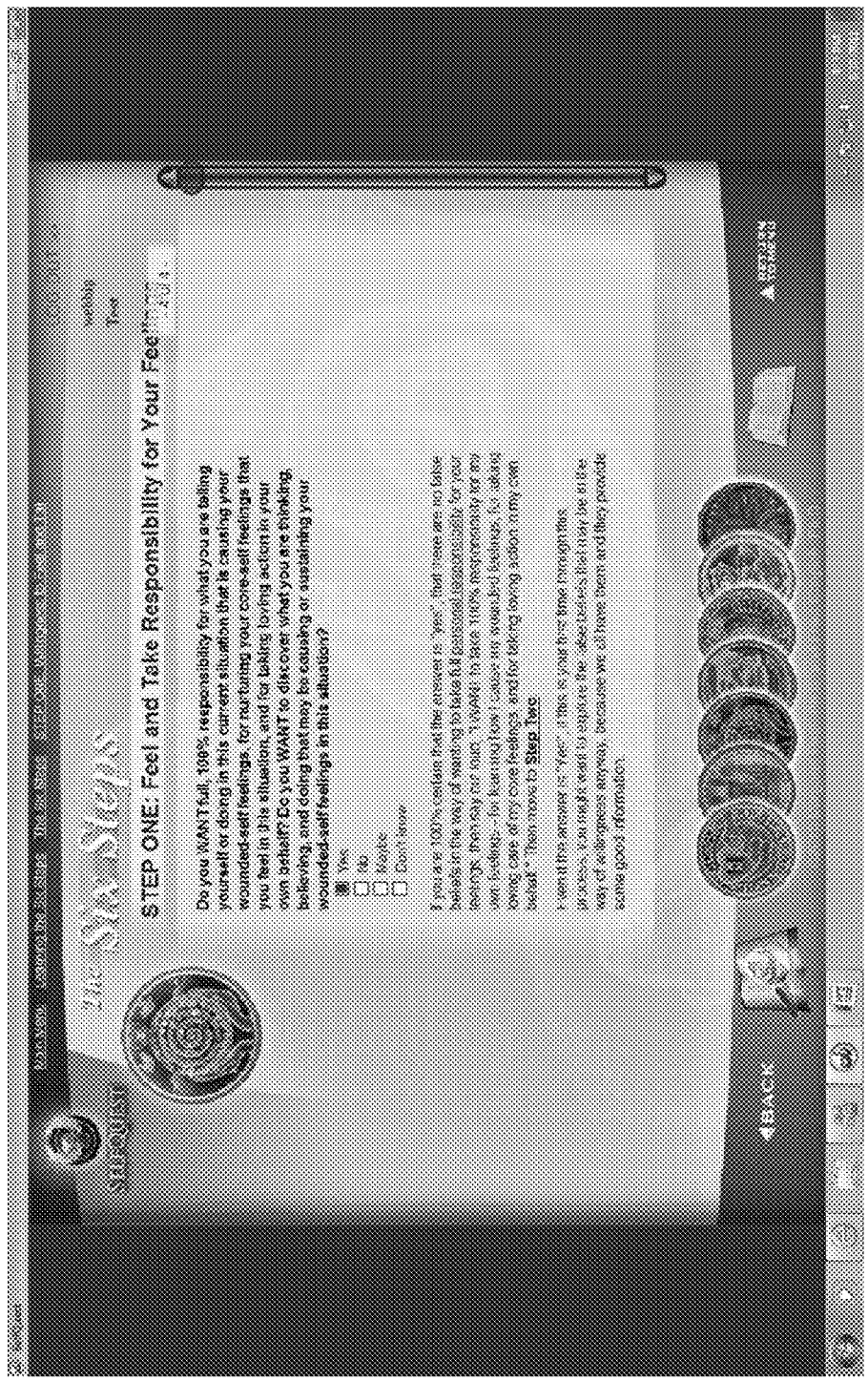
Figure 23:
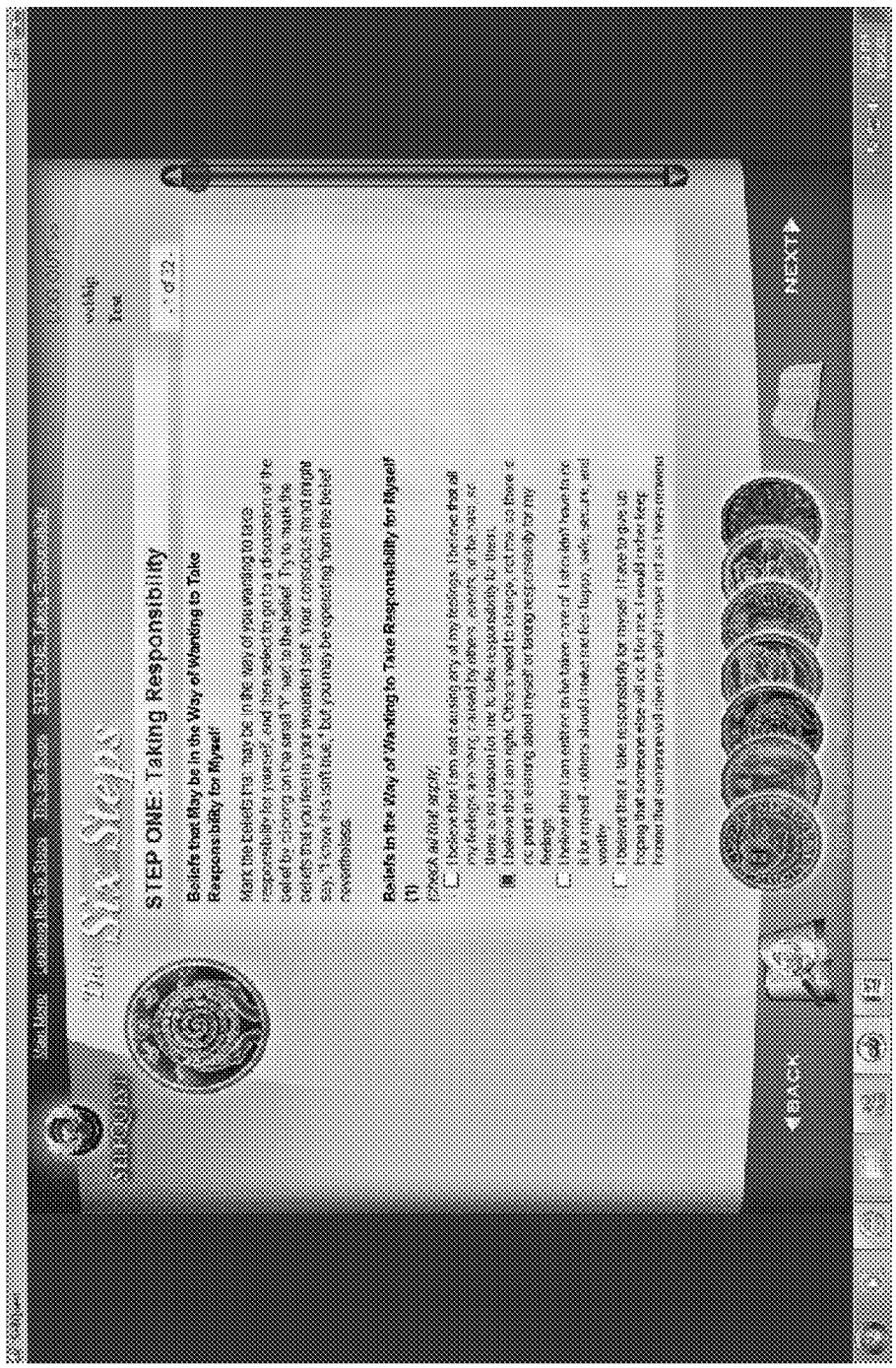
Figure 24:
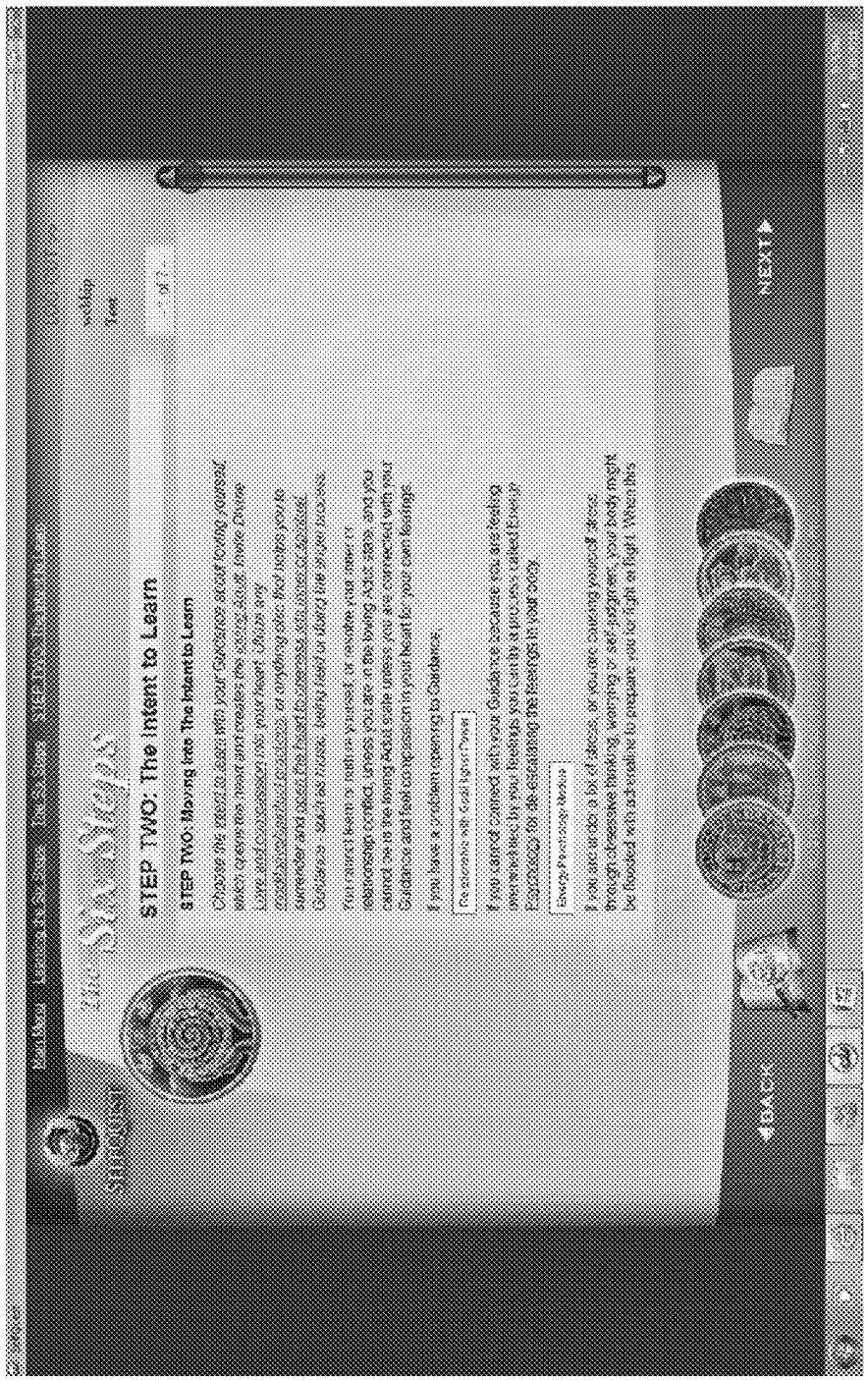
Figure 25:
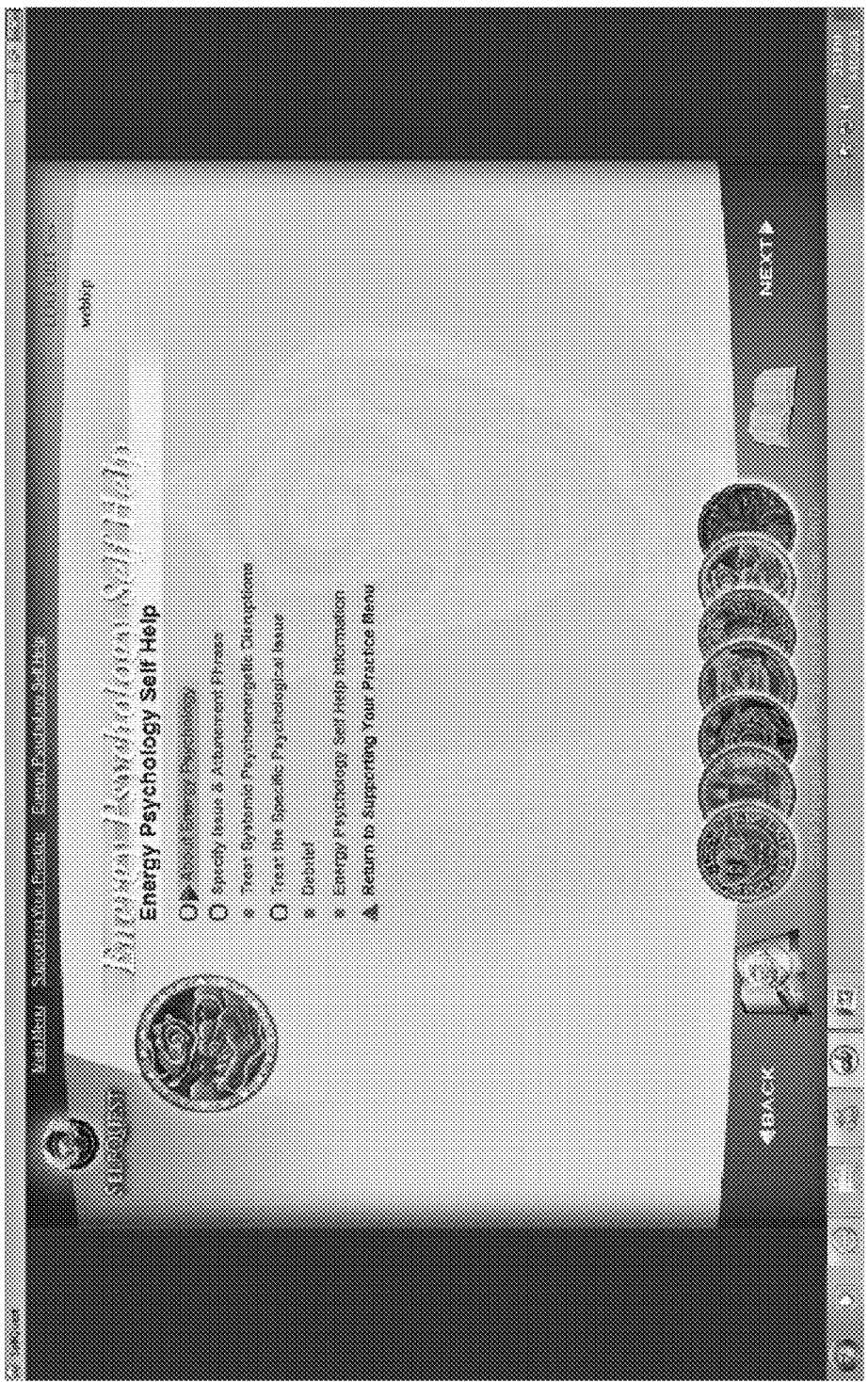
Figure 26:
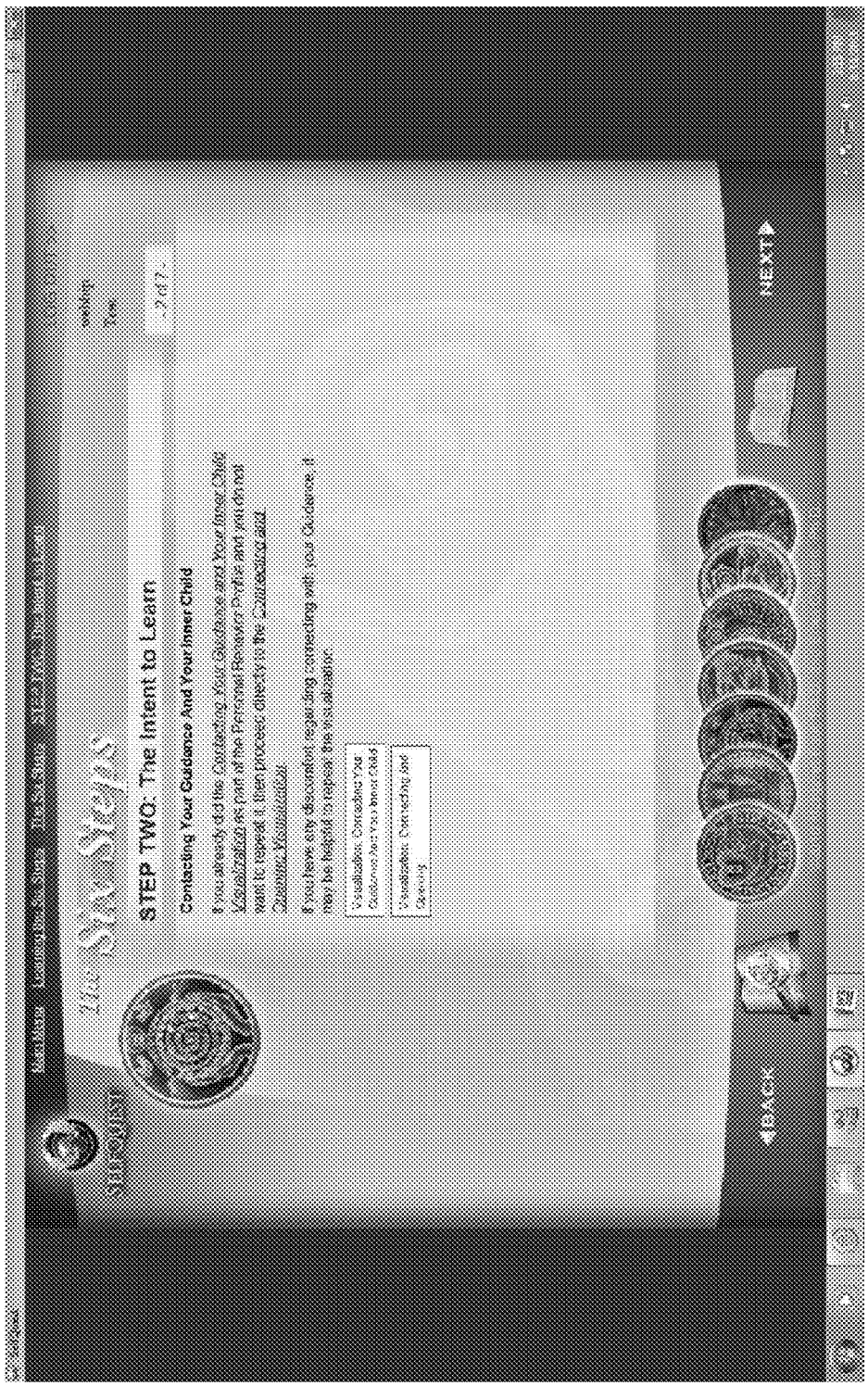
Figure 27:
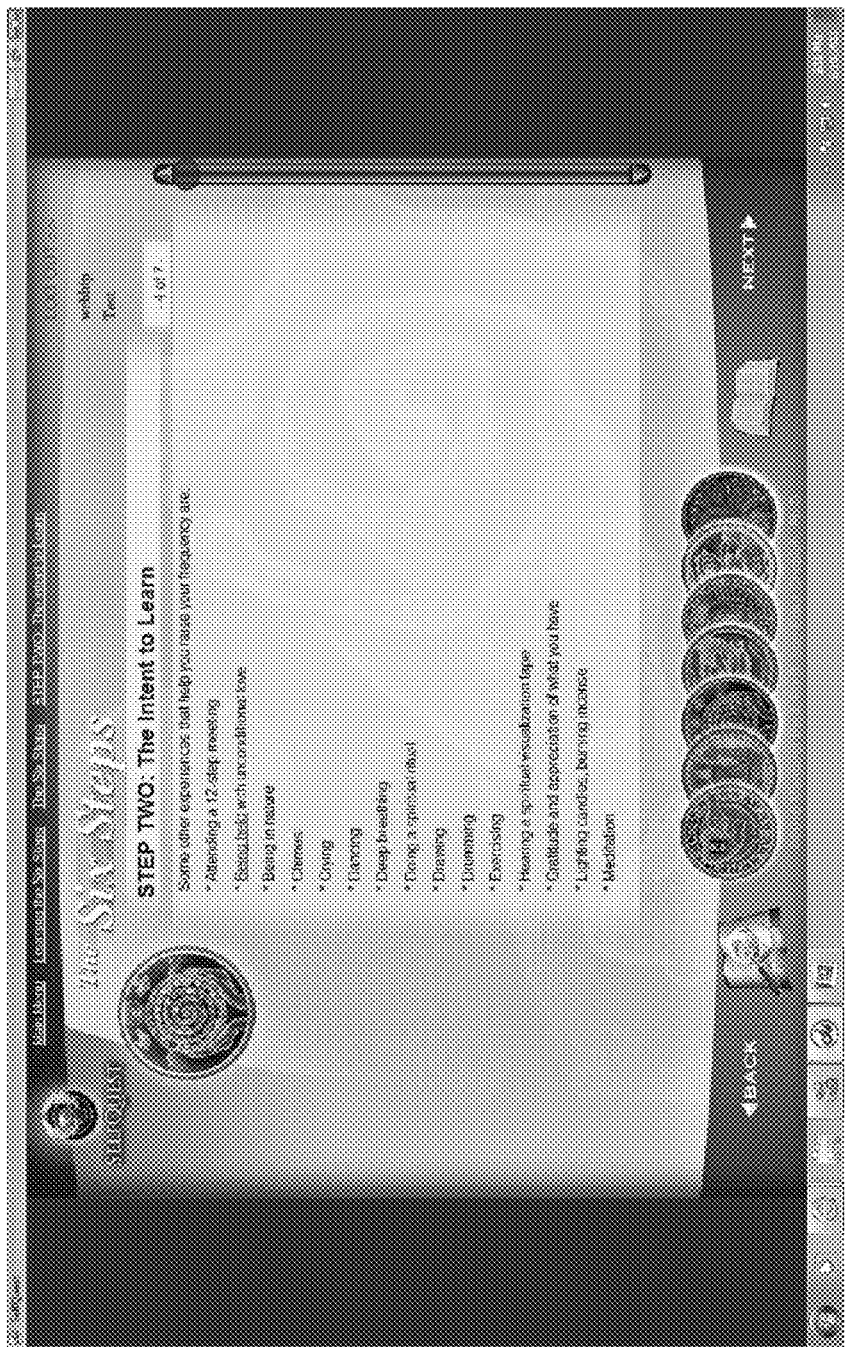
Figure 28:
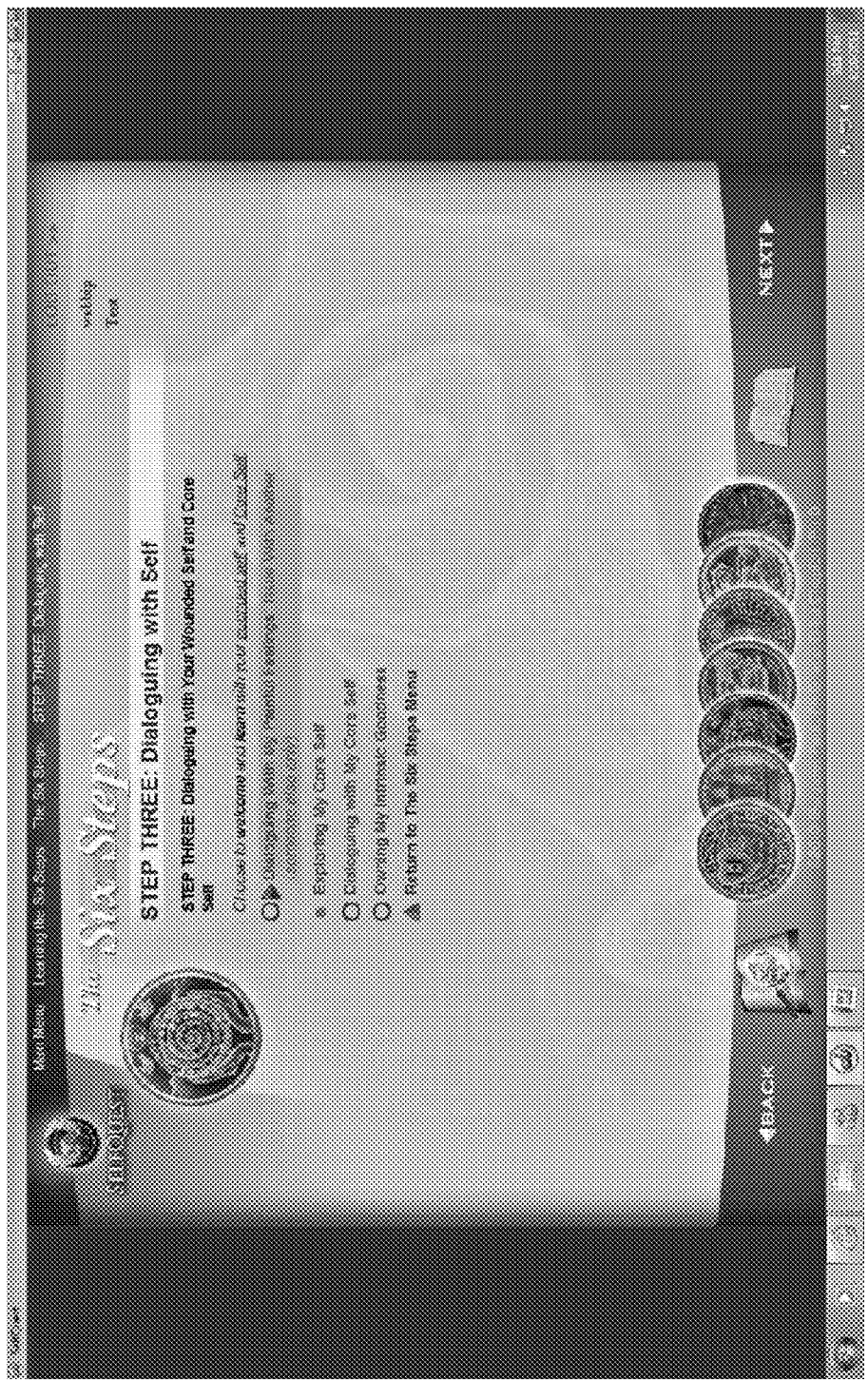
Figure 29:
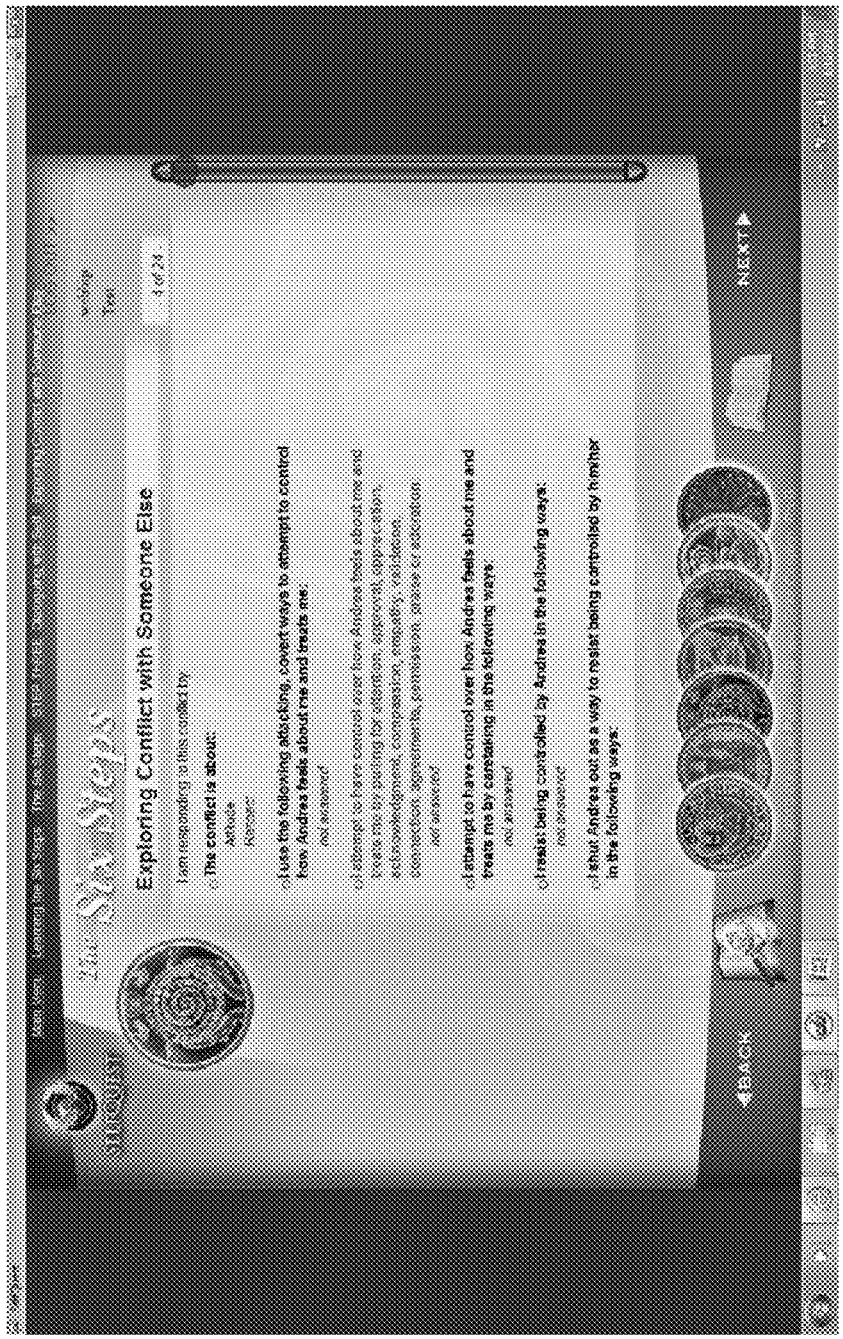
Figure 30:
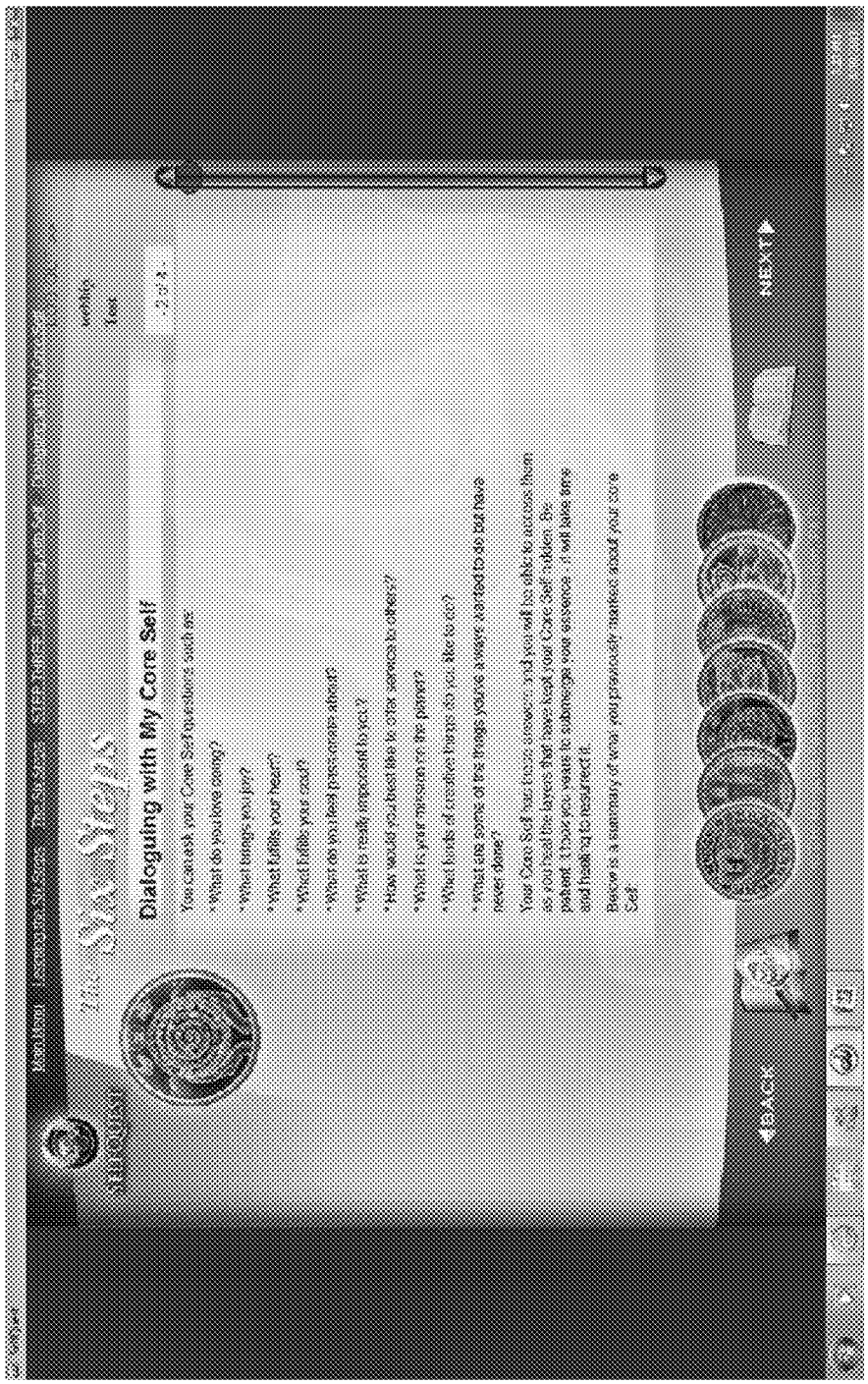
Figure 31:
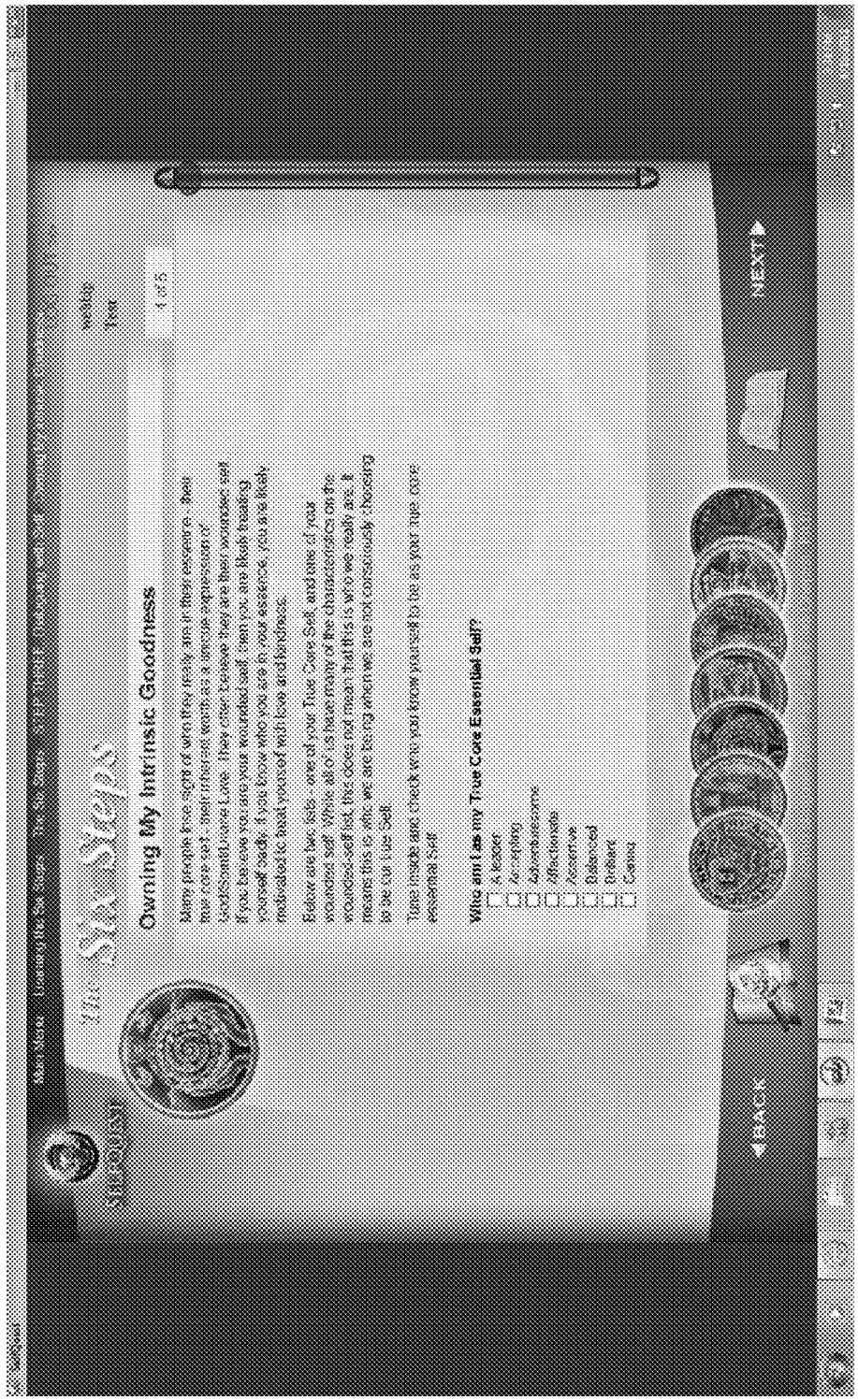
Figure 32:
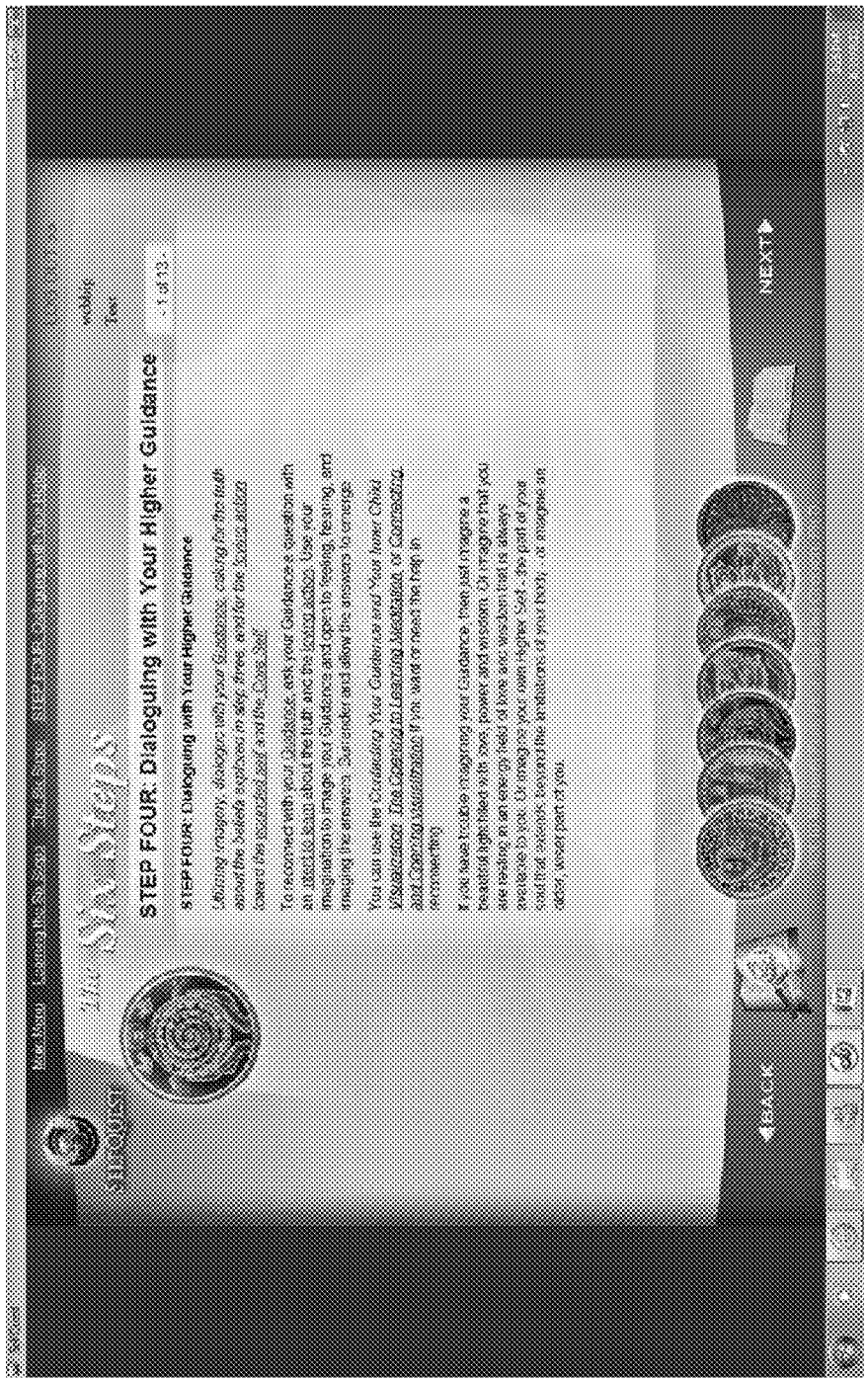
Figure 33:
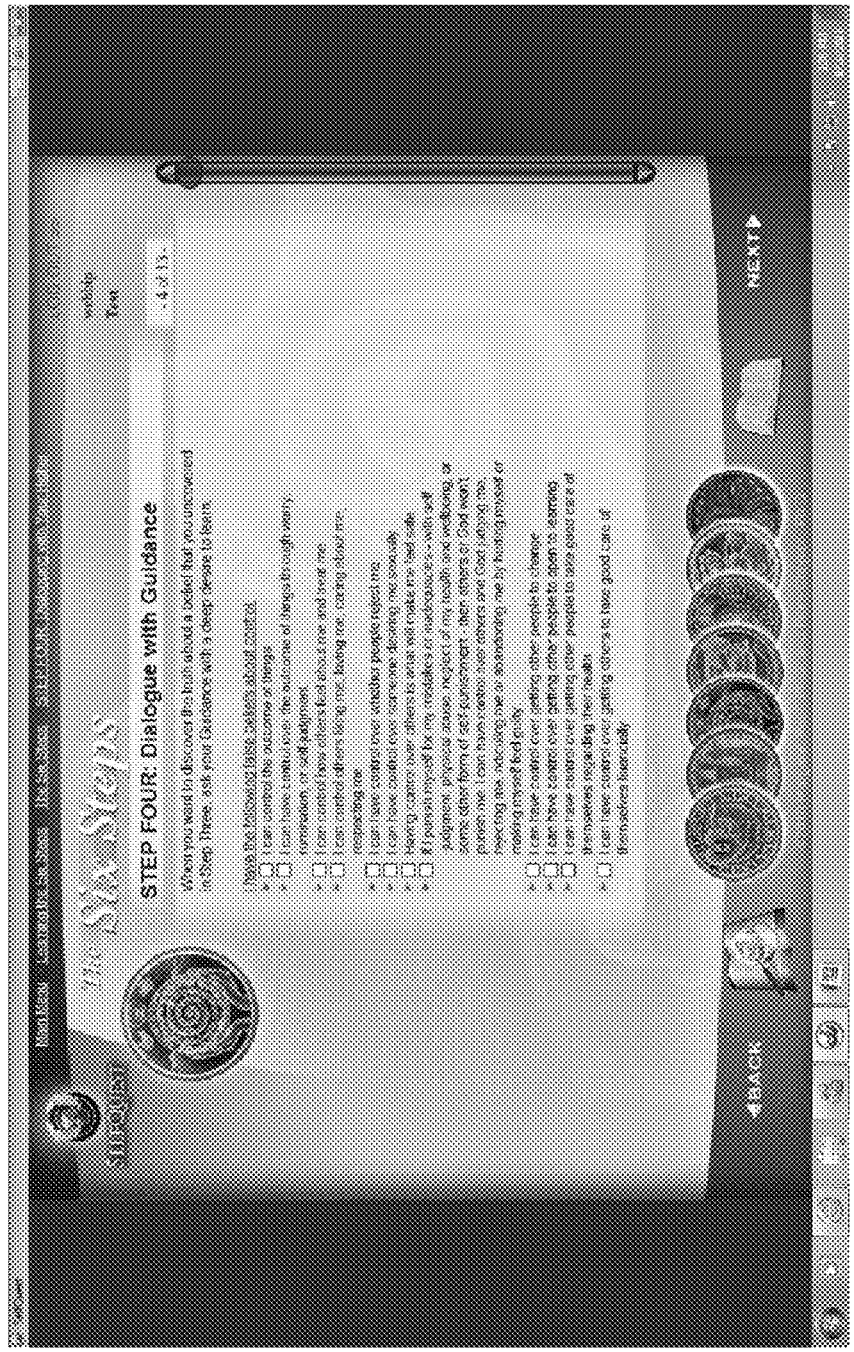
Figure 34:
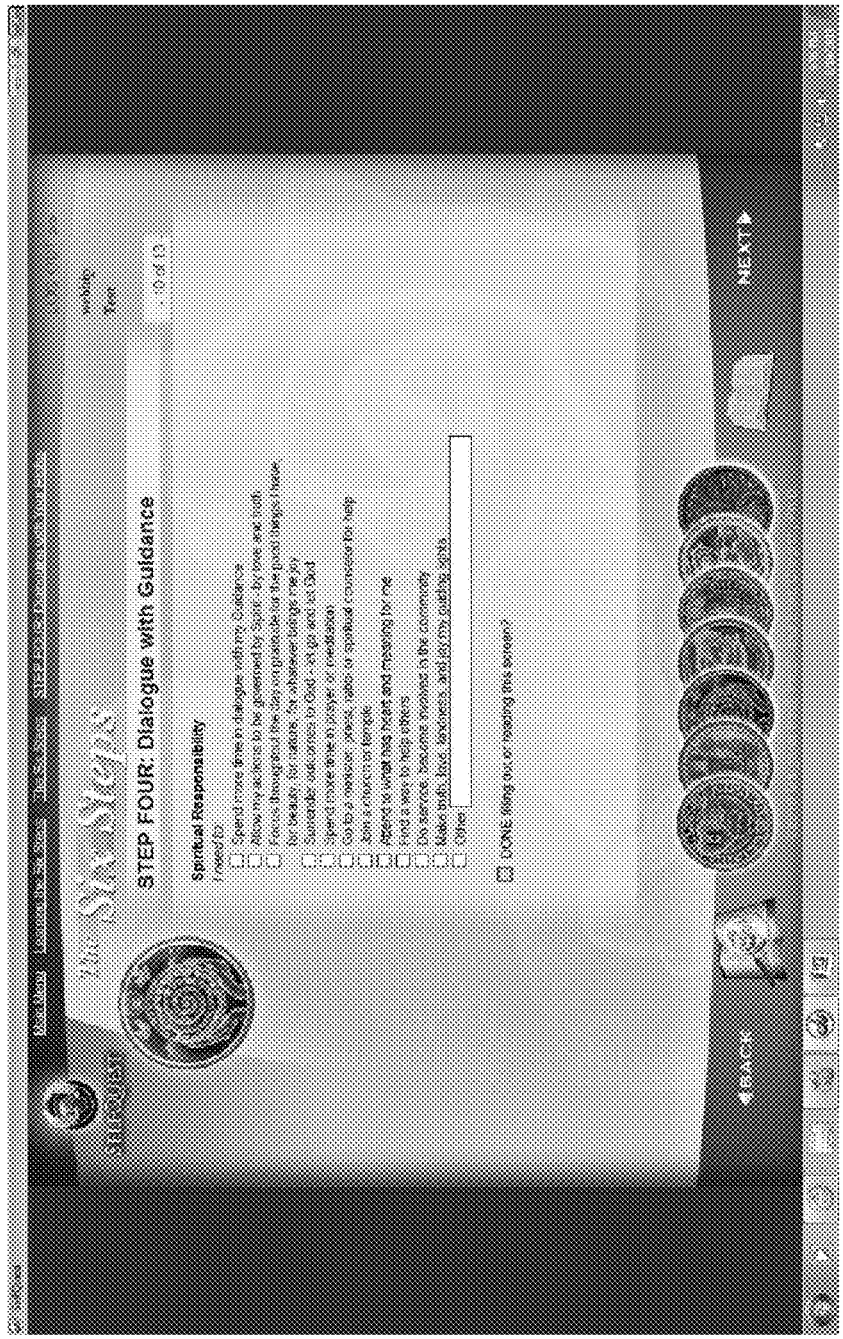
Figure 35:
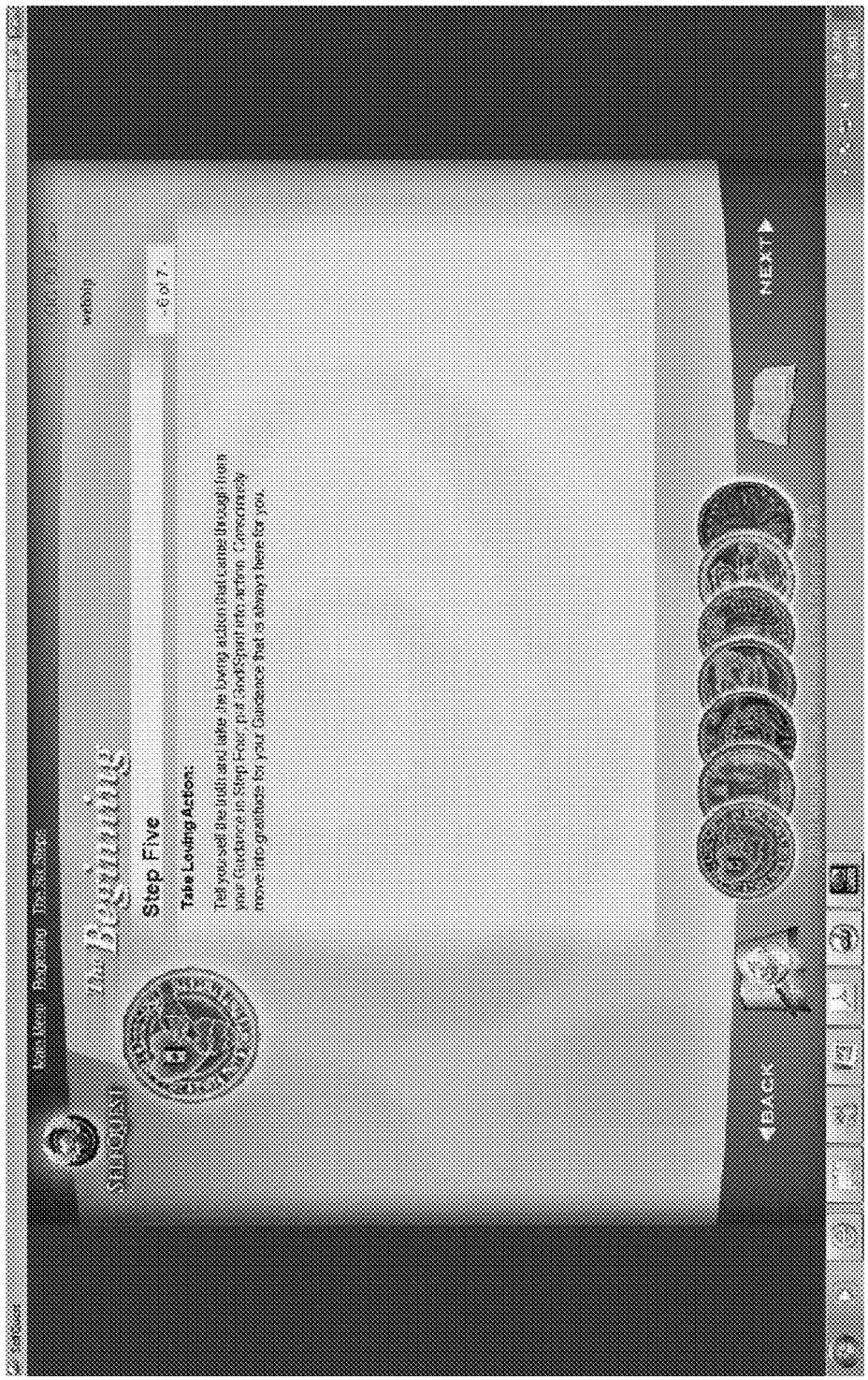
Figure 36:
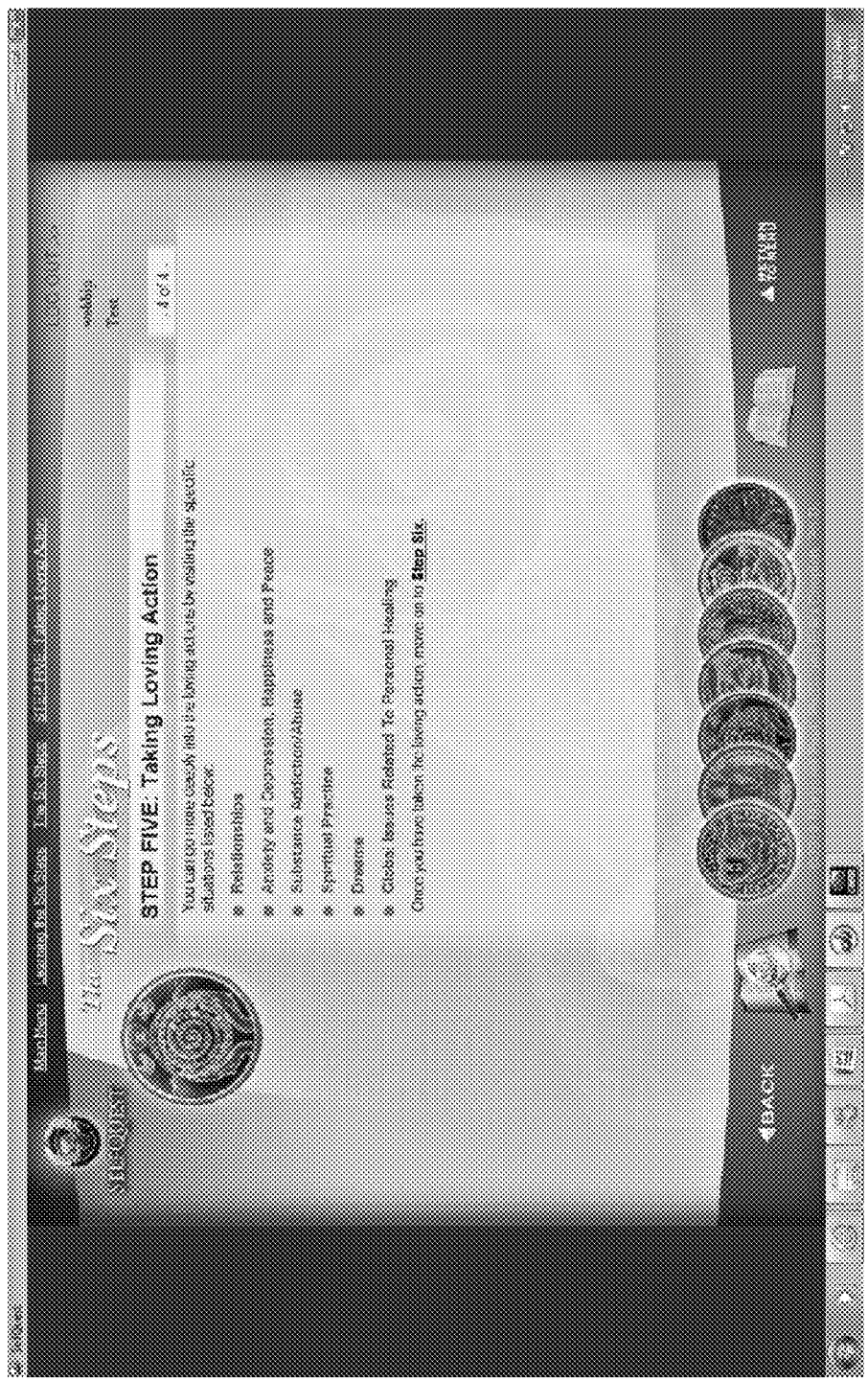
Figure 37:
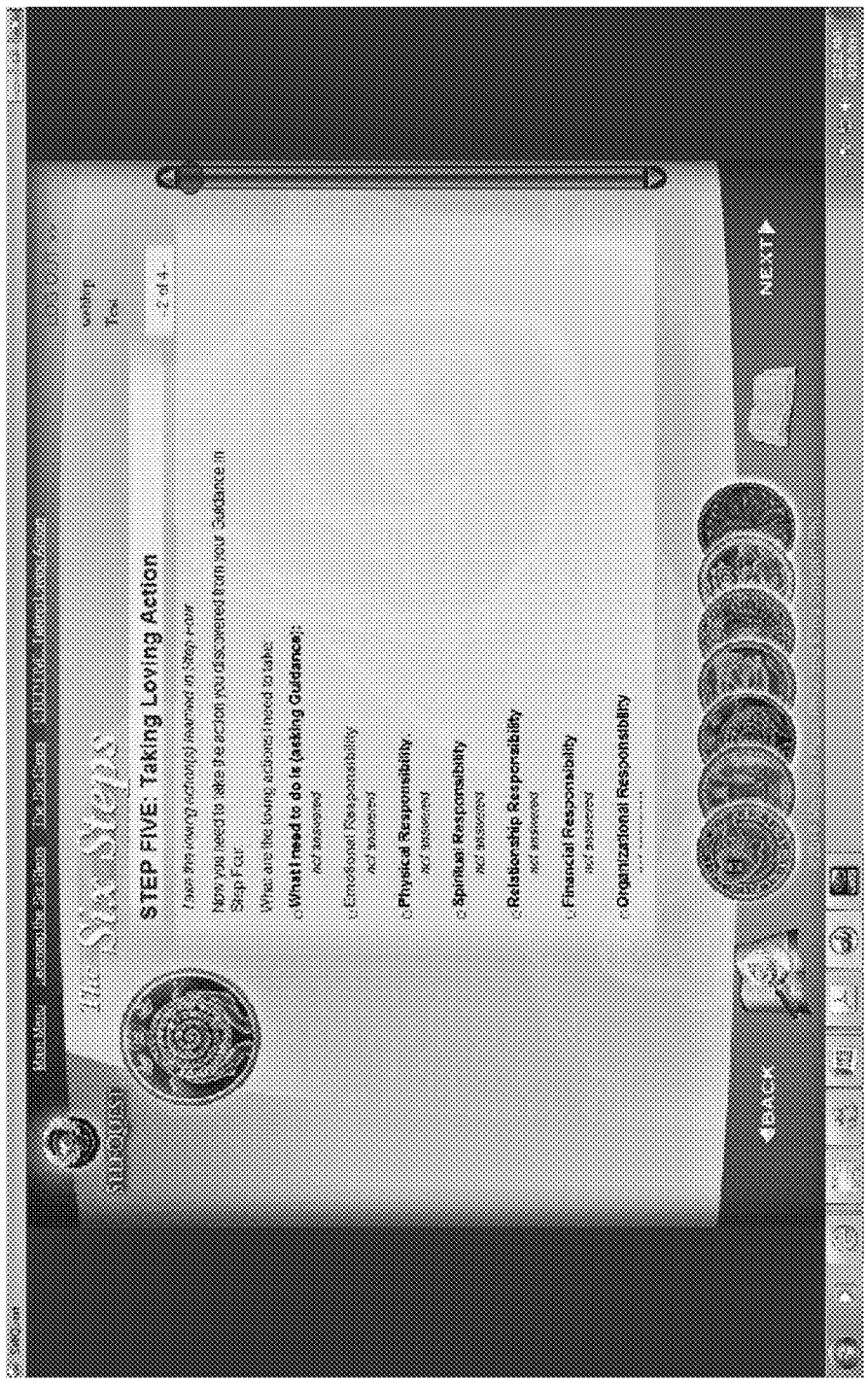
Figure 38:
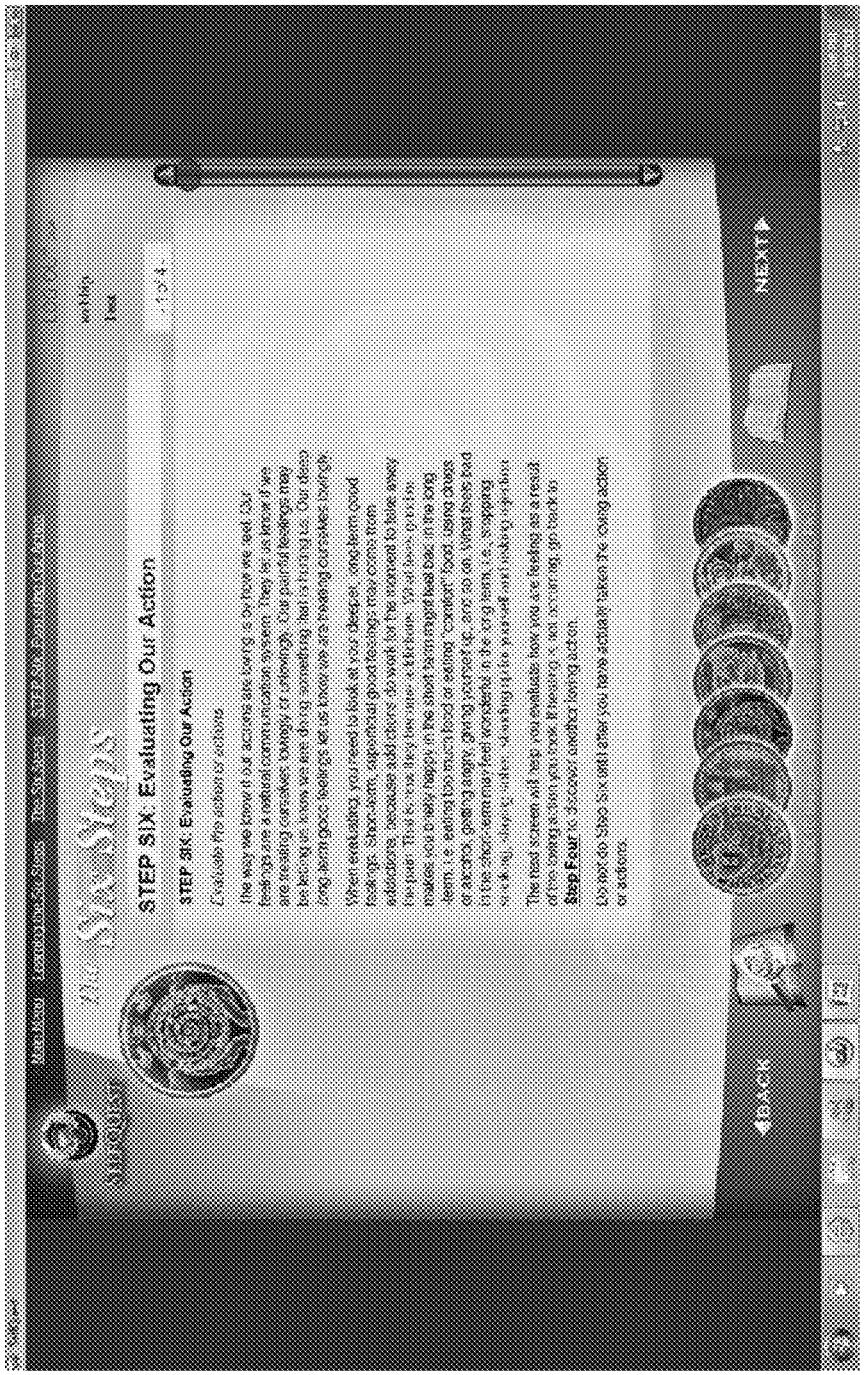
Figure 39:
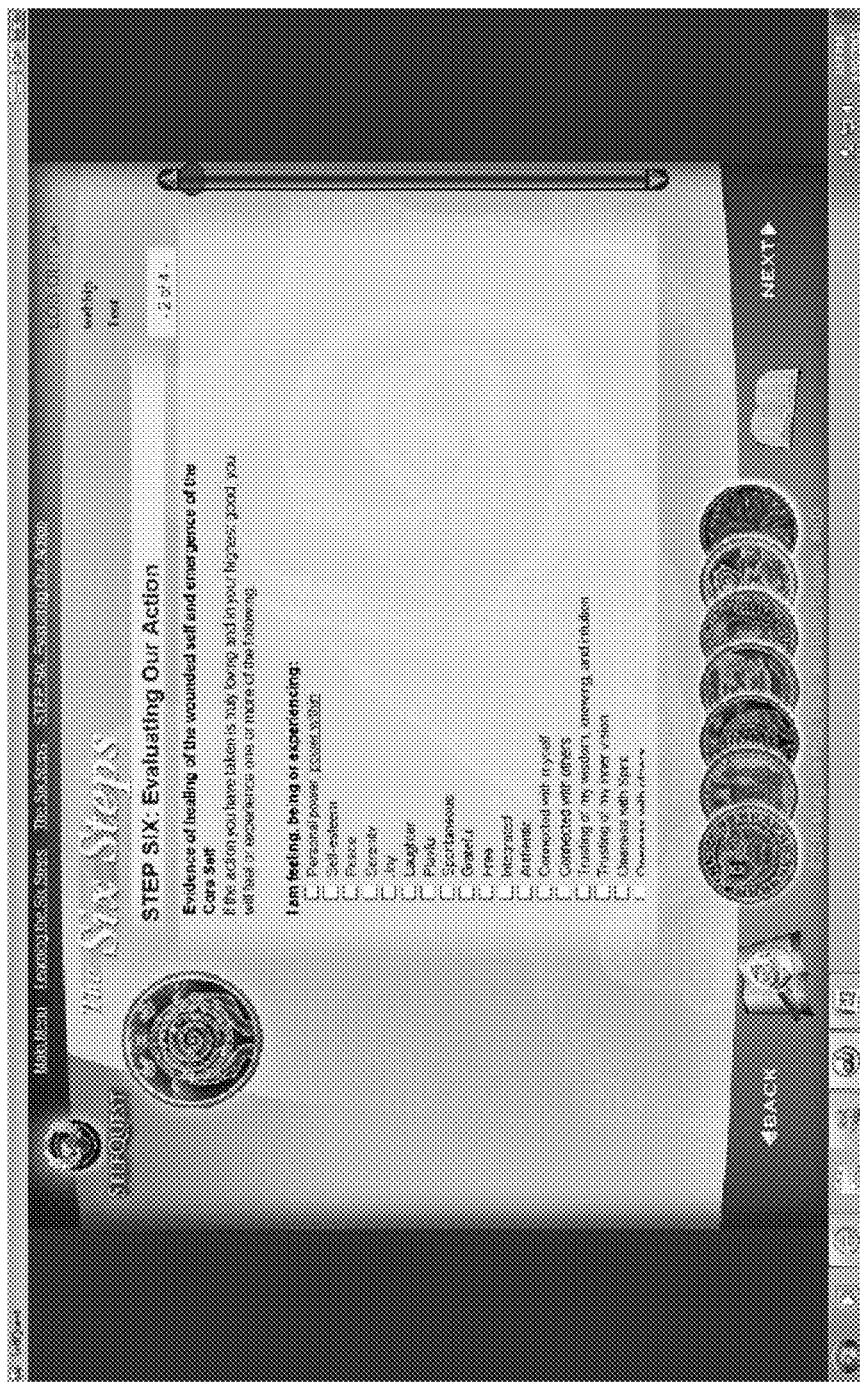
Figure 40:
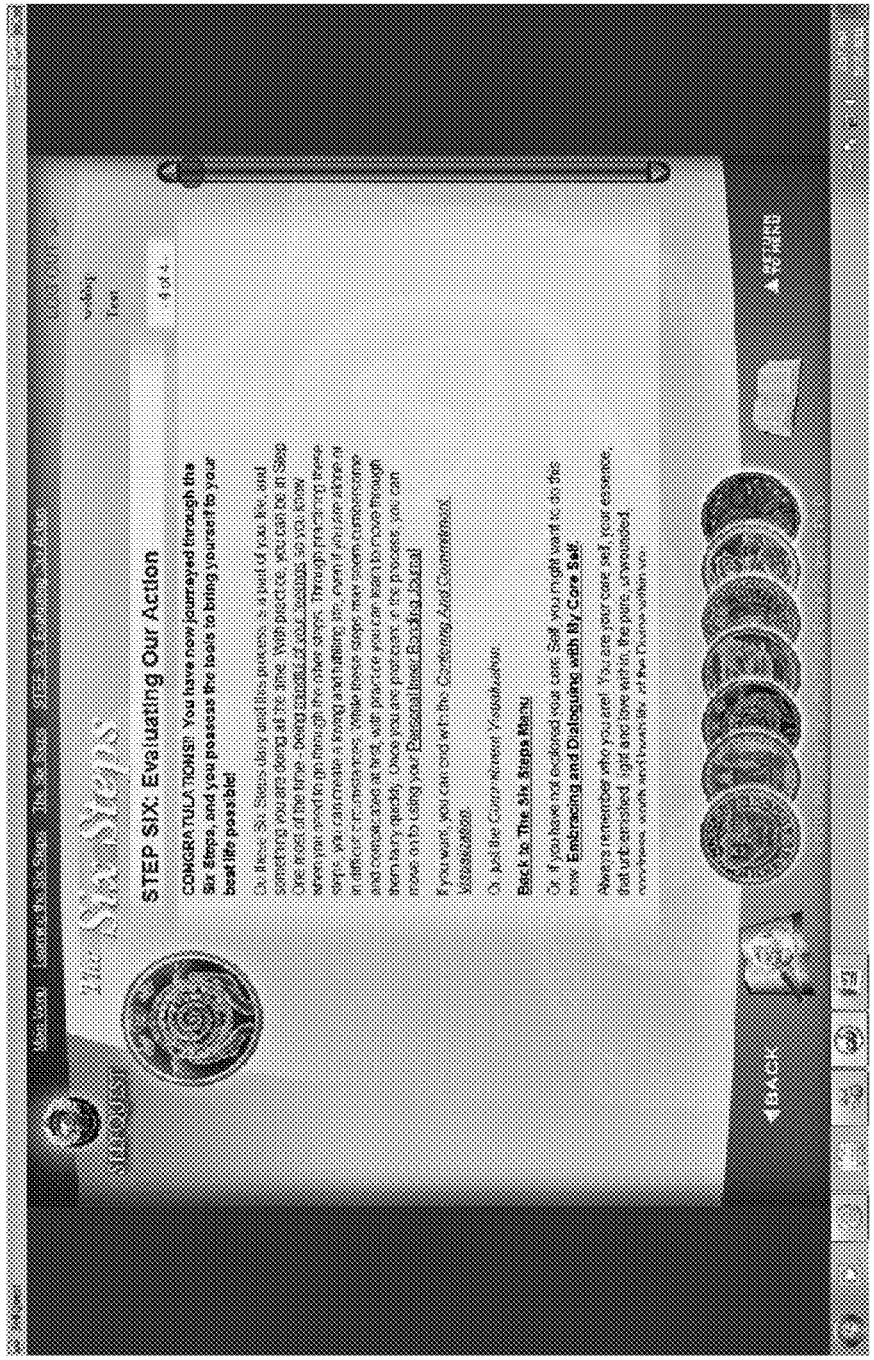
Figure 41:
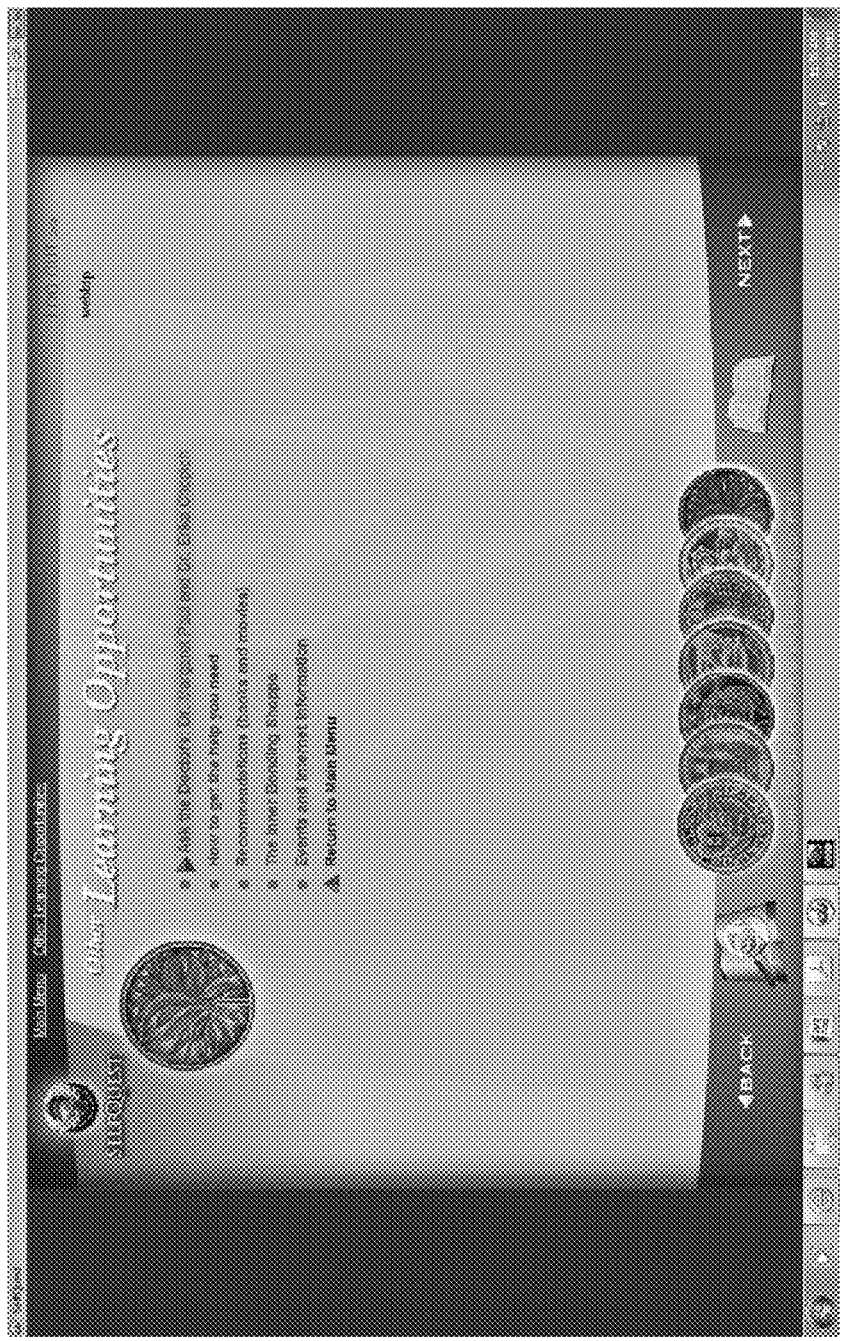
Figure 42:
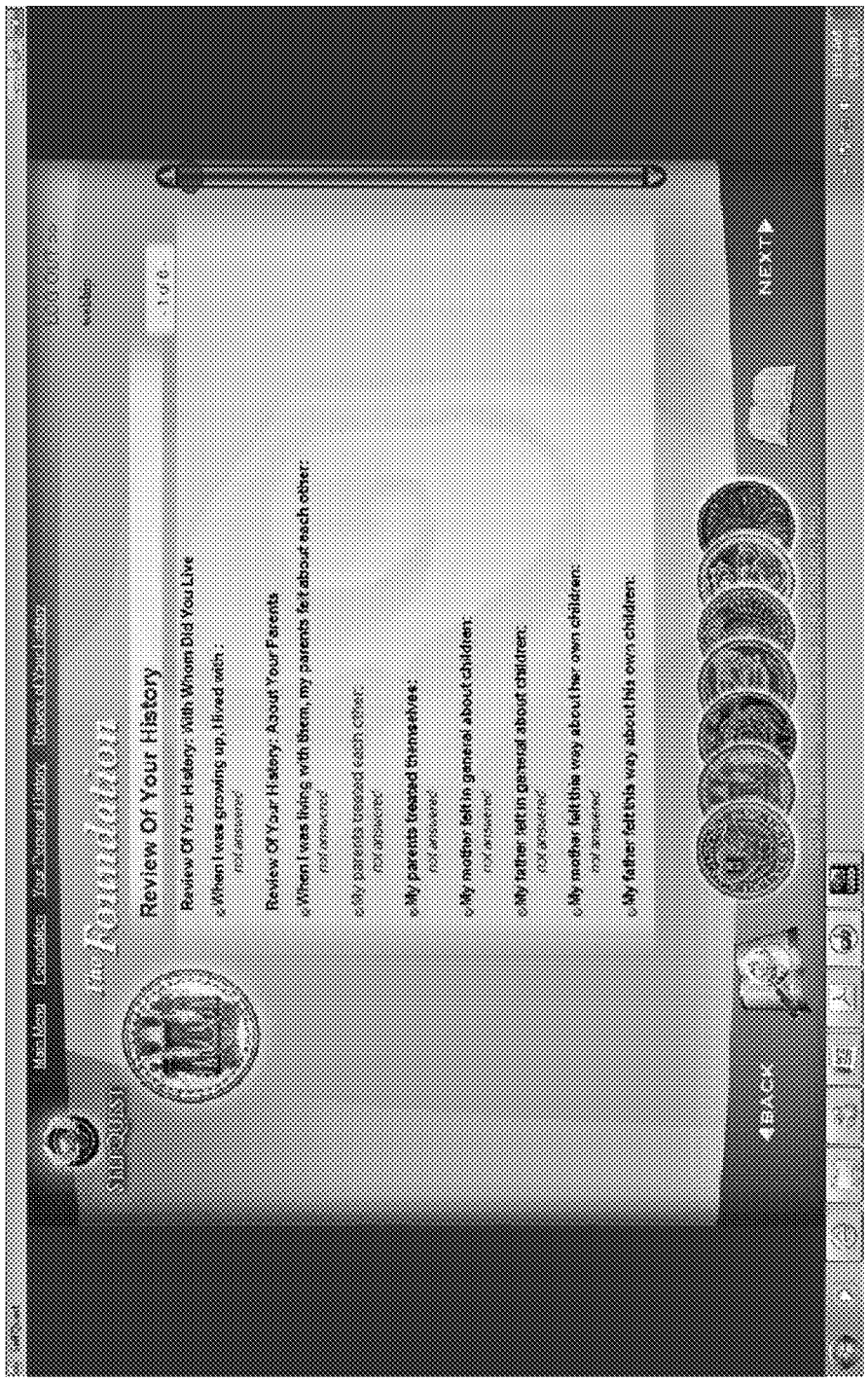
Figure 43:
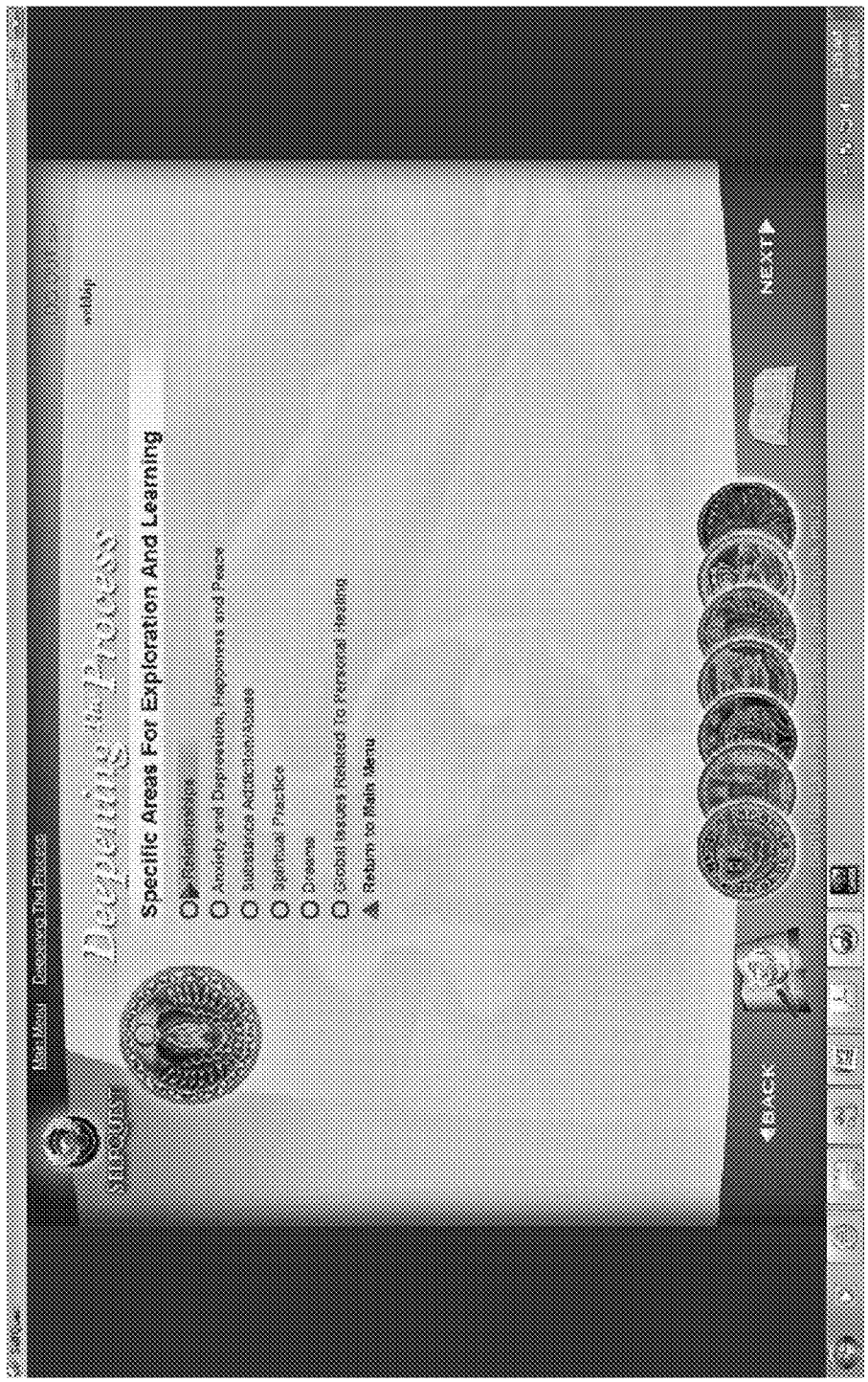
Figure 44:
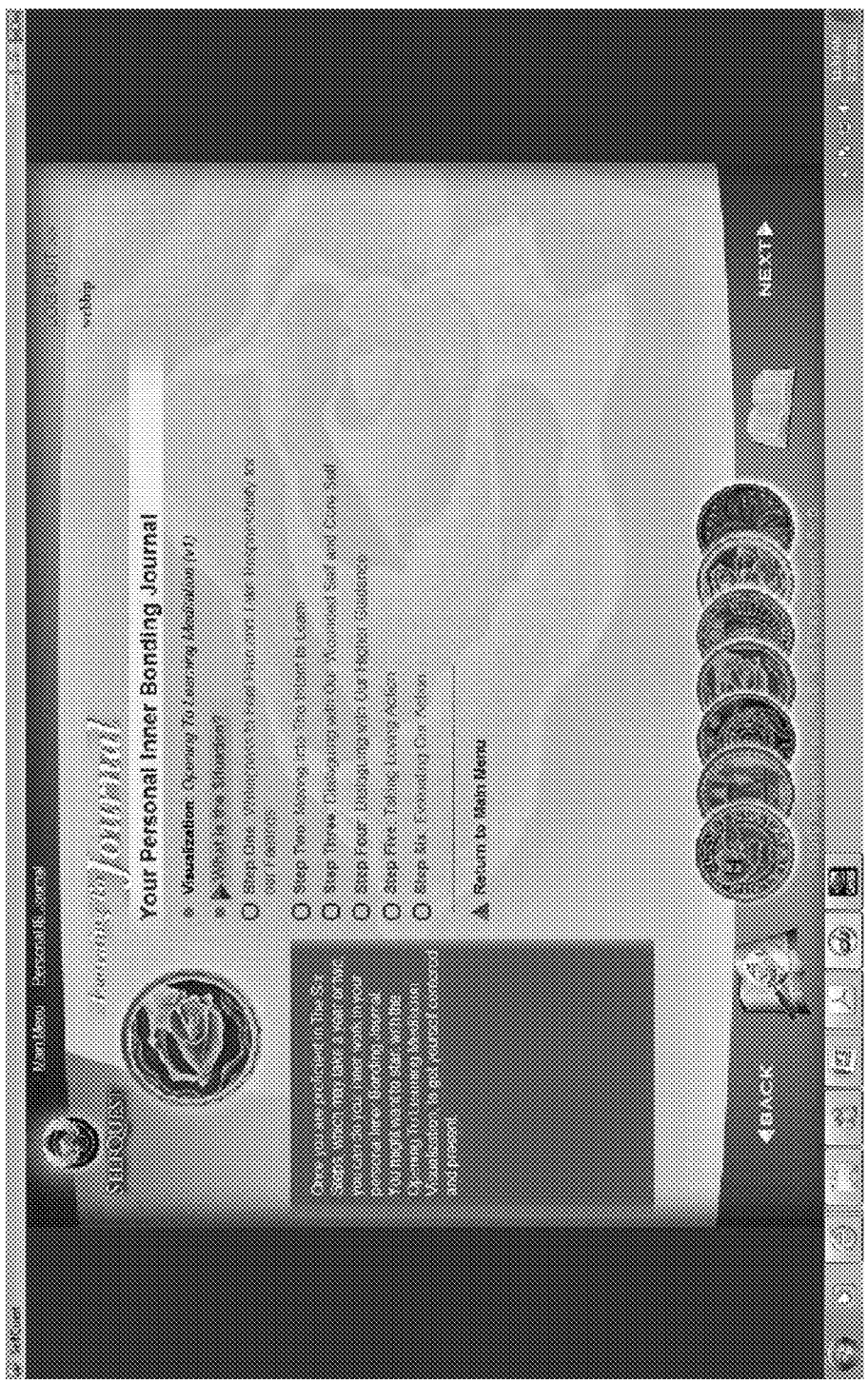
Figure 45:
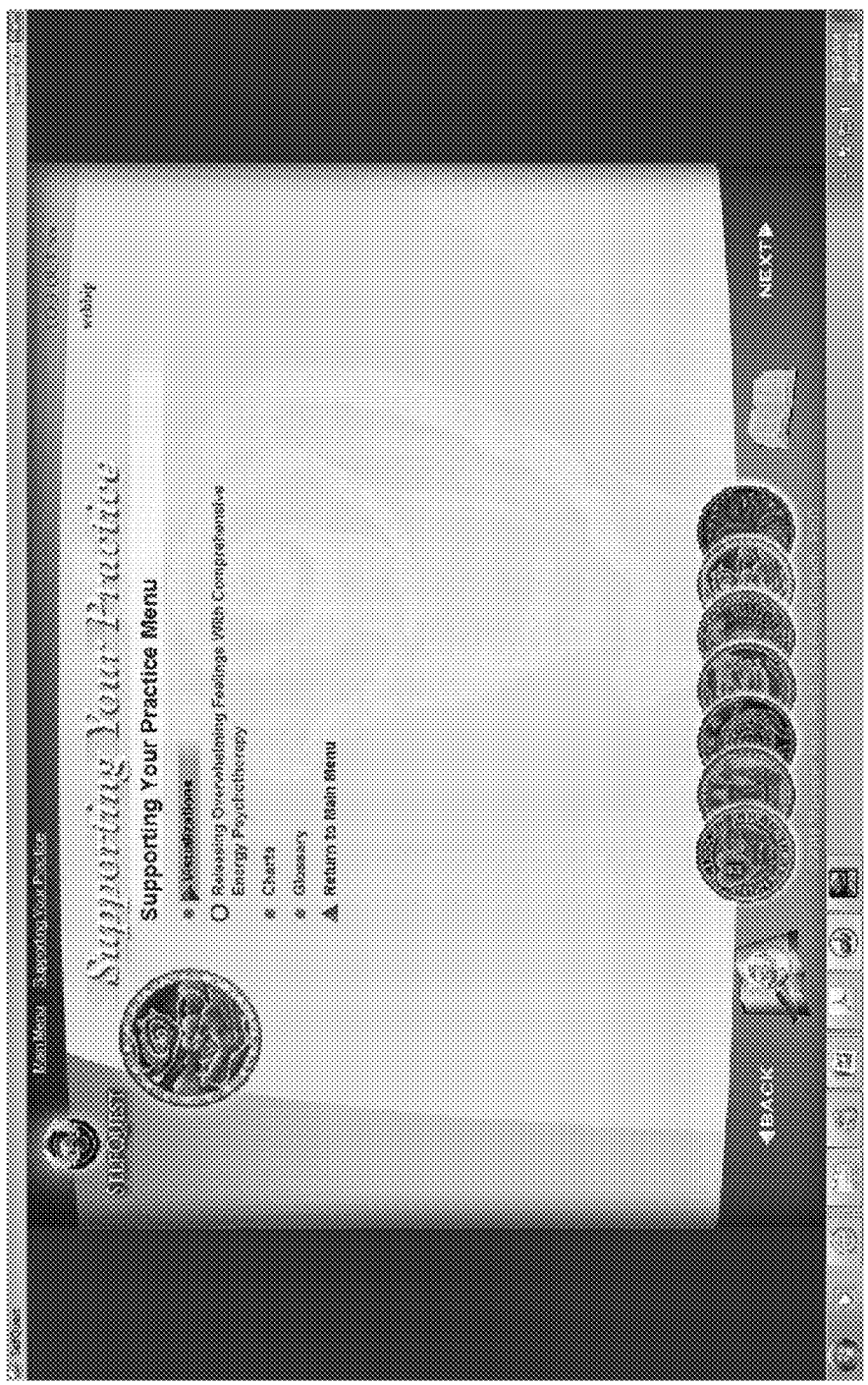

FIG. 8 is a data diagram illustrating a data structure of a system for facilitating personal development using a computing device, according to one embodiment of the invention. There is shown a Foundation Profile 810 associated with a Situation Profile 820 that is in turn associated with each of a Feelings Profile 830 and a Actions Profile 840. Accordingly, data associated with each profile may be linked and collected in a manner useful to a system and/or method similar to such described herein.

Such profiles may include one or more answers/objects/ data structure associated with questions, sets of questions, users, user groups, steps (such as but not limited to those described in FIG. 6), and the like and combinations thereof in regards to the subject matter listed in the illustrated profiles and/or to similar subject matter not illustrated.

The foundation profile 810 includes, but not limited to: false beliefs, personal behavior, childhood, wounded self, motivations, inner dialogue, situations 812, etc. The situation profile 820 includes, but not limited to: name, type, description, feelings 822, actions 824, etc. The illustrated situation profile 820 is in communication with a feelings profile 830 and 840. The feelings profiles 830 and 840 are configured to correlate and associate data between the feelings profiles and the situation profile, thereby associating feelings from the user and the situation presented.

FIGS. 9-45 are exemplary screenshots of a user interface display of a system and method for facilitating personal development using a computing device, according to one embodiment of the invention. Such screenshots display question and answer sets, educational materials, conditioning introductions, menus, profile feedback displays, and etc. and are intended to facilitate in the understanding of the other figures without limiting the claims.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures illustrate particular questions, display formats, menu options and the like, it is envisioned that the exact questions, display formats, menu options and the like are plethoric.

It is also envisioned that there may be niched embodiments that may include content and/or structure suited and/or adapted for use in helping high school students, teachers, parents, health professionals, attorneys, prison inmates, and the like and combinations thereof. Such embodiments may be adapted and/or customized in content and/or delivery to users by location, career, family role, desired results, language, genre, thematic elements, therapy style, therapy genre, and the like and combinations thereof. Non-limiting examples of customization may be in the form of question language, question order, content stylization, skins, media files, and the like.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A method for facilitating personal development using a computing device by providing non-transitory machine-readable instructions on a tangible medium to perform steps, comprising:
   a) generating a machine-readable foundation profile by performing sub-steps, including:
   i) querying a user through a user interface module of a computing device in regards to facts about themselves including their false beliefs;
   ii) providing a user access to an education module and a discovery module through context relevant links during a querying process;
   iii) storing answers to queries in association with a user as a foundation profile in a memory storage module of a discovery module of a computing device; and
   b) guiding a user through a process of issue resolution by a module that performs sub-steps, including:
   i) querying a user in regards to a specific situation, storing answers to such queries as a machine-readable situation profile;
   ii) teaching a user in regards to taking responsibility for their feelings, querying a user about their feelings in regards to the situation profile, and storing answers to such queries as a machine-readable feeling profile associated with the situation profile;
   iii) teaching a user about having an intent to learn by displaying media related thereto on a computing device;
   iv) managing a self-dialogue within the user by displaying, on a display device, an answer stored in the feeling profile, querying a user about the displayed answer, querying a user about the actions and beliefs that are associated with the displayed answer, and teaching the user techniques for productive self-dialogue;
   v) managing, through a computing device, an inner guidance dialogue within the user by teaching the user techniques for productive inner guidance dialogue, displaying an answer stored in any one of the foundation profile, situation profile, and feelings profile, querying the user about solutions associated with the displayed answer, suggesting a plurality of actions, and storing a representation of an intended action as a machine-readable action profile;

vi) facilitating, through a computing device, a user taking action by displaying an intended action from the action profile, and teaching the user how to productively take action; and vii) facilitating self-evaluation by the user of the effectiveness of a taken action by teaching the user about effective actions, and querying the user about the feelings resulting from the taken action.

2. The method of claim 1, further comprising displaying at least one answer from the situation profile as a header during performance of a sub-step of guiding a user through a process of conflict resolution.

3. The method of claim 1, wherein specific sub-steps are performed only on user activation of the same.

4. The method of claim 1, further comprising generating and displaying a link to a substep associated with the generation of an incomplete profile when a sub-step attempts to display data from the incomplete profile.

5. The method of claim 1, further comprising recording completed sub-steps as machine readable tracking profile.

6. The method of claim 1, further comprising storing a display page history including an index of recently displayed interface pages and providing a user selectable interface that returns the display to a previously displayed interface page.

7. The method of claim 1, wherein the user interface module is platform independent.

8. The method of claim 1, further comprising providing a link to an audio file including a visualization exercise.

9. The method of claim 1, wherein a step of querying includes providing a list of nonexclusively selectable answers.

10. The method of claim 1, wherein a step of querying includes providing a free answer form.

11. The method of claim 1, further comprising the step of providing a master interface configured to permit a user to navigate between sub-steps, the master interface including a bookmark module configured to selectably record a page location for later retrieval.

12. The method of claim 1, further comprising providing access to a multimedia educational module.

13. A method for facilitating personal development using a computing device by providing non-transitory machine-readable instructions on a tangible medium to perform steps, comprising:
  a) generating a machine-readable foundation profile;
  b) guiding a user through a process of issue resolution by a module that performs sub-steps through a user interface module of a computing device that permits a user to selectably cause a processor of the computing device to direct performance of such sub-steps, including:
    i) querying a user in regards to a specific situation, storing answers to such queries as a machine-readable situation profile;
    ii) querying a user about their feelings in regards to the situation profile, and storing answers to such queries as a machine-readable feeling profile associated with the situation profile;
    iii) managing a self-dialogue within the user by displaying, on a display device, an answer stored in the feeling profile, and querying a user about the displayed answer; and
    iv) managing an inner guidance dialogue within the user by displaying an answer stored in any one of the foundation profile, situation profile, and feelings profile, querying the user about solutions associated with the displayed answer, and storing a representation of an intended action as a machine-readable action profile.

14. The method of claim 13, further comprising displaying at least one answer from the situation profile as a header during performance of a sub-step of guiding a user through a process of conflict resolution.

15. The method of claim 14, further comprising generating and displaying a link to a sub-step associated with the generation of an incomplete profile when a sub-step attempts to display data from the incomplete profile.

16. The method of claim 15, further comprising recording completed sub-steps as machine-readable tracking profile and storing a display page history including an index of recently displayed interface pages and providing a user selectable interface that returns the display to a previously displayed interface page.

17. A system for facilitating personal development using a computing device, including:
  a) a user interface module configured to provide interactive access to the system to a user, the user interface module including:
    i) an input module configured to receive data from an input device, process such data on a processor and thereby deliver user instructions to the system;
    ii) a return module configured to permit a user to selectably return a display to a previously viewed display page, the return module including a graphical object linked to a return command configured to display a previously viewed display page;
    iii) a sequence management module functionally coupled to the discovery module and the education module and configured to track module usage; and
    iv) a module socket module configured to provide user access to a plurality of additional content modules;
  b) a discovery module operatively coupled to the user interface module and configured to extract and store information from a user, the discovery module including:
    i) a query module configured to serve a plurality of questions and receive answers to the same;
    ii) a query linking module functionally coupled to the query module and configured to sequence a plurality of questions;
    iii) a data storage module in communication with the query module and configured to store answers; and
    iv) a usage recording module functionally coupled to the query module and configured to store completion data regarding asked questions; and
  c) an education module operatively coupled to the user interface module and configured to educate a user, the education module including:
    i) a dictionary module configured to serve definitional information on request; and
    ii) a reference module configured to serve reference information upon request.

18. The system of claim 17, further comprising a conditioning module operatively coupled to the user interface module and configured to influence a user, the conditioning module including:
  a) a media module including a plurality of media files;
  b) a media linking module functionally coupled to the media module and configured to sequence a plurality of media files; and c) a usage recording module functionally coupled to the media module and configured to store completion data regarding served media files.

19. The system of claim 17, wherein the user interface module further includes a media module including a plurality of media files, a user account module configured to store user information and limit access to the same through a security process, a data storage module configured to store data, and a skin module configured to selectably manage display of a plurality of image files decorating the user interface.

20. The system of claim 17, wherein the discovery module further includes a customization module configured to read a user characteristic from a user profile and selectably deliver a subset of question phrasings adapted to the user characteristic.

* * * * *